United States Patent
Graves et al.

(10) Patent No.: US 10,661,406 B2
(45) Date of Patent: May 26, 2020

(54) ROBOTIC HAND TOOL SHARPENING AND CLEANING APPARATUS

(71) Applicant: Razor Edge Systems, Inc., Ely, MN (US)

(72) Inventors: Daniel D. Graves, Manistique, MI (US); Joseph C. Juranitch, Babbitt, MN (US); Mary T. Graves, Manistique, MI (US); Scott D. Taylor, San Martin, CA (US); Steven T. Luong, Fremont, CA (US)

(73) Assignee: Razor Edge Systems, Inc., Ely, MN (US)

( * ) Notice: Subject to any disclaimer, the term of this patent is extended or adjusted under 35 U.S.C. 154(b) by 66 days.

(21) Appl. No.: 15/867,842

(22) Filed: Jan. 11, 2018

(65) Prior Publication Data

US 2019/0210177 A1    Jul. 11, 2019

(51) Int. Cl.
| | |
|---|---|
| *B24B 3/54* | (2006.01) |
| *B25J 9/02* | (2006.01) |
| *B24B 49/12* | (2006.01) |
| *B24B 51/00* | (2006.01) |
| *B24B 15/08* | (2006.01) |
| *B25J 15/00* | (2006.01) |

(Continued)

(52) U.S. Cl.
CPC ............. *B24B 3/54* (2013.01); *B24B 19/002* (2013.01); *B24B 49/12* (2013.01); *B24B 51/00* (2013.01);

(Continued)

(58) Field of Classification Search
CPC .... B24B 3/54; B24B 3/55; B24B 3/58; B24B 19/002; B24B 49/00; B24B 49/12; B24B 51/00; B24B 55/02; B24D 15/08; B25J 9/02; B25J 9/1697; B25J 11/0065; B25J 15/0023; Y10S 901/09; Y10S 901/37; Y10S 901/47

(Continued)

(56) References Cited

U.S. PATENT DOCUMENTS

| | | |
|---|---|---|
| 3,885,352 A | 5/1975 | Juranitch |
| 3,942,394 A | 3/1976 | Juranitch |

(Continued)

*Primary Examiner* — Eileen P Morgan
(74) *Attorney, Agent, or Firm* — DeWitt LLP

(57) ABSTRACT

An automated hand tool sharpening and cleaning system for sharpening the two opposed cutting edges of domestic, industrial, sport, or hobby hand tool like a knife blade is provided by the invention. The apparatus comprises a six-axis robotic arm, a pneumatic gripper, a vision sensor camera for profiling the blade edges, a robotic controller, and sequentially-arranged grinding, coarse sharpening, fine sharpening, and buffing rotating wheel assemblies used to grind, sharpen, and buff or polish the cutting edges of the knife blade. The blade cutting edges are profiled by the camera image that is processed by associated software to define the blade by multiple points defined along its edge, followed by a set of algorithms that are used to clean up any discrepancies in the profile data. The resulting corrected profile data is then translated into a set of machine control commands fed to the robotic arm and pneumatic gripper via the robot controller for manipulating the knife blade edges via the robotic arm with respect to each of the grinding, coarse sharpening, fine sharpening, and buffing/polishing wheels and an associated wash station for remove bits of metal and other residue resulting from the sharpened knife blade.

20 Claims, 46 Drawing Sheets

(51) Int. Cl.
  *B25J 9/16* (2006.01)
  *B25J 11/00* (2006.01)
  *B24B 55/02* (2006.01)
  *B24D 15/08* (2006.01)
  *B24B 19/00* (2006.01)

(52) U.S. Cl.
  CPC .............. *B24B 55/02* (2013.01); *B24D 15/08* (2013.01); *B24D 15/081* (2013.01); *B25J 9/02* (2013.01); *B25J 9/1697* (2013.01); *B25J 11/0065* (2013.01); *B25J 15/0023* (2013.01); *Y10S 901/09* (2013.01); *Y10S 901/37* (2013.01); *Y10S 901/47* (2013.01)

(58) Field of Classification Search
  USPC ...................................... 451/5, 9, 10, 11, 45
  See application file for complete search history.

(56) References Cited

U.S. PATENT DOCUMENTS

| | | |
|---|---|---|
| 4,934,110 A | 6/1990 | Juranitch |
| 5,655,959 A | 8/1997 | Juranitch |
| 5,793,493 A | 8/1998 | Lane |
| 6,224,459 B1 | 5/2001 | Stocker et al. |
| 6,663,465 B2 * | 12/2003 | Gross ...................... B23Q 7/047 451/10 |
| 6,712,675 B1 * | 3/2004 | Giurgiuman ............ B24B 3/346 451/48 |
| 6,881,130 B1 | 4/2005 | Stocker |
| 6,955,584 B2 | 10/2005 | Giurgiuman et al. |
| 7,231,849 B2 * | 6/2007 | Beattie ...................... B24B 3/42 76/82.1 |
| 8,277,282 B2 | 10/2012 | Tanaka |
| 8,758,084 B2 * | 6/2014 | Knecht ...................... B24B 3/54 451/10 |
| 8,915,766 B1 * | 12/2014 | Kolchin ...................... B24B 3/54 451/45 |
| 8,915,769 B2 | 12/2014 | Kolchin |
| 9,079,284 B2 * | 7/2015 | Christenson ............. B24B 3/54 |
| 9,545,703 B1 | 1/2017 | Juranitch |
| 10,272,535 B1 * | 4/2019 | Lyons ...................... B24B 49/04 |
| 2002/0025757 A1 | 2/2002 | Gross |
| 2011/0281503 A1 | 11/2011 | Knecht |
| 2017/0087690 A1 * | 3/2017 | Vogel ...................... B24B 51/00 |
| 2018/0236623 A1 * | 8/2018 | Robinson ............. B24B 53/003 |

* cited by examiner

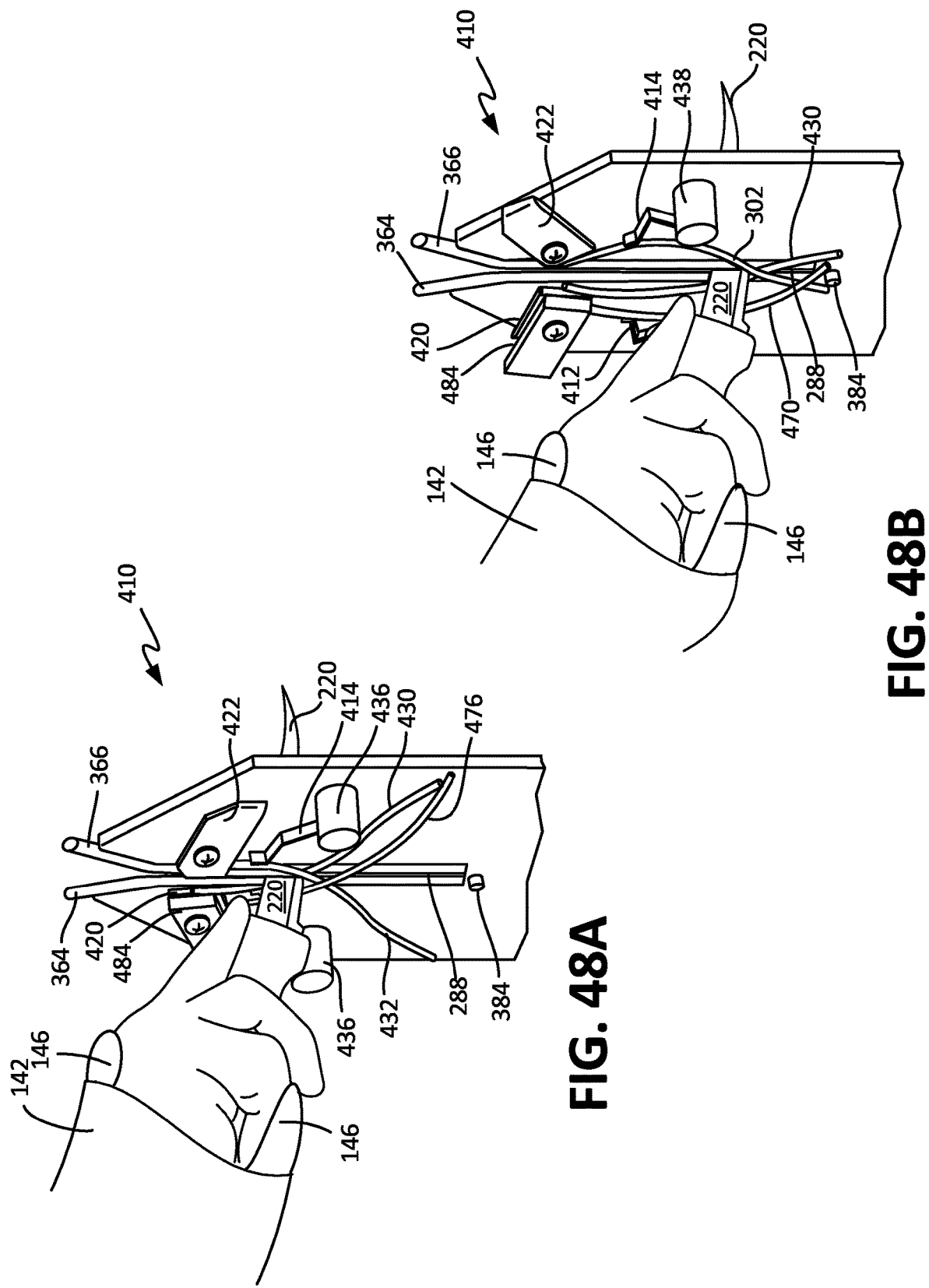

ROBOTIC HAND TOOL SHARPENING AND CLEANING APPARATUS

FIELD OF INVENTION

This invention relates to an apparatus for sharpening the cutting or working edge of a hand tool, such as a knife blade and cleaning, scrubbing, and sanitizing the working surfaces and maintaining a sharp edge along the cutting edge, and more specifically to such an apparatus that uses a robotic arm and a vision camera for manipulating the knife blade with respect to one or more rotating, grinding, or polishing wheels to sharpen the blade edges, and present it to a cleaning station.

BACKGROUND OF THE INVENTION

A knife represents a hand-held cutting tool with a cutting edge or blade. It may also have a handle. Originally made from rock, bone, flint, or obsidian, knife blades today are typically fashioned from iron, steel, ceramics, or titanium.

While knives may be used as a weapon, they are more commonly employed by people as useful tools in food preparation, dining, meat processing, hunting, construction, work projects, and hobbies for cutting or slicing an object. Many different types and designs of knives are known, but most of them share the trait of one or two sharpened blade edges.

But, over time, these sharpened edges of the knife blade will become dull or damaged. Blades are damaged due to compressive force arising from the user pressing the knife blade cutting edge into a hard object like bone, ice, a hard cutting board, or other hard object, or simply by repetitive use. The knife blade may also become bent from sideways pressure applied against the blade. Both of these forces tend to roll the knife blade's cutting edge due to the ductile characteristic of the metal material used in the blade. Moreover, tougher or abrasive materials will cause the blade to become dull more quickly.

Dull blades do not cut as easily or precisely, and can create a danger to the end user by requiring greater hand force to make a cut. Moreover, dulled blades can include burrs or ragged edges with regions along the cutting surface that are out of alignment with each other. Such misaligned blades can damage the material being cut, or produce an inferior cut by tearing or sawing the material being cut as opposed to a smooth, clean cut.

Therefore, such dulled knife blades must be periodically sharpened. This is typically a process in which the knife blade is manually ground against a hard, rough surface like a stone, or a soft surface containing hard particles. Metal can be removed from the knife blade in order to form a new edge along the blade. Typically, a grinding wheel or a whetstone is used. These sharpening stones come in varying grit degrees from very coarse to very fine, and can be described as hard or soft depending upon whether the grit comes free of the stone during the grinding operation. Ceramic hones are also commonly used, especially when fine grit size is desired. Coated hones with an abrasive diamond-based surface provide yet another option. Mineral oil often is used during the grinding application to separate the loosened grinding particles from the knife blade edge to prevent damage to the blade.

However, grinding constitutes a precise manual operation in which the angle of the cutting edge of the blade must match the angle of the whetstone or grinding wheel surface. The smaller the angle between the blade and stone, the sharper the knife will be, but at the same time, less side force is required to damage the knife blade by bending the cutting edge over or even chipping it off. The edge angle represents the angle between the blade and the stone. For symmetrical double-ground, wedge-shaped knife blades, the angle from one edge to the other edge of the blade will be twice the edge angle.

The cutting edges of the knife blade may also be straightened by a hand-held sharpening steel. The sharpening steel constitutes a hardened cylindrical, triangular or other shaped rod having a small diameter. This sharpening steel may have a smooth, polished exterior surface, or may be somewhat abrasive. It may also feature slight ridges or ribs running along the length of the rod. A butcher steel constitutes a round file with teeth running the long way, although it may also be smooth. As the knife blade with its cutting edge is swiped along the sharpening steel, the steel will exert high localized pressure against the cutting edge to straighten the turned edges of the cutting edge back into proper alignment. Unlike grinding, such steeling process does not usually remove metal from the blade edge.

Knives used by barbers are often manually stropped after steeling in order to polish the sharpened cutting edge. This is often done with a leather strap impregnated with an abrasive compound like chromium (III) oxide particles. This operation does not remove any metal material from the blade edge, but produces a very sharp edge.

While steeling represents a less aggressive form of sharpening than grinding, it still is important to swipe the knife's blade at a proper angle with respect to the sharpening steel. Moreover, the two cutting edges of the knife must be swiped the same number of times against the steel or else the cutting edge will be pushed again out of alignment. U.S. Pat. No. 3,942,394 issued to Juranitch in 1976 for a hand-held finishing sharpener includes fold-out wings that act like sharpening steels accompanied by a handle that provides a visual guide for maintaining the proper angle of the knife's cutting edge along the wings. This may make it slightly easier for the user to estimate the proper angle for the knife blade sharpening operation.

A manually-operated knife sharpening device referred to as a MOUSETRAP STEEL sharpener that is further disclosed in U.S. Pat. Nos. 4,934,110 and 5,655,959 issued to Juranitch provides another example. It constitutes a bench-top mounted, vertical base member having a vertical slot partially bisecting the base member from its top edge. Pivotably mounted to the base member are two counterweights having equal masses. A pair of upwardly curved sharpening steels is connected to the upper and inner ends of the counterweights and extend toward each other in a crossed relationship, intersecting at and along the slot. As a knife blade is pushed down through the slot, it engages the sharpening steels at this intersection point and pushes the steels inwardly, sharpening the opposing cutting edges of the knife blade simultaneously as the knife blade is swiped along the sharpening steels. A pivotably-mounted wiper wing under the influence of its own counterweight polishes the sharpened blade. A pair of cams that are eccentrically mounted to the base member act to arrest the lateral movement of the steels during the knife sharpening operation, as well as to define the downward resting point of the counterweights when the sharpening steels are in their standby position when the knife blade is disengaged. See also U.S. Pat. No. 9,545,703 issued to Juranitch et al. and U.S. Ser. No. 15/610,169.

However, these cams must be carefully adjusted in their eccentric positions along the base member prior to the knife sharpening operation to define how high or low the crossed intersection point of the steels will be situated over the slot. A higher position requires greater force applied to the knife blade during the sharpening operation resulting in this higher intersection point of the steels producing a less-sharp cutting angle along the knife blade. A lower intersection position on the other hand requires less force applied to the knife blade during the sharpening operation resulting in a sharper cutting angle produced by the steels along the knife blade. Thus, the MOUSETRAP STEEL sharpener requires the user to know in advance the angle of the cutting edges that must be produced along the sharpened knife blade, and to precisely adjust in advance the cams' positions to achieve this desired angle. This requires skill and patience by the user. Yet over time, the significant weight of the heavy, 20-ounce counterweights will cause the cams to move from their intended position, thereby making repeated sharpening of knives with the same cutting edge angle impossible without further precise adjustment of the position of the cams. Furthermore, the large number of parts mounted to the base member and the bolts and nuts used to mount them also produce environments for bacterial growth which makes it difficult to keep the device clean and sanitary.

A key advantage of this MOUSETRAP STEEL sharpener is that the criss-crossed sharpening steels act to sharpen both sides of the knife blade cutting edge simultaneously, so there is no need to swipe each side of the blade along a sharpening steel the same number of times to avoid blade damage. But, the criss-crossed sharpening steels act against the blade cutting edges in a manner that is approximate to the proper angle of the cutting edges, which may in some cases lead to suboptimal knife blade edge sharpening.

Moreover, the manual sharpening of knives can be time-consuming and require skill and diligence by the end user of the sharpening device. This can be a problem in particular for industrial operations like meat processing lines where large numbers of knives are used and dulled during the course of a day.

Thus, Razor Edge Systems has also commercialized a motorized "Heavy Duty System" knife blade sharpener that is used to manually restore a sharp cutting edge to a knife blade. It comprises a hollow grinder is used by the human operator to remove excess metal from the sides of the knife blade. By drawing the blade back and forth tip to handle between the two contra-rotating grinding wheels, the hollow grinder thins out the blade. Next, the knife is clamped by the operator into a D-ring clamping device that will provide the angle and control needed for further sharpening of the knife blade. The Edger features a rotating coarse sharpening wheel and a rotating fine sharpening wheel that are used by the operator sequentially to produce or restore the cutting edge back onto the knife blade. The coarse sharpening wheel on the Edger is used first to prepare the edge creating the correct angle. The fine sharpening wheel is then used to remove the burr created by the coarse wheel, thereby creating a sharp edge. Finally, a rotating buffer wheel removes any remaining pieces of metal from the knife blade, and smoothes the edge to remove any furrows (grooves) left behind by the Edger wheels. While the D-ring clamp facilitates the operator's manipulation of the knife blade across the Edger and buffer wheels, this is still a manually-operated procedure that requires the operator to follow the set procedure in order to produce a sharp edge. This includes proper orientation of the knife blade inside the D-ring clamp, proper alignment of the D-ring clamp with respect to the Edger and buffer wheels, and uncoupling of the D-ring clamp from the Heavy Duty System to flip the knife blade over 180 degrees during and between each of the coarse sharpening, fine sharpening, and buffing operations, which takes time and can lead to misalignment of the knife blade with respect to the rotating wheels. If improperly carried out, this Heavy Duty System will not properly sharpen the cutting edges of the knife's blade.

It is therefore easy to damage the cutting edge of the knife blade further if the sharpening exercise is performed poorly. Thus, most knife users need to send out their dulled knives to a professional sharpening service, or to replace the knife with a new knife. This can be time-consuming and expensive.

While electric knife sharpeners are available in the market, they can damage the knife blade edges if improperly used. Thus, efforts have been made to automate the knife sharpening process. But, it is not easy to replicate by a machine a process that inherently relies upon human judgment.

Robotic arms are known within the manufacturing industry. For example, U.S. Pat. No. 8,277,282 issued to Tanaka discloses an ultrasonic trimming apparatus designed to cut flexible material. An ultrasonic oscillator is supported by the end portion of an articulated robot arm with a cutter blade supported in turn by the ultrasonic oscillator. The cutter blade is ultrasonically vibrated by the ultrasonic oscillator to trim the material in accordance with a pre-stored pattern.

U.S. Pat. No. 6,224,459 issued to Stocker et al. describes a workplace inspection and handling system. A three-axis robotic system picks up a disk-shaped wafer like a semiconductor chip from an inspection station and places it at a second station for edge grinding of the chip. Multiple sliding members operating in different orthogonal directions are responsible for moving the robotic arm along the x-y-z axes. See also U.S. Pat. No. 6,881,130 issued to Stocker.

Robotic systems have also been applied within the industry to the sharpening of knife blades. For instance, U.S. Pat. No. 6,663,465 issued to Gross illustrates a grinding machine for sharpening (honing) knife blades. The sharpening station comprises a conventional arrangement of two contra-rotating grinding wheels operated by an electric drive motor. A robot having a manipulator and pneumatic gripper movable in six possible translatory and rotational degrees of spatial freedom picks up and moves the knife blade with respect to the grinding station. The knife blade is then drawn by the manipulator and gripper through the contra-rotating grinding wheels applying a constant force on the blade throughout the sharpening operation. The blade edge is ground in accordance with a pre-loaded data set represented by machine-independent neutral data that defines the blade in its three dimensions. The knife is then removed from the blade grinding machine and mounted within a measuring system that uses mechanical probes operated by a CNC-controlled system to sample the sharpened blade for its actual three-dimensional shape. By comparing the actual data set for the sharpened blade shape against the pre-loaded data set for the ideal blade shape, any difference determines whether the knife needs to be returned to the grinding station for further sharpening to produce a blade edge meeting the shape specifications for the knife.

U.S. Pat. No. 9,079,284 issued to Christenson et al. discloses an automated knife sharpening and cleaning system in which a gripper operated in three dimensions by three different axial drive assemblies picks up the knife and moves to the grinding station. The profile of the knife is sensed by sensors so that the grinding station can be adjusted according to the feedback provided by the sensors regarding the profile of the knife, and the position of the knife adjusted within the three-dimensional space. Once the knife blade is properly sharpened by the grinding assembly, the gripper assembly removes the knife and returns it to a storage tote.

U.S. Pat. No. 5,793,493 issued to Lane describes a system for estimating the cutting condition of a double-ground knife blade using a light, camera, and mirror to detect and compare the opposite cutting edges of the knife blade. The mirror allows the upper and lower blade bevel imager to be detected simultaneously by the camera.

U.S. Pat. No. 8,915,766 issued to Kolchin discloses another automated sharpening system in which the knife is manually placed in a holder with the cutting edge of the blade exposed. A sensor is configured to detect any burrs existing along the edge of the knife blade. An abrader set at the proper angle with respect to the knife blade edge then is moved along the blade edge to sharpen only those portions of the blade where the burrs exist.

U.S. Pat. No. 8,758,084 issued to Knecht et al. describes an apparatus for grinding hand knives comprising a CNC-operated gripper mechanism and a series of rotating, grinding, deburring, and polishing wheels. The knife is picked up by the gripper mechanism. A sensor measures the contour of the knife blade cutting edge which is then compared against stored data for the ideal profile for that knife blade. The gripper mechanism then moves the knife blade so that only those portions of the blade edge exhibiting imperfections are passed along the rotating, grinding, deburring, and polishing wheels for sharpening.

U.S. Published Application 2017/0087690 filed by Vogel et al. discloses an automated system for conditioning knife blades. A gripper assembly for the knife comprises one or more clamp arms for moving along x, y, and z axes, and rotatable in the roll direction, pitch direction, and yaw direction. A first measuring device constituting two lasers emits laser light beams for measuring the width and thickness of the knife blade along its length. The resulting data points are stored. A second measuring device constituting a light and a lens assembly then obtains images of the knife blade to measure the same thickness and width. These data points are then combined with the first set of data points to create a current edge profile for the knife blade. This current edge profile is then modified to obtain a modified edge profile. The gripper assembly manipulates the knife blade with respect to rotating grinder, buffer, and polishing wheels to sharpen the knife blade edge and restore it to its ideal state.

However, all of these prior art systems are very complicated in their structure and moving parts. It would therefore be beneficial to provide an automated hand tool sharpening and cleaning system that uses a robotic arm instead of a conventional CNC manipulation system in combination with a camera and associated software that creates an image of the blade or other working surface of the hand tool to profile it with the resulting data used to create machine control commands for the robotic arm to properly manipulate the hand tool blade or working surface with respect to a series of rotating, grinding, sharpening, and polishing wheels to appropriately sharpen its edge substantially along its entire length. The robotic arm can also be used to properly manipulate the sharpened blade or working surface inside a wash station to remove bits of metal and other residue resulting from the sharpening operation, and clean, scrub, and sanitize the hand tool for use in a domestic, industrial, sport, or hobby operation.

SUMMARY OF THE INVENTION

An automated hand tool sharpening and cleaning system that may be used by a relatively unskilled person to simultaneously sharpen the two opposed cutting edges of domestic, industrial, sport, or hobby hand tool like a knife blade and to maintain sharpened cutting edges along the blade with minimal effort and training is provided by the invention. The apparatus comprises a six-axis robotic arm, a pneumatic gripper, a two-dimensional vision system with a sensor camera and software for profiling the blade edges by scanning the knife blade, a robotic controller, and sequentially-arranged grinding, coarse sharpening, fine sharpening, and buffing rotating wheel assemblies used to grind, sharpen, and buff or polish the cutting edges of the knife.

The blade cutting edges are profiled by the camera image taken of the knife blade. The digital image is then processed by associated software to project a series of parallel lines on top of the image of the knife blade between its tip and heel where the blade joins the handle. The software takes the points where the lines meet the knife blade edge, and stitches a line from point to point that defines the specific cutting edge of the knife, and creates the specific path for the sharpening motion that will be required for moving the cutting edge along the grinding, sharpening, and buffing/polishing wheels.

However, this methodology for producing the profile curve for the blade from the smart vision digital image of the knife blade may be two exact, which will result in picking up imperfections existing along the knife's blade cutting edge, which in turn may result in the robotic arm misapplying the knife blade edge along the grinding, sharpening, or buffing/polishing wheel. Therefore, a filtering technique is preferably applied to the smart vision system data set that utilizes a fourth or fifth-degree polynomial equation to apply the polynomial fit (least squares) methodology to smooth out the irregularities that may characterize the data set for the blade curve profile. The resulting idealized curve has been found to resemble more closely the actual curved profile of the manufactured knife blade. The resulting corrected profile data is then translated into a set of machine control commands fed to the robotic arm and pneumatic gripper via the robot controller to cause the robotic arm to pick up the knife and properly manipulate its blade edges with respect to each of the grinding, coarse sharpening, fine sharpening, and buffing/polishing wheels in a smooth and accurate manner to apply or restore the cutting edge at the appropriate angle along substantially the entire length of the knife blade.

After vision camera inspection of the knife blade and preferable filtering of the blade profile curve, the robotic gripper arm moves the knife to the hollow grinding station. The knife blade will be drawn back and forth between the two contra-rotating hollow grinding wheels approximately ten seconds or longer as needed. The robotic arm manipulates and pivots the knife blade using the two-dimensional profile and resulting three-dimensional x-y-z coordinates during the grinding operation, so that the 32-40 reference points along the knife blade edge are always transverse to the rotating wheel edge. This accommodates the curvature of the blade. The robotic aunt draws substantially the entire knife blade across the wheel, not discrete sections of the knife blade. By drawing the blade in a forward or backwards motion between two contra-rotating grinding wheels, the hollow grinder thins out the blade to remove excess metal from the sides of the dull or damaged knife blade to thin out the blade nearest the cutting edge.

The robotic gripper arm then moves the knife to the Edger's coarse sharpening wheel station. The Edger featuring the coarse sharpening wheel station and a subsequent fine sharpening wheel station is used to produce or restore the cutting edge back onto the knife blade. The robotic gripper arm draws the first side of the knife blade across the rotating Edger's coarse sharpening wheel one or two times while keeping the blade edge tangent to the wheel grinding surface. The robotic arm then rotates the knife blade by approximately 180° and flips it over to present the second (opposite) side of the knife blade to the coarse sharpening wheel, which is reversed in its rotational direction. This second side of the blade is drawn once or twice across the rotating coarse sharpening wheel while keeping the blade edge tangent to the wheel. In each case, substantially the entire knife blade is drawn across the rotating wheel. By rotating the blade by approximately 180° and flipping it over, and reversing the rotational direction of the coarse sharpening wheel, the rotational direction of the wheel is always into both sides of the blade. This coarse sharpening wheel acts to prepare the knife blade cutting edge by restoring or adding the correct angle to the cutting edges.

The robotic gripper arm next moves the knife to the fine-edge sharpening wheel. The process for drawing the first side of the blade across the rotating fine-edge sharpening wheel thrice, rotating the blade by approximately 180° and flipping it over, reversing the rotational direction of the fine edge sharpening wheel, and then drawing the second side of the blade across the rotating fine edge sharpening wheel is repeated. This fine-edge sharpening wheel acts to remove any metal burrs formed along the blade edge by the Edger coarse sharpening wheel, and creates the sharp edge along the knife blade cutting edge.

Next, the robotic griper arm moves the knife to the buffing/polishing wheel station. The Buffer provides a rotating felt wheel to remove any remaining pieces of metal along the sharpened knife blade edge, and smooth the cutting edge to remove any furrows (grooves) left behind by the Edger coarse sharpening wheel or fine edge sharpening wheel. The process described above for the rotating coarse sharpening wheel and rotating fine edger sharpening wheel is repeated to draw each side of the knife blade once or twice across the rotating buffing/polishing wheel.

The robotic gripper arm then optionally moves the knife to a washing station where the knife is washed, scrubbed, or sanitized. Following the grinding and sharpening processes, the knife blade surfaces may contain small bits of detached metal that are left over from the operations of the grinding wheel or the sharpening wheels. Moreover, such sharpening processes usually rely upon a grinding or sharpening wheel made with small sand or diamond particles bonded to the wheel that rotates at a high speed that must be cooled by a water jet as the blade is applied against the rotating wheel in order to avoid damage to the blade. But, the sand or diamond particles may become detached from the wheel during the sharpening process to form a slurry with the cooling water and bonding agent that contaminates the blade. A buffing wheel used to polish the blade after grinding and sharpening commonly has "jewelers rouge" compound applied to it as a polishing medium. Thus, these metal bits, slurry, and jewelers rouge compound must be removed from the blade by a supplemental cleaning process before the knife or scissors can be used, especially in meat or food processing operations. Mere immersion of the knife or scissors in cleaning solution may be ineffective for separating s the metal bits from the blade surfaces. Furthermore, organic or inorganic contaminants like bacteria or bits of meat or other substrate materials that were on the knife before it was introduced to the automated knife sharpener system may reside on the knife or its blade. The washing station provides a suitable environment for removing such organic and inorganic materials from the knife and its blade, and killing any bacteria that reside on such surfaces.

Finally, the robotic gripper arm optionally moves the cleaned, scrubbed, or sanitized knife to a finishing sharpener station. A Mousetrap Steel or Stainless Mousetrap Steel device commercialized by Razor Edge Systems, Inc. of Ely, Minn., may be used. The buffer/polisher wheel described above will typically yield a good cutting edge along the knife blade. But, there still may be microscopic imperfections existing along the knife blade. Such a finishing sharpener device contains two criss-crossed sharpening steel rods and an optional wiper rod. By drawing the knife blade edge through a slot of the device, and keeping the blade perpendicular as it is drawn through the steels, any such microscopic imperfections caused by residual pieces of metal along the knife blade are removed to change the restored cutting edge to an ultimately desirable state.

The now sharpened knife is moved by the robotic gripper arm back towards the storage tote or another storage tote dedicated to the sharpened knives (86). The process of the robotic knife sharpening system is repeated for all of the additional dull knives in the starting tote one by one until the entire group of knives have their blades sharpened.

The process produced by this robotic knife sharpening system will grind or sharpen substantially the entire cutting edge length of the knife blade, not just the specific spots along the knife blade that needed to be sharpened. The system retains the original factory shape of the cutting edge along the knife blade, but may utilize a different angle than the one produced at the factory, thereby resulting in an even sharper cutting edge. This system is fully automated, utilizing the robotic arm and vision system camera and analysis software to produce consistently reliably sharpened knife blade cutting edges at higher throughputs with less operator repetitive stress and other injuries compared with the prior art manually-operated knife sharpening devices or systems.

BRIEF DESCRIPTION OF THE DRAWINGS

In the accompanying drawings:

FIG. 48A is a partial perspective view of the finishing knife sharpener of FIG. 44 with the sharpening steels and wiper rod in their standby positions, and the knife blade first engaging the sharpening steels; and FIG. 48B is a partial perspective view of the knife sharpener of FIG. 48A with the knife blade further progressed along the sharpening steels and wiper rod.

DETAILED DESCRIPTION OF THE PREFERRED EMBODIMENT

Figure 1:
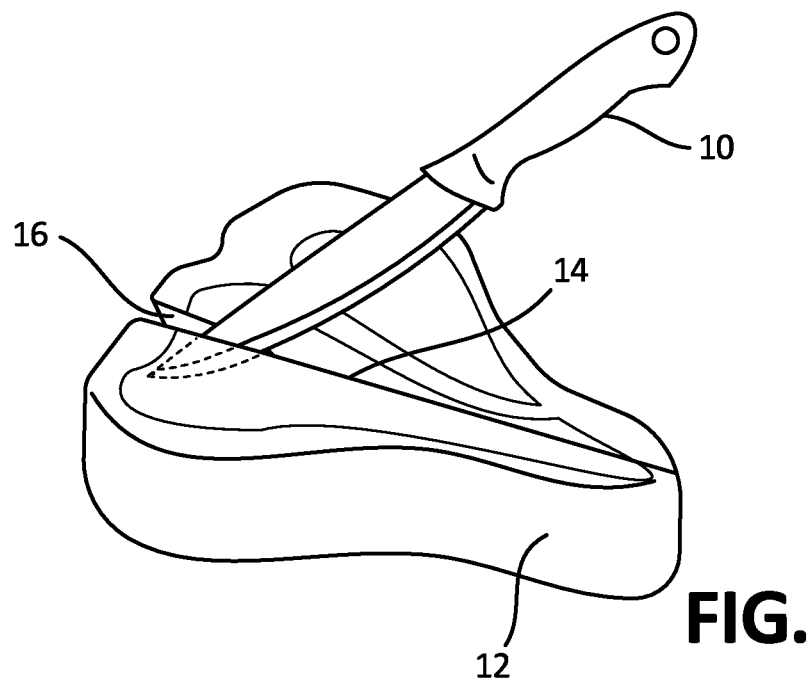
FIG. 1 is a perspective view of a knife cutting a material like a piece of meat.

An automated hand tool sharpening and cleaning system that may be used by a relatively unskilled person to simultaneously sharpen the two opposed cutting edges of domestic, industrial, sport, or hobby hand tool like a knife blade and to maintain sharpened cutting edges along the blade with minimal effort and training is provided by the invention. The apparatus comprises a six-axis robotic arm, a pneumatic gripper, a vision sensor camera for profiling the blade edges, a robotic controller, and sequentially-arranged grinding, coarse sharpening, fine sharpening, and buffing rotating wheel assemblies used to grind, sharpen, and buff or polish the cutting edges of the knife. The blade cutting edges are profiled by the camera image that is processed by associated software to define the blade by multiple points defined along its edge, followed by a set of analysis algorithms that are used to clean up any discrepancies in the profile data. The resulting corrected profile data is then translated into a set of machine control commands fed to the robotic arm and pneumatic gripper via the robot controller to cause the robotic arm to pick up the knife and properly manipulate its blade edges with respect to each of the grinding, coarse sharpening, fine sharpening, and buffing/polishing wheels to apply or restore the cutting edge at the appropriate angle along substantially the entire length of the knife blade. The automated hand tool sharpening and cleaning system can also be used to manipulate the sharpened blade inside a wash station to remove bits of metal and other residue resulting from the sharpening operation, and clean, scrub, and sanitize the knife.

For purposes of the present invention, "cut substrate" means a material such as paper, cardboard, metal foil, thin plastic, textiles, cloth, silk, rope, twine, wire, wood veneers, wood, construction materials, flowers, tree or plant part, or foods like meats that is capable of being cut or trimmed by a knife.

As used within this Application, "hand tool" means a domestic, industrial, sport, or hobby implement used within a manual or automated process to produce useful work, such as a knife, scissors, scalpel, spreading device, prying device, chipping or cutting device, or stripping device.

As used within this Application, "knife" means a hand-operated cutting tool with a cutting edge or blade and a handle for cutting or trimming a cut substrate. It can have a fixed blade or a blade that folds or slides into a slot in the handle. It includes, without limitation, except for serrated edges, knives used as dining utensils or in food preparation like a bread knife, boning knife, carving knife, chef's knife, cleaver, butcher's knife, electric knife, kitchen knife, oyster knife, paring or coring knife, rocker knife, steak knife, table knife, or ulu; knives used as tools like a Bowie knife, cobbler's or shoemaker's knife, crooked knife, wood carving knife, diver's knife, electrician's knife, hunting knife, linoleum knife, machete, palette knife, paper knife or letter opener, pocket knife, produce knife, rigging knife, scalpel, straight razor, survival knife, switchblade, utility knife, whittling knife, x-acto knife, balisong, or kiridashi; knives used as weapons like a ballistic knife, bayonet, combat knife, dagger, fighting knife, ramuri, shiv, trench knife, butterfly knife, or throwing knife; or knives used in religious ceremonies like an athame, kirpen, kilaya, kris, kukri, puukko, seax, or sgiandubh.

FIG. 1 shows a knife 10 cutting a substrate in the form of a piece of meat 12 along an intended cut line 14. The produced cut line 16 is shown behind the travel path of the knife. While a knife has been shown as the hand tool for purposes of illustration of the hand tool wash apparatus of the present invention, it should be understood that a number of other types of hand tools may have their work surfaces cleaned, scrubbed, and sterilized by the hand tool wash apparatus, and therefore are fully covered by the scope of this invention.

Figure 2:
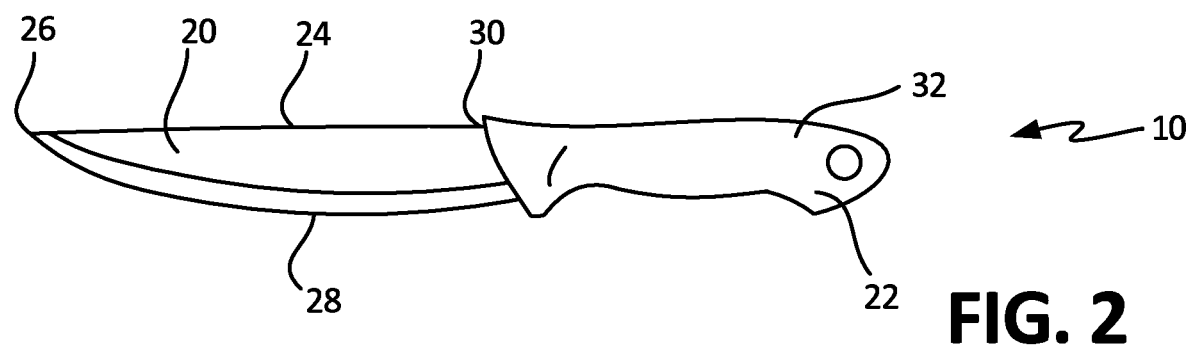
FIG. 2 is a perspective view of a knife.

The knife 10 is a hand-operated cutting tool that is shown more clearly in FIG. 2. It consists of a blade 20 and a handle 22. The blade 20 comprises a spine 24 constituting the thickest section of the blade, a point 26 located at the end of the blade, and a cutting edge 28 extending along the bottom surface of the blade from the point 26 to the heel 30. The hilt or butt 32 is formed by the end of the handle 22. The handle 22 used to grip or manipulate the blade 20 safely may include a tang constituting a portion of the blade opposite the point 26 that extends into the handle.

Figure 3:
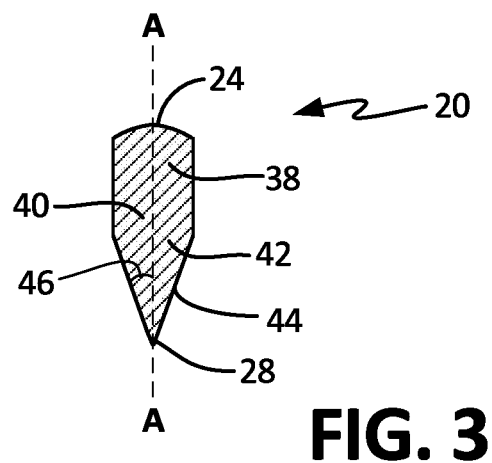
FIG. 3 is a cross-sectional view of the knife blade.

For purposes of the knife sharpener of this invention, the blade 20 should feature a plain cutting edge, or a plain cutting edge portion in combination with a serrated blade cutting edge portion. The knife sharpener of the present invention sharpens and maintains the plain cutting edge of the knife. As shown more clearly in FIG. 3, the blade features a broad middle region 38 with the spine 24 along its top surface. The lower region 40 of the blade features a grind region 42 having a beveled edge 44 produced on one or both exterior surfaces at an edge angle 46 with respect to vertical axis A-A. This beveled edge 44 produces cutting edge 28 running along the bottom surface of the knife blade 28.

The knife blade 20 can be manufactured from a variety of different materials. Carbon steel constituting an alloy of iron and carbon can provide a very sharp cutting edge 28. It holds its edge well and is relatively easy to sharpen, but is also vulnerable to rust and stains. On the other hand, stainless steel constituting an alloy of iron, chromium, possibly nickel, and molybdenum with only a small amount of carbon will not accept quite as long lasting of a cutting edge 28 as carbon steel, but it remains highly resistant to corrosion. High-carbon stainless steel alloys contain a higher amount of carbon, and do not discolor or stain, while maintaining a sharper cutting edge. Titanium metal is characterized by a better strength-to-weight ratio. It is therefore more wear resistant and more flexible than steel. Titanium metal is often heat-treated to produce the necessary hardness required for a longer-lasting cutting edge 28 for the knife blade.

The total included angle α of the knife blade 20 extends from one side of the blade to the other side. Thus, it is double the edge angle 46 for a double-ground knife blade. Unfortunately, this included angle varies widely between different types of knives or cutting apparati. This included angle α is about 20 degrees for razors, pairing knives, and fillet knives that constitute some of the sharpest of cutting blades. Most kitchen knives like utility/slicing knives, chef's knives, boning knives, and carving knives should have an included angle of about 30-50 degrees. Japanese-style knives feature a sharper cutting edge 28 defined by an included angle of about 28-32 degrees. Sporting knives like pocket knives, survival knives, and hunting knives usually feature an included angle of about 50-60 degrees. This shallower angle produces a broader lower region 42 having more metal material on the knife blade which produces a more durable cutting edge 28 for use in the field. Machetes, chisels, draw knives, and axes are typically sharpened to an included angle of about 60-80 degrees for even greater durability. This varying included angle makes it difficult to sharpen the cutting edges of a particular knife by prior art sharpening devices where the desired angle must be known and the device adjusted to produce that angle.

Figure 4:
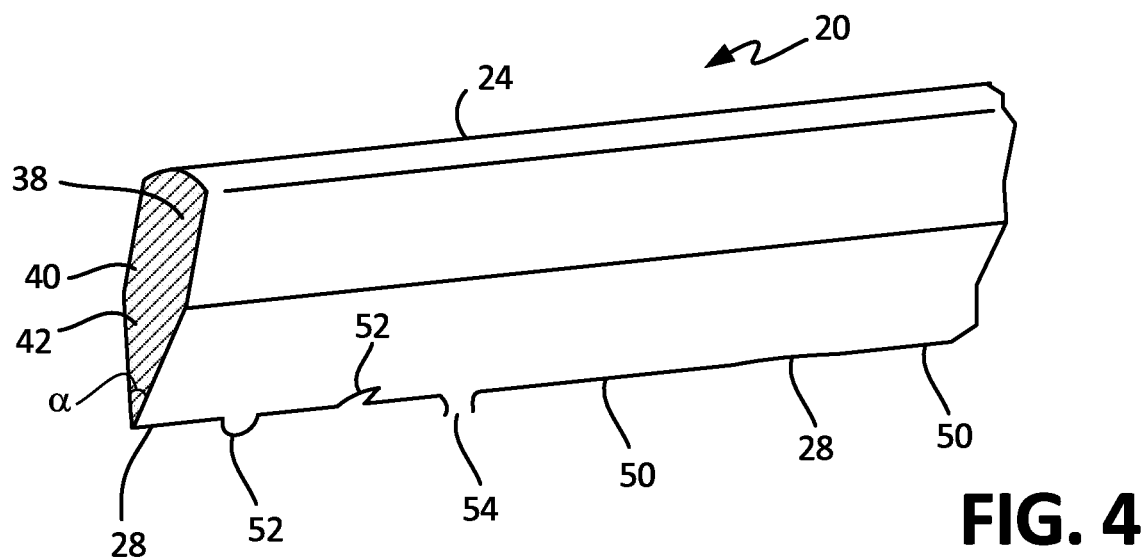
FIG. 4 is a partial perspective view of the knife blade with deformed edges and burrs along its blade.

However, cutting edge 28 along the bottom surface of the knife blade does need to be maintained in a sharpened state that accommodates its designated included angle. As shown more clearly in FIG. 4, this cutting edge should be maintained in a state with a continuous, straight edge 50 along the length of the blade. But through usage, especially if the knife 10 is used to cut or slide hard objects like bone, ice, or construction materials, portions of this cutting edge 28 may become deformed. Such deformations within the cutting edge may create an outwardly deflected region 52 towards either side of the blade 20. Such deformations cause a "dulled edge" along the knife blade that produces a poor cut by the knife 10. Even more critically, a deformed region 52 may become worse in its deflection over time to the point that its metal separates from the knife blade 20 to form a burr 54 along the cutting edge 28. Such outwardly deflected deformations 52 or burrs 54 will require significantly greater force exerted by the user upon the knife blade 20 to cut or slice, pulling or crushing a cut substrate being cut, and thereby fail to produce a neat and uniform cut. If the knife is used to cut the stem of a flower or plant, these deformations and burrs can crush the edge of the stem to make the flower or plant susceptible to disease or shorten its life.

While a piece of meat 12 has been shown as the piece of cut material cut by the knife 10 for the sake of illustration, a number of other types of cut materials that can be cut or sliced by a knife like skin, plastic, textiles, paper, film, and hobby or construction materials are possible, and should be understood as being fully covered by the scope of this invention.

Figure 5:
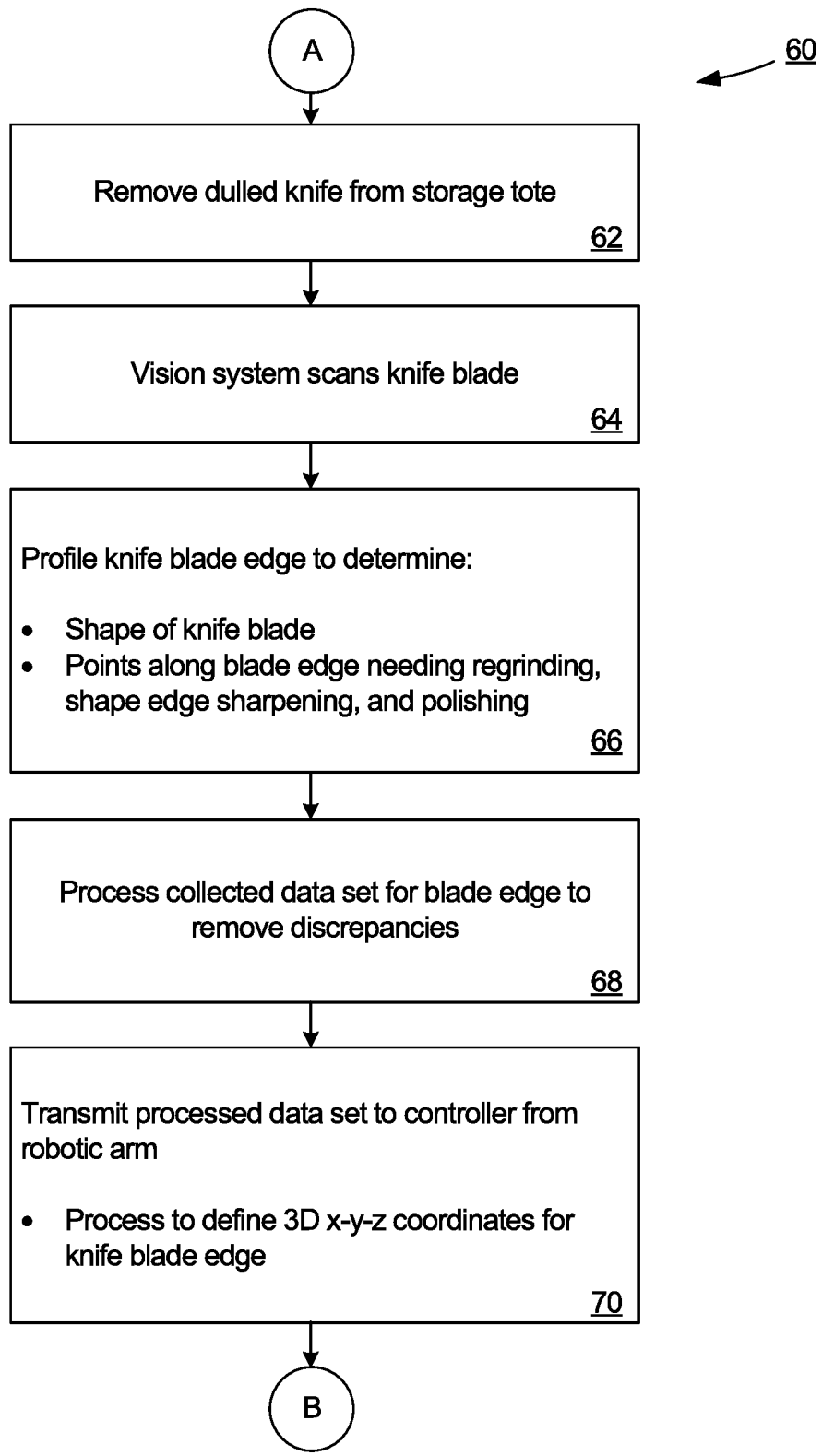
FIG. 5 is a flow diagram of the process steps for the automated knife sharpener system of the present invention.
Figure 5:
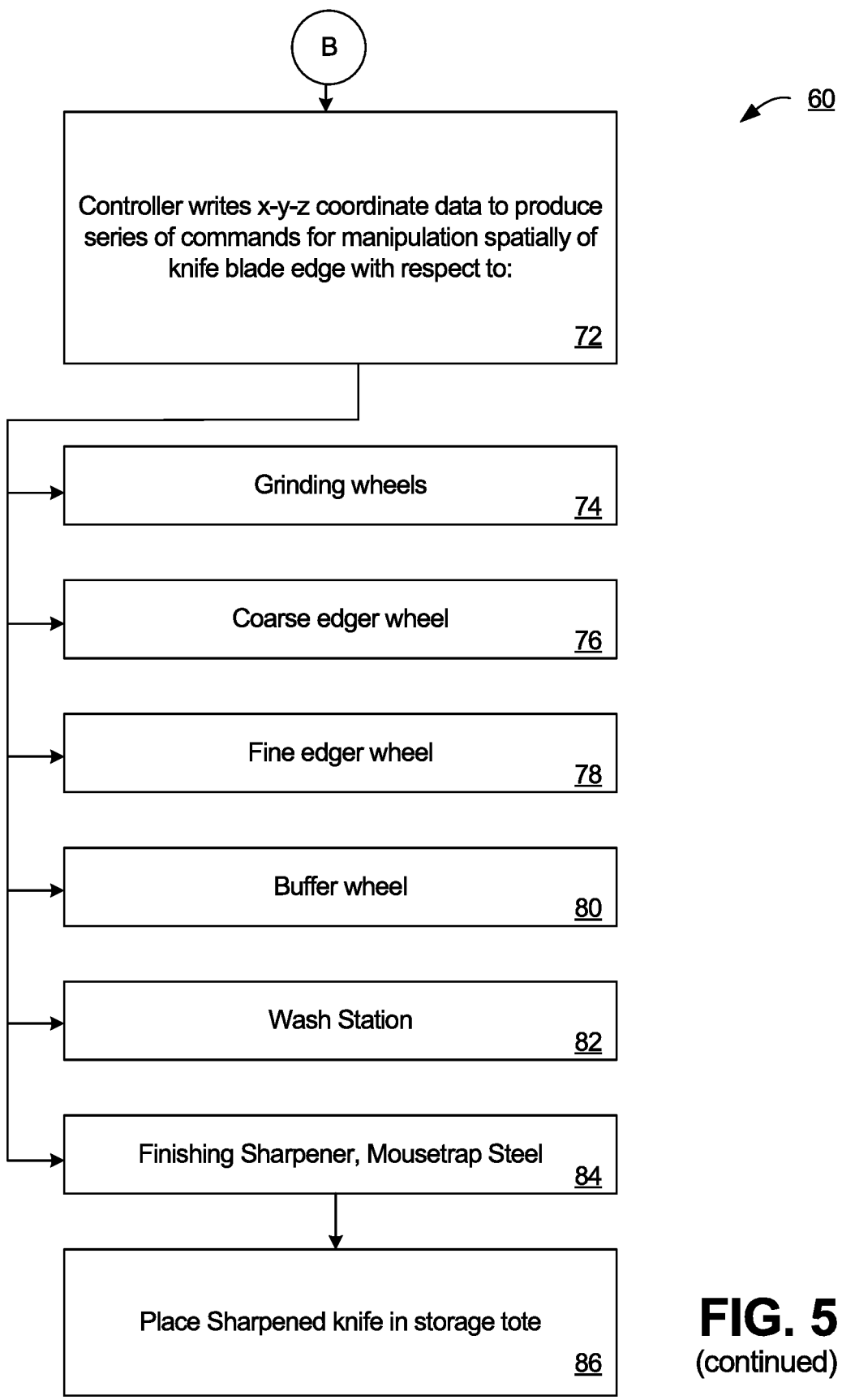

The process 60 for the automated hand tool sharpening and cleaning machine system of the present invention is shown more clearly in FIG. 5 for restoring a sharp cutting edge 28 to a knife blade 20. A series of grinding, sharpening, and buffing/polishing wheels and an optional finishing knife sharpener device are arranged sequentially for treating the cutting edge of the knife blade. A robotic arm with an attached pneumatic gripper is mounted to the machine and grasps the handle 22 of a dulled knife 10 and lifts it out of a storage tote (62). A two-dimensional vision system with a camera and software scans the knife blade (64). It creates a set of data points to profile the knife blade edge along 32 discrete points along the length of the blade to determine the shape of the particular knife blade, and points along the blade's edge(s) that need to be reground, sharpened, and polished (66). This collected data for the blade shape and edge condition should also be further processed to remove discrepancies (68) that might otherwise interfere with the smooth automated transit of the knife blade along the grinding, sharpening, and polishing wheels.

The resulting data points representing the profiled knife edge are then transmitted to a controller for the robotic gripper arm. Software associated with the robotic arm will define a three-dimensional set of x-y-z coordinates for the knife blade (70). This set of data is used by the controller to coordinate the mechanical manipulation by the robotic gripper arm of the movement of the knife blade edge with respect to the rotating grinding and sharpening wheels that are in a fixed position in space. The software will also control the manipulation of the knife blade by the robotic gripper arm at the proper angle relative to the rotating wheel for the grinding or sharpening operation.

First, after vision camera inspection of the knife blade, the robotic gripper arm moves the knife to the hollow grinding station (74). The knife blade will be drawn back and forth between the two contra-rotating hollow grinding wheels approximately ten seconds or longer as needed. The robotic arm manipulates and pivots the knife blade using the two-dimensional profile and resulting three-dimensional x-y-z coordinates during the grinding operation, so that the 32 reference points along the knife blade edge are always transverse to the rotating wheel edge. This accommodates the curvature of the blade. The robotic arm draws substantially the entire knife blade across the wheel, not discrete sections of the knife blade. By drawing the blade in a forward or backwards motion between two contra-rotating grinding wheels, the hollow grinder thins out the blade. This hollow grinding operation removes excess metal from the sides of the dull or damaged knife blade to thin out the blade nearest the cutting edge.

Second, the robotic gripper arm rotates the knife blade approximately 90° from a vertical alignment to an approximately horizontal alignment, and then moves the knife to the Edger's coarse sharpening wheel station (76). The Edger featuring the coarse sharpening wheel station (76) and a subsequent fine sharpening wheel station (78) is used by the operator to produce or restore the cutting edge back onto the knife blade. The robotic gripper arm draws the first side of the knife blade across the rotating Edger's coarse sharpening wheel one or two times while keeping the blade edge tangent to the wheel grinding surface. The robotic arm then rotates the knife blade by approximately 180° and flips it over to present the second (opposite) side of the knife blade to the coarse sharpening wheel, which is reversed in its rotational direction. This second side of the blade is drawn once or twice across the rotating coarse sharpening wheel while keeping the blade edge tangent to the wheel. In each case, substantially the entire knife blade is drawn across the rotating wheel. By rotating the blade by approximately 180° and flipping it over, and reversing the rotational direction of the coarse sharpening wheel, the rotational direction of the wheel is always into both sides of the blade. This coarse sharpening wheel acts to prepare the knife blade cutting edge by restoring or adding the correct angle to the cutting edges.

Third, the robotic gripper arm moves the knife to the fine-edge sharpening wheel (78). The process for drawing the first side of the blade across the rotating fine-edge sharpening wheel thrice, rotating the blade by approximately 180° and flipping it over, reversing the rotational direction of the fine edge sharpening wheel, and then drawing the second side of the blade across the rotating fine edge sharpening wheel is repeated. This fine-edge sharpening wheel acts to remove any metal burrs formed along the blade edge by the Edger coarse sharpening wheel, and creates the sharp edge along the knife blade cutting edge.

Fourth, the robotic griper arm moves the knife to the buffing/polishing wheel station (80). The Buffer provides a rotating felt wheel to remove any remaining pieces of metal along the sharpened knife blade edge, and smooth the cutting edge to remove any furrows (grooves) left behind by the Edger coarse sharpening wheel or fine edge sharpening wheel. The process described above for the rotating coarse sharpening wheel (76) and rotating fine edger sharpening wheel (78) is repeated to draw each side of the knife blade once or twice across the rotating buffing/polishing wheel (80).

Fifth, the robotic gripper arm optionally moves the knife to a washing station 82 where the knife is washed, scrubbed, or sanitized. Following the grinding and sharpening processes, the knife blade surfaces may contain small bits of detached metal that are left over from the operations of the grinding wheel or the sharpening wheels. Moreover, such sharpening processes usually rely upon a grinding or sharpening wheel made with small sand or diamond particles bonded to the wheel that rotates at a high speed that must be cooled by a water jet as the blade is applied against the rotating wheel in order to avoid damage to the blade. But, the sand or diamond particles may become detached from the wheel during the sharpening process to form a slurry with the cooling water and bonding agent that contaminates the blade. A buffing wheel used to polish the blade after grinding and sharpening commonly has "jewelers rouge" compound applied to it as a polishing medium. Thus, these metal bits, slurry, and jewelers rouge compound must be removed from the blade by a supplemental cleaning process before the knife or scissors can be used, especially in meat or food processing operations. Mere immersion of the knife or scissors in cleaning solution may be ineffective for separating s the metal bits from the blade surfaces. Furthermore, organic or inorganic contaminants like bacteria or bits of meat or other substrate materials that were on the knife before it was introduced to the automated knife sharpener system may reside on the knife or its blade. The washing station 82 provides a suitable environment for removing such organic and inorganic materials from the knife and its blade, and killing any bacteria that reside on such surfaces.

Sixth, the robotic gripper arm optionally moves the cleaned, scrubbed, or sanitized knife to a finishing sharpener station (84). A Mousetrap Steel or Stainless Mousetrap Steel device commercialized by Razor Edge Systems, Inc. of Ely, Minn., and disclosed by U.S. Pat. Nos. 4,934,110; 5,655,959; and 9,545,703, as well as U.S. Ser. No. 15/610,169, all of which are incorporated hereby in their entirety, may be used. The buffer/polisher wheel described above will typically yield a good cutting edge along the knife blade. But, there still may be microscopic imperfections existing along the knife blade. As described more fully within this Application, such a finishing sharpener device contains two criss-crossed sharpening steel rods and an optional wiper rod. By drawing the knife blade edge through a slot of the device, and keeping the blade perpendicular as it is drawn through the steels, any such microscopic imperfections caused by residual pieces of metal along the knife blade are removed to change the restored cutting edge to an ultimately desirable state.

The now sharpened knife is moved by the robotic gripper arm back towards the storage tote or another storage tote dedicated to the sharpened knives (86). The process of the robotic knife sharpening system is repeated for all of the additional dull knives in the starting tote one by one until the entire group of knives have their blades sharpened.

The process 60 produced by this robotic knife sharpening system will grind or sharpen substantially the entire cutting edge length of the knife blade, not just the specific spots along the knife blade that needed to be sharpened. The system retains the original factory shape of the cutting edge along the knife blade, but may utilize a different angle than the one produced at the factory, thereby resulting in an even sharper cutting edge. This system is fully automated, utilizing the robotic arm and vision system camera and analysis software to produce consistently reliably sharpened knife blade cutting edges at higher throughputs with less operator repetitive stress and other injuries compared with the prior art manually-operated knife sharpening devices or systems.

Figure 6:
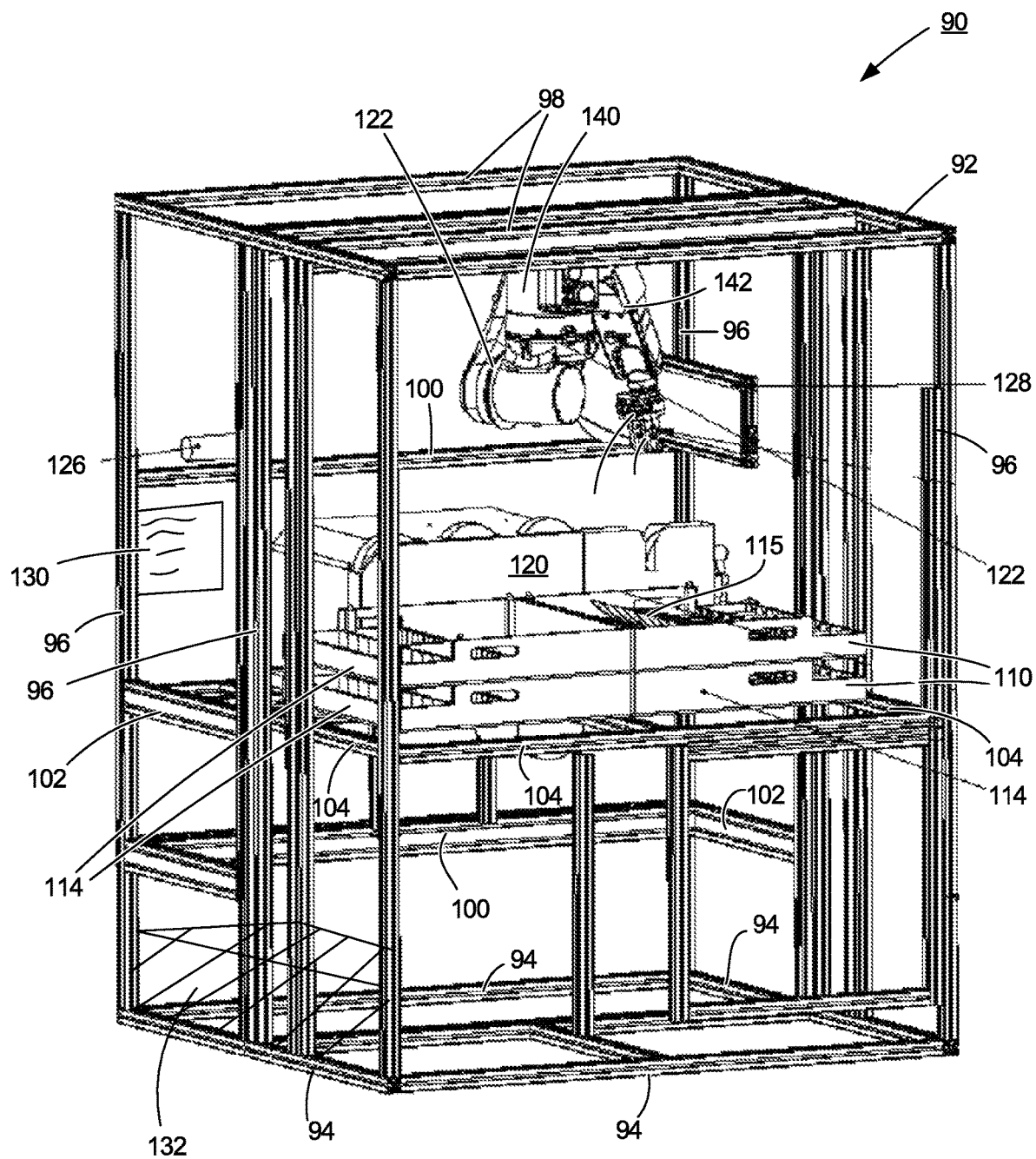
FIG. 6 is a perspective view of the automated knife sharpener system of the present invention.

The automated robotic knife sharpener system 90 of the present invention is shown in FIG. 6. It comprises an outer support frame 92 comprising bottom frame members 94, vertical frame members 96, top frame members 98, back brace members 100, and side brace members 102. Intermediate cross support members 104 form a platform 106 upon which the various components of the robotic knife sharpener system 90 can be mounted.

Mounted onto platform 106 is a knife tray 110 containing knives 112 with dulled blades. Beside it is positioned a second knife tray 114 containing knives 116 whose blades have been sharpened by the automated knife sharpener system 90. Positioned behind knife trays 110 and 114 is grinding wheel assembly 120. Mounted to top frame members 98 is a six-axis robotic arm 122 having a pneumatic gripper 124 connected to the end of the arm. A smart vision camera 126 is secured to one of the left-side vertical frame members 96 pointing to the interior of the outer frame support 92. A vision LED back light 128 is mounted to another vertical support frame near the right-side interior of the outer frame support. A touch screen 130 allows an operator to enter data for the knives 112 into the system, such as the number of knives 112 contained in dulled knife tray 110 that need to be sharpened, the type of knives, the desired angle of the cutting edge surfaces that should be imparted onto the knife blades, the number of times that the knife blade should be passed between or across the hollow grinding wheels, coarse sharpening wheel, fine sharpening wheel, buffing/polishing wheel, and the optional finish sharpener device of the grinding wheel assembly 120, whether the sharpened knife should be presented to the cleaning station, etc. Finally, a main controller system 132 contains the necessary computer components and software for controlling the operation of the different components of the automated robotic knife sharpener system 90, including the vision camera profiling system for defining in two dimensions the specific shape of the knife blade cutting edge, and the movement of the robotic arm in three dimensions for manipulation of the knife blade with respect to the grinding, sharpening, buffing, and polishing components of the automated robotic knife sharpener system 90.

Figure 7:
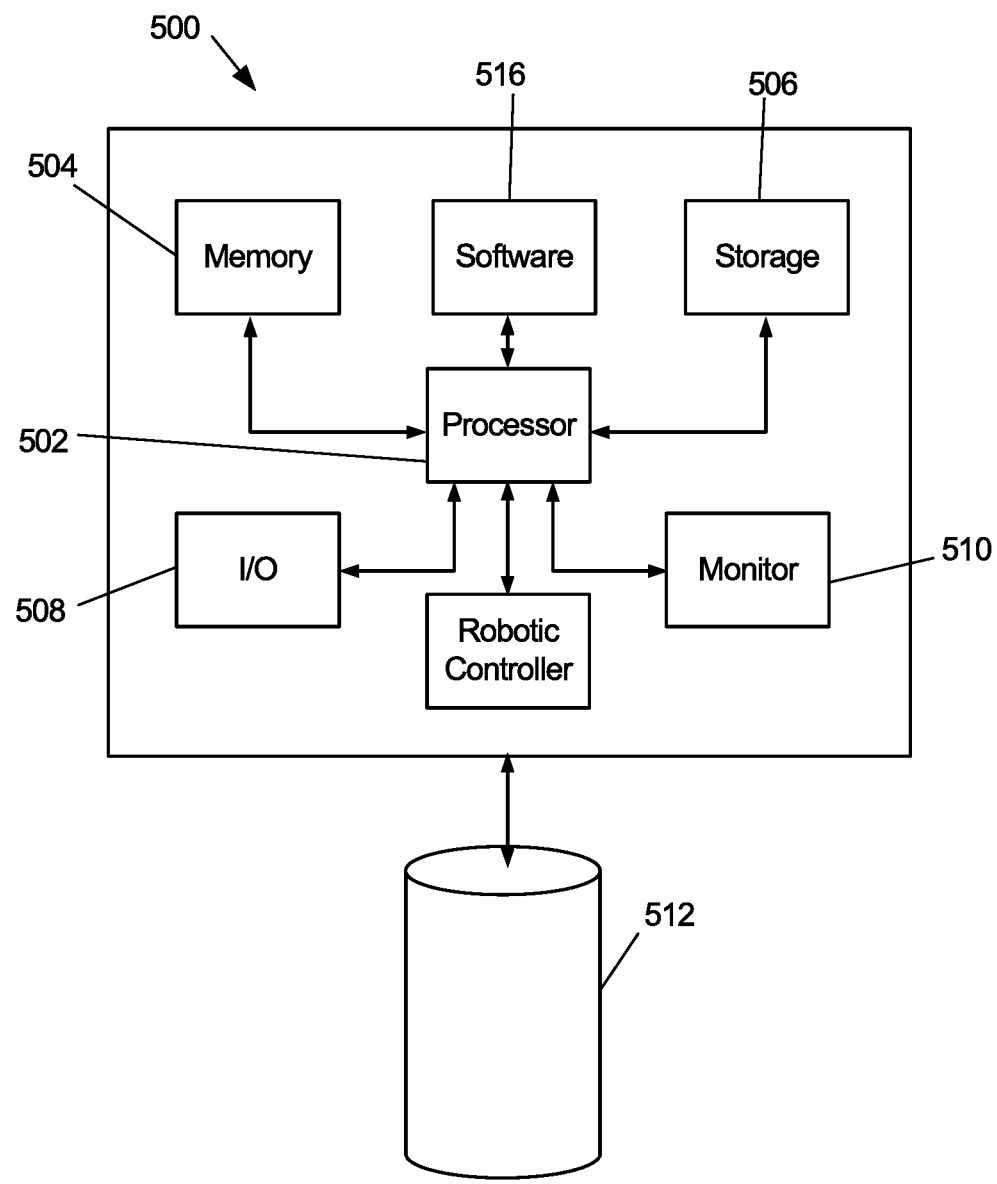
FIG. 7 is a schematic of the computer controller system for the automated knife sharpener system.

Referring to the example embodiment of FIG. 7, the main controller system 132 comprises a general programmable computer 500 having a central processing unit ("CPU") 502 controlling a memory unit 504 (e.g., RAM random-access memory chip, ROM read-only access memory chip) used to process information, an auxiliary memory storage unit 506 such as CD-ROMS or a UBS flash drive, an input/output ("I/O") control unit 508, and at least one touch screen monitor 510. Computer 500 operatively connects to main memory storage device 512 (e.g., a hard drive database), containing, e.g., data for different types of knives, their cutting edge angles, and the data that is inputted into the system by the operator via the touch screen monitor, including the number of knives contained in the dulled knife tray 110 that need to be sharpened, the specific type of knives to be sharpened, the specific desired angle of the cutting surfaces that should be imparted onto the knife blades, and the number of times that the knife blade should be passed between or across the hollow grinding wheels, coarse sharpening wheel, fine sharpening wheel, and buffing/polishing wheel of the grinding wheel assembly 120 and the optional finish sharpener device. It may also include clock circuitry, a data interface, a network controller, and an internal bus. One skilled in the art will recognize that other peripheral components such as printers, drives, keyboards, mice, bar-code scanners, and the like can also be used in conjunction with the programmable computer 500. Additionally, one skilled in the art will recognize that the programmable computer 500 can utilize known hardware, software, and the like configurations of varying computer components to optimize the storage and manipulation of the data and other information contained within the controller system 132. This computer system can be located on premise at a facility, or in a hosted environment through, e.g., the Internet.

The main controller system 132 is also linked to the robotic controller 144 which will be described more fully below. In this manner, the data points processed by the main controller system 132 for the knife 112 that is to be sharpened is further processed by the robotic controller 144 to produce the necessary machine control commands for moving the robotic arm that is gripping the knife in three-dimensional space so that the knife blade may be quickly and accurately maneuvered along substantially its entire length along the grinding, sharpening, and buffing/polishing wheels and devices to sharpen the knife blade, and with respect to the wash station to clean, scrub, and sanitize the knife blade.

Referring to FIG. 7, the computer of the main controller system 132 includes a software program 516 having a plurality of graphic user interfaces ("GUIs") that permit the input of data concerning the number of dulled knives that need to be sharpened, their specific type or manufacture, their general condition, the desired angle of the cutting edges, the number of times that the knife blade should be passed between or across the grinding, sharpening, and buffing wheels, etc. Outputs produced by such software program 516 include digital images produced by the vision camera 216, the cutting edge profile curve 176 generated for the knife blade, and its generated corrected profile curve 180, as described in more detail below, which are transferred along with the grinding parameters entered by the user to the robotic controller 144. The software program 516 can also produce and print a series of reports documenting this information.

Computer-aided manufacturing ("CAM") typically uses software to control machine tools for conducting machining operations upon a work piece. Computer numerical control ("CNC") systems automate such machine tools typically within a two-dimensional or three-dimensional work environment by means of computers that execute pre-programmed sequences of machine control commands. The work piece's mechanical dimensions are defined by computer-aided design ("CAD") software, while CAM software then translates such data into the specific commands necessary for the machine tool to produce the desired component from the work piece. CNC systems are widely used for industrial milling, drilling, cutting, lathing, and routing operations.

But robotic arms have also been used within manufacturing operations. First used in 1962 by General Motors to achieve difficult welding tasks for automotive assembly, they can also be employed to grab an object, hold it, and transfer it just like a human arm. Thus, the robotic arm 122 for the automated robotic hand tool sharpening and cleaning system 90 should be mounted at one end of its housing 140 to the outer frame housing 92, in this case one or more of the top support frames 98. An articulated arm 142 extends from the housing 140 and is moved along six axes (x-y-z plus rotation along each of the x, y, and z axes). Programmable software code associated with a robotic controller 144 moves the articulated robot arm 142 in a controlled manner. Attached to the end of the articulated arm is a gripper 146. This gripper is pneumatically operated, and designed to squeeze the knife 112 by its handle, pick it up from dulled knife tote 110, move the knife precisely between the different knife blade sharpening and cleaning operations, and return the now sharpened and cleaned knife to its slot in the dulled knife tray 110, or to a slot in the sharpened knife tray 114. Air lines 148 deliver pressurized or compressed air to the pneumatically-operated gripper mechanism 146 as operated by internal pneumatic solenoids contained inside the articulated arm 142.

While a number of different robotic arms are commercially available in the industry, the US-6577-B six-axis robotic arm manufactured by Denso Robotics of Kariya, Aichi Prefecture, Japan is preferred for purposes of the automated knife sharpener system 90. A Denso Robot Controller RC8 is used to control the movements of the robot 122 and its articulated arm 142 and pneumatic gripper 146.

Figure 8:
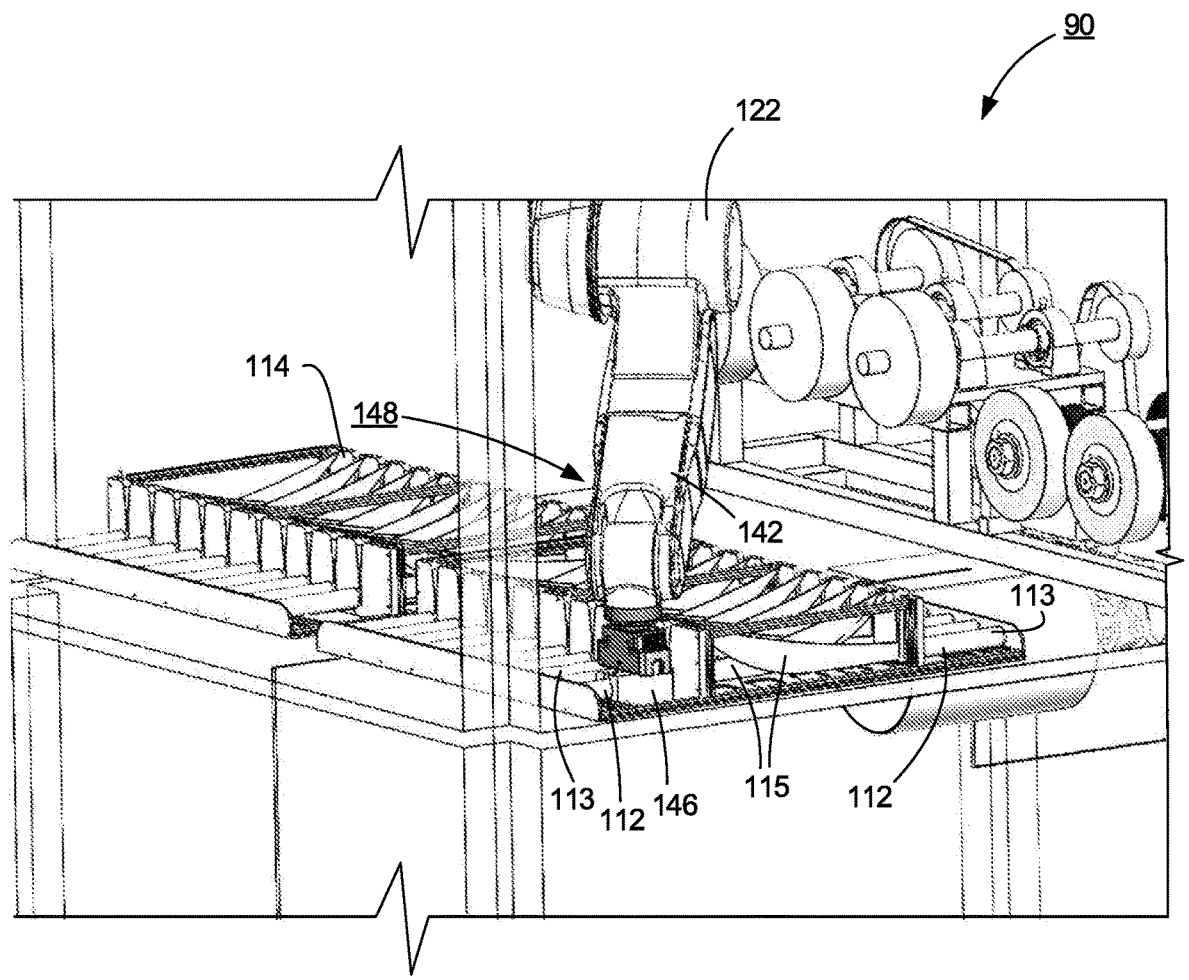
FIG. 8 is perspective view of the robotic arm of the automated knife sharpener system picking up a dulled knife from a storage tote.

As shown in FIG. 8, a plurality of knives 112 are stationed in the dulled knife trays 110 that are palletized within the robot enclosure 92. The knives may be vertically stored in the tray with the handle up ready to be grasped by the gripper 146 on the end of the articulated robot arm 142. But the plurality of knives 112 is preferably stored in a horizontal alignment to save space within the trays 110. The knives are preferably stored with their handles 113 pointing to the left and right in alternating alignment and their blades 115 pointing towards the center of the tray.

The robot arm 122 is programmed to move from the home position shown in FIG. 6 to the dulled knife tray position shown in FIG. 8. The gripper 146 picks up the handle 115 of the knife 112 one at a time from these trays 110. When the knife is sharpened and deposited in the sharpened knife tray 114 by the robotic arm 122, the robotic arm is then automatically indexed to pick up the next dulled knife 112 at the next location in the dulled knife tray 110, and repeat the process again.

Figure 9:
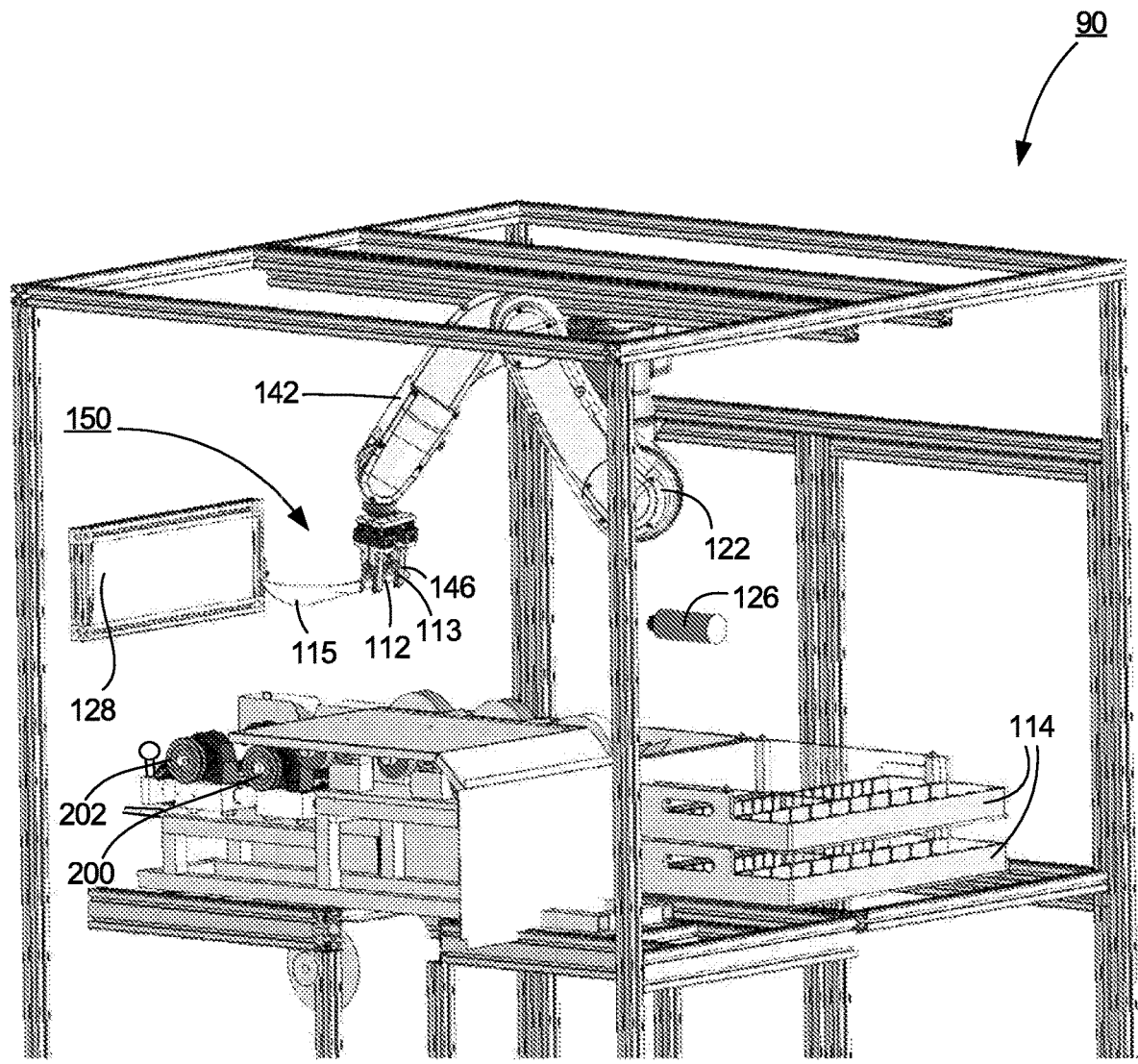
FIG. 9 is a perspective view of the robotic arm presenting the gripped knife blade to the sensor camera for profiling.
Figure 10:
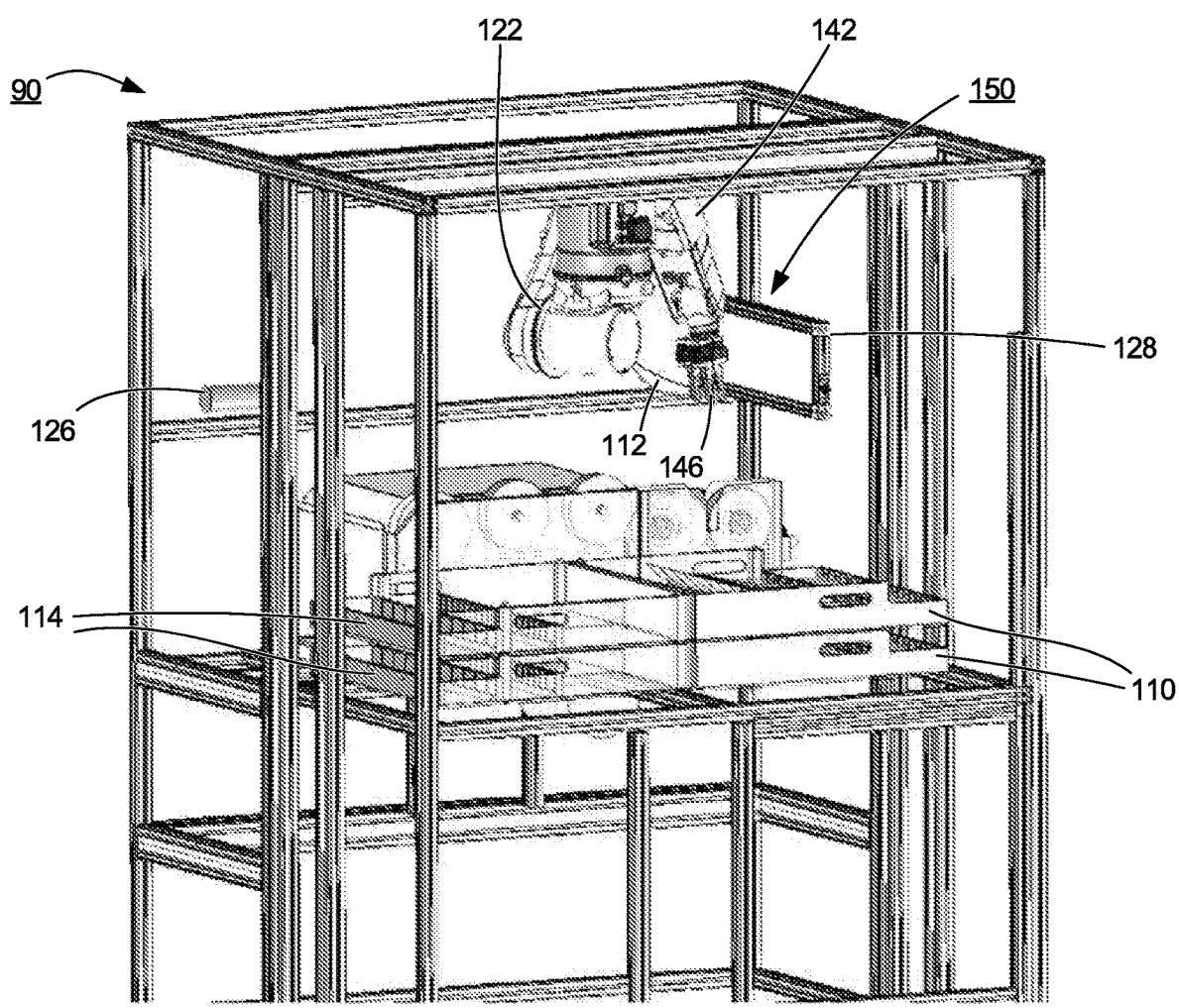
FIG. 10 represents a different view of the robotic arm presenting the gripped knife blade to the sensor camera for profiling.

Following grasping the handle 113 of knife 112, the robotic arm 142 pivots the horizontally-disposed knife by 90° to lift it straight up. It then transfers the knife to the vision system station 150 while turning it by 90° to return it to a horizontal position once again to present the knife in front of vision LED backlight 128 for blade profiling, as shown in FIGS. 9-10. In this position, the horizontally-disposed knife blade 115 will be in front of smart vision camera 126, and back lit by LED light 128. Because the knife tray 110 and the camera 126 and LED back light 128 of the vision system station 150 are fixed in space, appropriate coded machine commands can be preprogrammed into the robotic controller 144 for quickly and accurately transporting the knife 112 from the knife pick up station 148 to the vision system station 150 within three-dimensional space.

The smart vision camera 126 takes a digital image 151 of the blade 115 of the horizontally-disposed knife 112 held by the robotic arm 142. The back light provided by LED lamp 128 ensures that the digital image is sharp, distinctly depicting the knife blade 115. Many different types of smart vision cameras are known within the industry, but the Omron SQ2 two-dimensional vision camera is preferred.

Figure 11A:
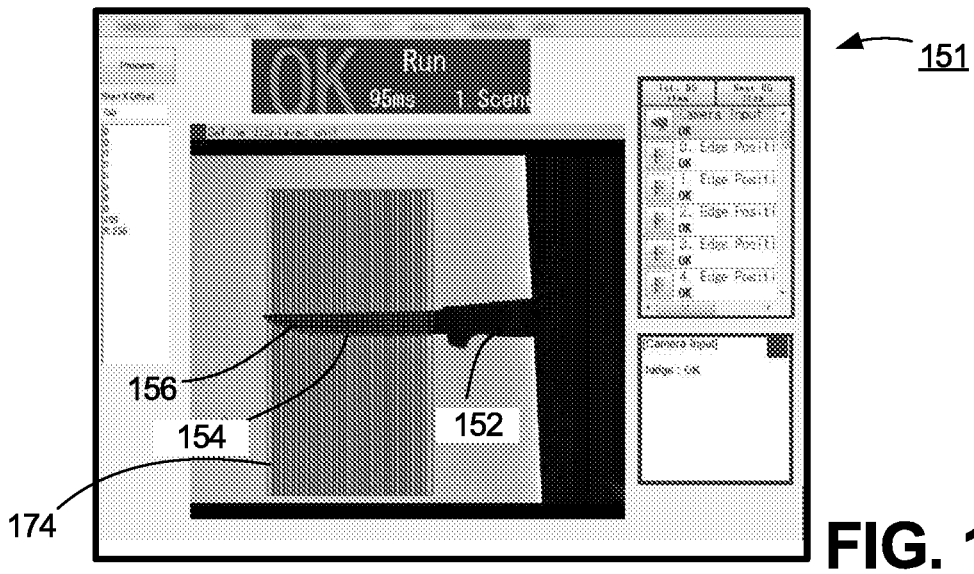
FIGS. 11A-11C represents computer screen images of the profiled blades of three different types of knives.
Figure 11B:
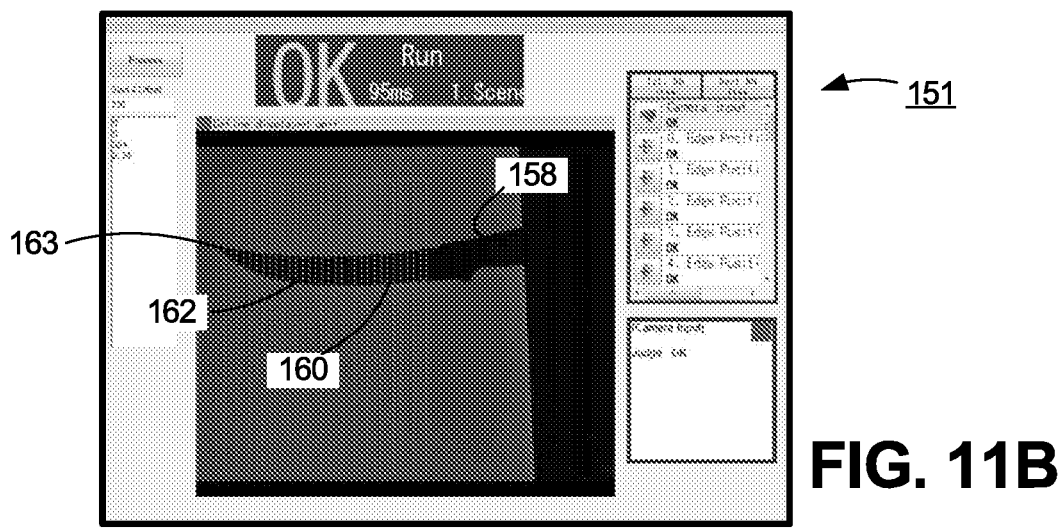
Figure 11C:
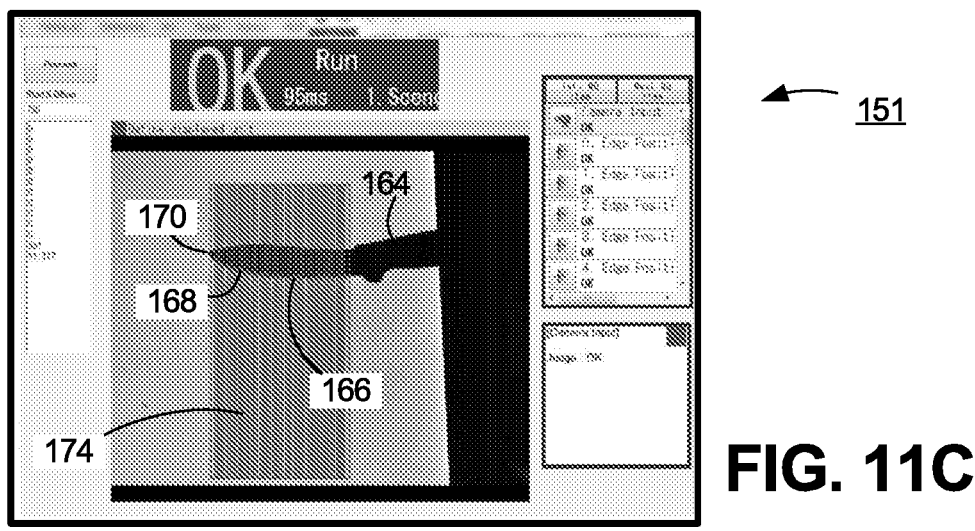

FIGS. 11A-11C represent digital images of three different types of knives 112. Knife 152 shown in FIG. 10A has a relatively straight bottom edge 154 along the blade 156. Meanwhile, knife 158 shown in FIG. 10B has a more curved bottom edge 160 along the blade 162 with a sharp tip 163. Finally, knife 164 shown in FIG. 10C bears a curved bottom edge 166 along the blade 168 with a blunt tip 170. In order for the automated knife sharpening and cleaning system 90 to properly sharpen the cutting edges of the knife, it is important for the system to determine what type of knife is to be sharpened along with the specific contour of the cutting edge.

The camera 126 and its associated programming software therefore projects a series of parallel lines 174 on top of the digital image 151 of the knife blade 162. These parallel lines should preferably be vertically transposed as shown in FIGS. 11A-11C. All of the vertical lines 174 that are transposed upon the knife blade should fall between the tip of the knife blade and its heel where the blade joins the handle. The number n of lines 174 will preferably vary depending upon the length and shape of the knife blade 162. It has been found that the value of n should lie within the range 10-40.

Figure 12:
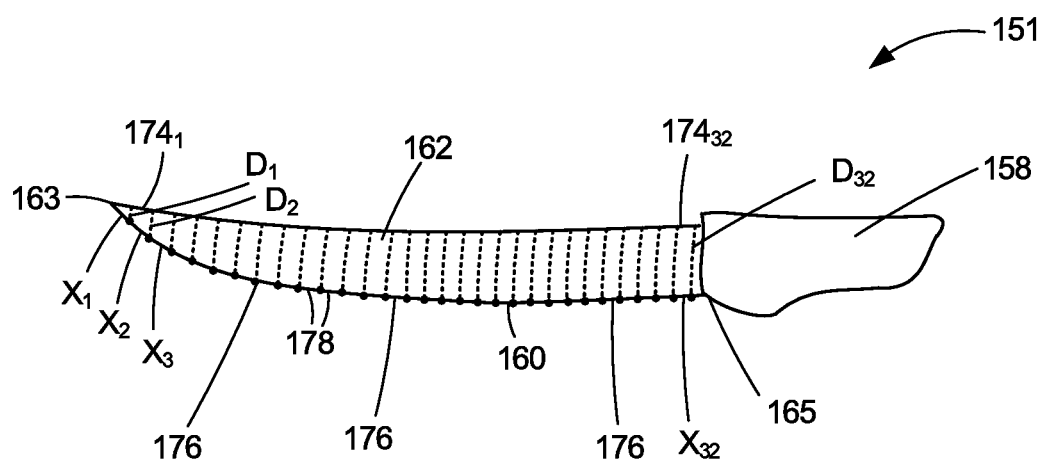
FIG. 12 represents a schematic view of profiled image of the knife blade defining multiple points along the blade cutting edge to define the shaped profile of the blade.

As shown more clearly in FIG. 12 depicting knife 158 shown in FIG. 11B, the vertically transposed lines $174_1$, $174_2$, $174_3$ . . . $174_n$ are positioned between the knife tip 163 and knife heel 165. These lines, in turn, define n associated points $X_1, X_2, X_3 \ldots X_n$ along the cutting edge 160 of the knife 158. These points are evenly spaced and automatically distributed along the cutting edge of the knife.

The software then takes these points $X_1, X_2, X_3 \ldots X_n$ and plots a curve 176 along the knife blade edge 160 by stitching a line 178 from point to point. This curve 176 defines the specific cutting edge 160 of the knife 158, and creates the specific path for the sharpening motion that will be required for moving the cutting edge between the hollow grinding wheels 100, 102 and along the Edger coarse sharpening wheel 212, the Edger fine sharpening wheel 214, the buffing wheel 232, and the optional finish sharpener 260, as described below. The points are defined in two-dimensional space in terms of their distance $Z_1$, $Z_2$, $Z_3$ ... $Z_n$ from a reference line, such as the top edge of the knife blade (or an alternative reference line, called a "Golden Rule," if the blade does not have a straight top edge along the blade), and that respective point's distance from the heel of the knife blade (i.e., the $X_1$, $X_2$, $X_3$ ... $X_n$ values) with the gap width G between any two particular points being influenced by the length of the knife blade.

By analyzing the profile of the cutting edge 160 of the knife blade 162 in this manner, the resulting profile curve 176 defined by the software matches pretty exactly the actual curvature of the knife blade's cutting edge. In some cases, however, this methodology for producing the profile curve 176 for the knife 158 from the smart vision digital image 151 may be too exact, because it will in reality pick up the imperfections existing along the knife blade cutting edge that caused its dullness. These resulting imperfections transferred to the produced profile curve 176 would cause the robotic arm 142 to wobble the knife blade as it is passed along the grinding and sharpening wheels, because the profile curve 176 is used to produce the specific machine commands used to inform the robotic arm gripping the knife handle for how properly to pass the cutting edge along the grinding and sharpening wheels in three-dimensional space.

Therefore, an important aspect of the invention involves applying a filtering technique to the (Z, X) data set defining the knife blade profile curve 176 originally produced by the vision system camera and the associated software. This filtering technique utilizes a fourth or fifth-degree polynomial equation to apply the polynomial fit (least squares) methodology previously used in the electrical engineering industry to smooth out the irregularities ("noise") that may characterize the (z, x) data set defining the knife blade profule curve 176.

In the case of a fourth-degree polynomial, the following equation is used:

$$Z = C_1 X^4 + C_2 X^3 + C_3 X^2 + C_4 X + C_5$$

This represents a more idealized curve fitted between the data points defined by the (Z, X) data set resulting from the vision system camera and associated software described above. The values for the constants $C_1$, $C_2$, $C_3$, $C_4$, and $C_5$, in turn, are calculated by the polynomial (lease squares) methodology. See the article www.bragitoff.com/2015/09/c-program-for-polynomial-fit-least-squares for a computer program that will calculate these constants for any chosen degree of polynomial equation. Once the constants are calculated, and plugged back into the $$Z = C_1 X^4 + C_2 X^3 + C_3 X^2 + C_4 X + C_5$$

equation, the resulting idealized curve has been found to resemble more closely the actual curved profile of the manufactured knife blade 162. Once this corrected curve profile curve 180 for the cutting edge 160 of the knife blade is then translated by the robotic controller 144 into the series of machine commands, the robotic arm will manipulate the blade of the knife smoothly and accurately as it is passed along the grinding wheel, sharpening wheel, polishing wheel, and finish sharpener to restore the correct cutting edge along the length of the knife blade at the angle selected by the operator without the wobble by the programmed robotic arm that would otherwise interfere with the process.

Normally, a fourth or fifth degree polynomial equation characterizes a wavy curve that does not resemble the curvature of a knife blade. But, it has been found surprisingly that for a limited data set number (e.g., n=10-40), the resulting curve defined by the polynomial equation correction of the data set using the least squares methodology still resembles the curvature of a knife blade.

For some lengths and types of a knife blade, a fifth degree polynomial-based least squares methodology may be preferred for purposes of this invention. However, it has been found that a fourth degree polynomial equation works best for most types and lengths of knife blades.

Next, the robotic arm 142 uses the resulting machine commands produced by the robotic controller 144 to transport the knife from the vision system station 150 to the hollow grinding station 190. Because the knife was held horizontally by the robot arm 142 in front of the vision camera 126 and back light 128, this entails moving the knife in three-dimensional space to present the blade to the hollow grinding wheels of the grinding wheel assembly 120, as shown in greater detail in FIGS. 13-14.

Figure 13:
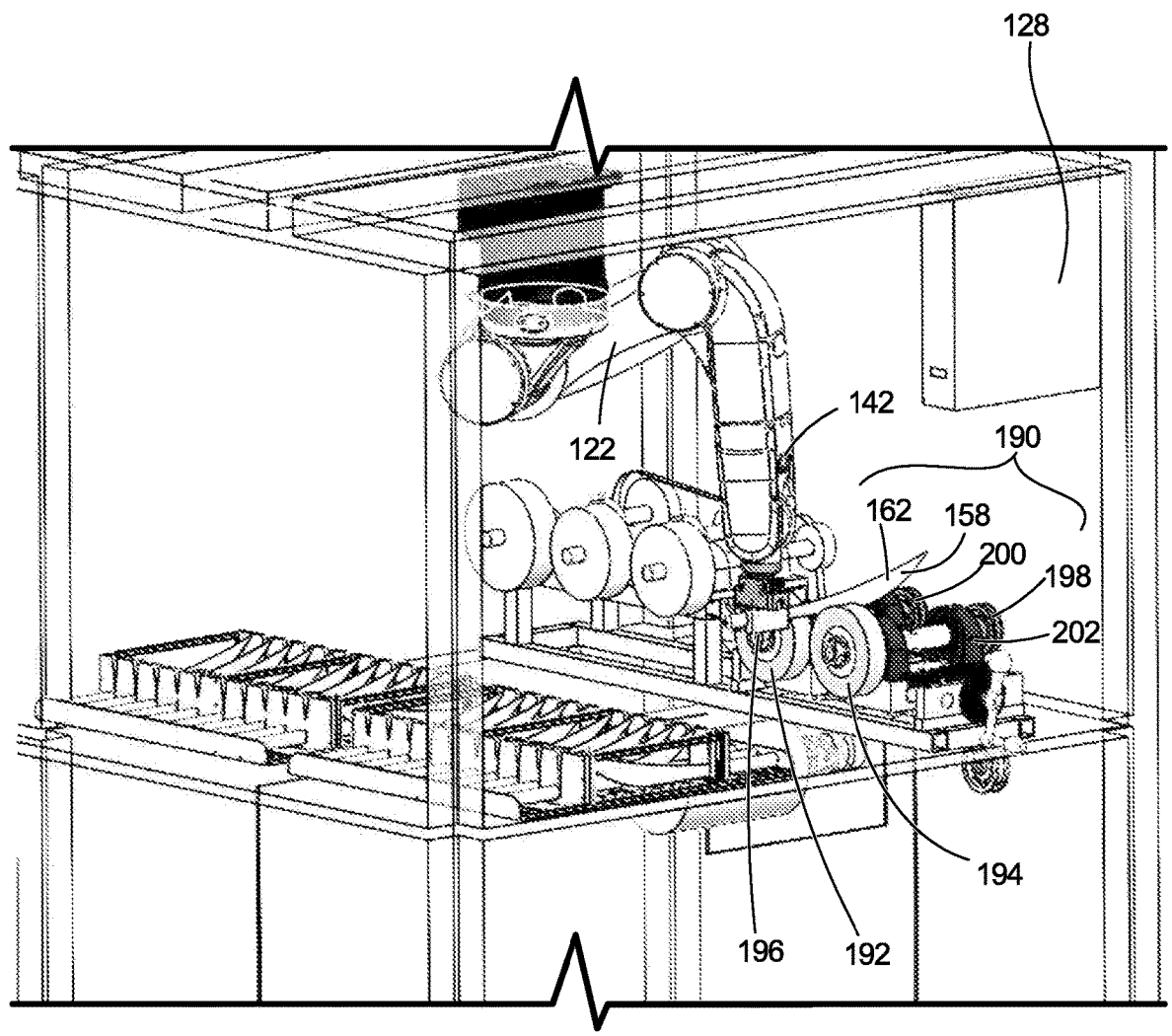
FIG. 13 is a perspective view of the robotic arm manipulating and drawing the gripped knife blade between the contra-rotating grinding wheels at an early stage of the drawing process.
Figure 14:
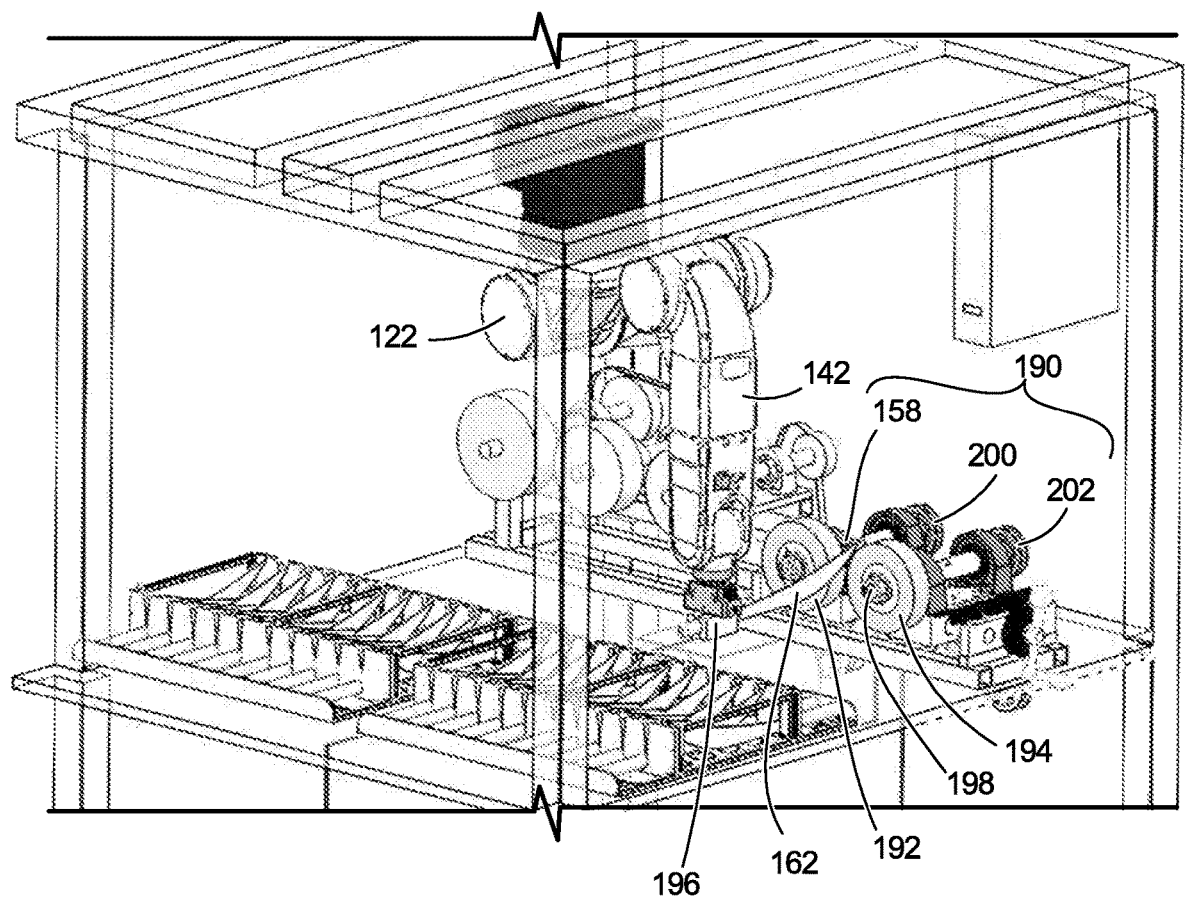
FIG. 14 is a perspective view of the robotic arm manipulating and drawing the gripped knife blade between the contra-rotating grinding wheels at a late stage of the drawing process.

Two grinding wheels 192 and 194 are mounted onto axles 196 and 198 that are driven by two drive wheels 200 and 202 (see FIG. 13) and an associated motor (not shown), the operation of which is regulated by main controller 132. Two drive wheels are required because hollow grinding wheels 192 and 194 are driven independently in opposite (contra) directions. As shown in FIGS. 13-14, the left grinding wheel 192 will be rotated in a clockwise direction, while the right grinding wheel 194 will be rotated in a counterclockwise direction. In this manner, the grinding wheels are rotated towards each other.

The robotic arm 142 holding the knife 158 will move the knife blade 162 forwards and backwards within the gap between the two contra-rotating grinding wheels 192 and 194 a predetermined number of times set by the user. The knife blade is maintained in a perpendicular orientation to the grinding wheels, so that the two contra-rotating grinding wheels can simultaneously treat the opposing sides of the blade to remove excess metal from the sides of the dulled knife blade and thin out the blade. Substantially the entire length of the knife blade is passed forward and backwards between the contra-rotating grinding wheels 192 and 194, instead of just the portions of the blade cutting edge that need to be sharpened. The time period during which the knife blade 162 is treated by the grinding wheels will depend upon the width and condition of the blade. The time duration should preferably be about five to twenty seconds, more preferable about ten seconds.

The grinding wheels 192 and 194 comprise a wheel made from a composite material formed from course particle aggregate pressed and bonded together by a cementing bond matrix to produce a solid, circular shape. The wheel may also be made from a solid steel or aluminum disc with particles bonded to the surface. The abrasive aggregate particles may comprise aluminum oxide, silicon carbide, ceramic, industrial diamond, or cubic boron nitride ("CBN"). For purposes of the grinding wheels 192 and 194, the abrasive aggregate particles are preferably aluminum oxide composite, having an average physical size ("grit" or "grain") of about 60-120 grit, preferably about 80 grit. The "wheel grade" characterizing how tightly the bond retains the abrasive aggregate particles before they break away due to wear and tear during the coarse sharpening process should be Q to Z. Finally, the "grain spacing" characterizing the density ratio of bond and abrasive particles to air space in the composite wheel structure should be about 1 (densest)-17

(least dense). For purposes of the present invention, suitable grinding wheels 192 and 194 may be sourced in the form of Hollow Grinder Wheels (Part No. 1-2-WCHD) from Razor Edge Systems, Inc. of Ely, Minn.

Figure 15:
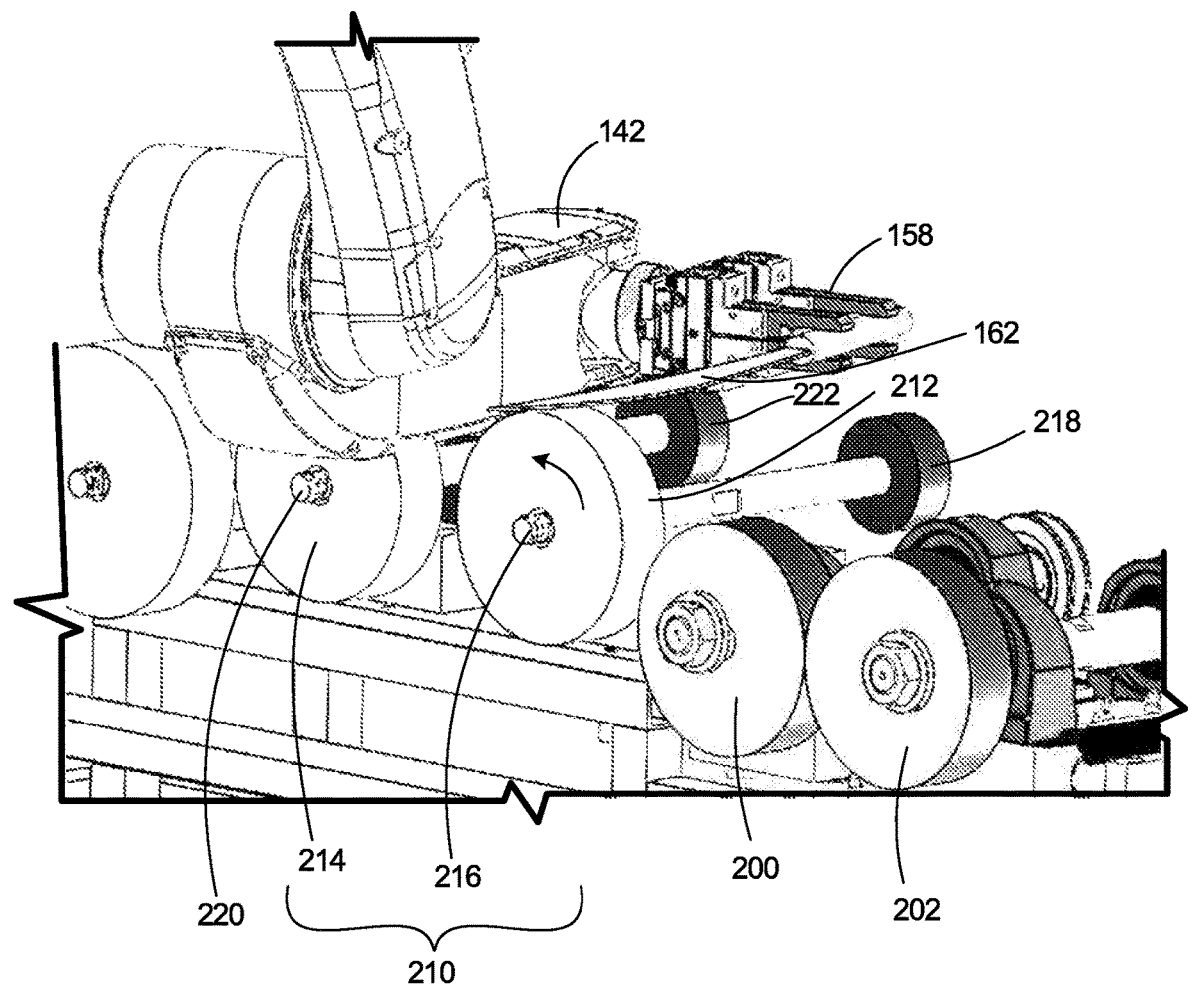
FIG. 15 is a perspective view of the robotic arm manipulating and drawing the first edge of the gripped knife blade across the rotating coarse sharpening wheel.

Next, the robotic arm 142 transports the knife 158 to the Edger sharpening station 210. This comprises both an Edger coarse wheel 212 and an Edger fine wheel 214 downstream of it, as shown in FIG. 15. The Edger coarse wheel 212 is mounted to an axle 216 with a drive wheel 218 mounted to its other end. The Edger fine wheel 214 is mounted to an axle 220 with a drive wheel 222 mounted to its other end. The drive wheels 218 and 222 may be driven independently by separate motor drive wheels (not shown) and associated belt drives (not shown). Alternatively, a motor drive wheel may operate, e.g. the drive wheel, of the Edger coarse wheel 212 with a separate belt used to move the Edger fine wheel 214 in tandem with the Edger coarse wheel 212.

Figure 16:
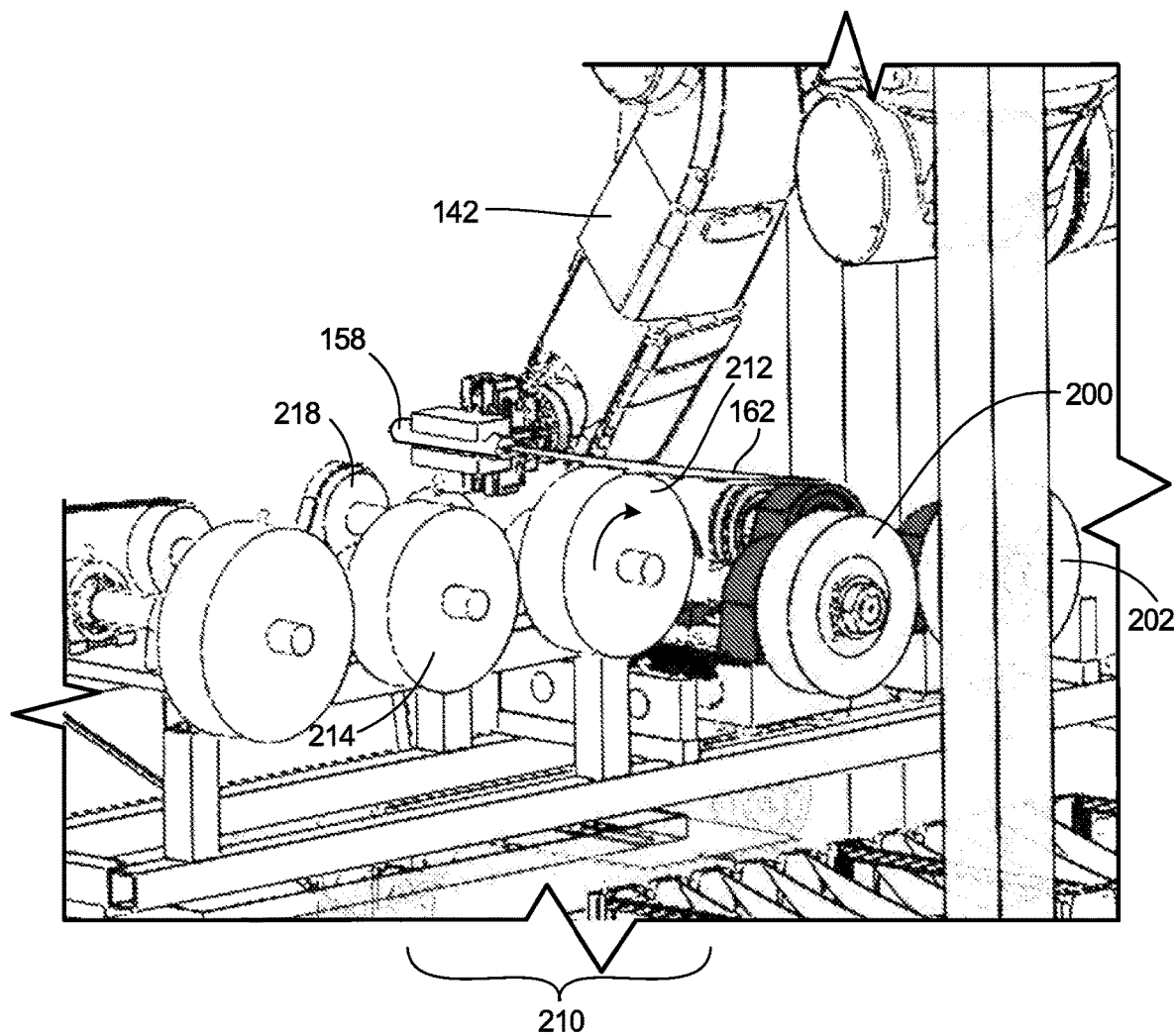
FIG. 16 is a perspective view of the robotic arm manipulating and drawing the second edge of the gripped knife blade across the rotating coarse sharpening wheel with the wheel rotated in the opposite direction.

As shown in FIG. 16, the knife 158 is turned 90° by the robotic arm 142 so that the blade is horizontally disposed. The first (bottom) cutting edge of the knife blade 162 is drawn a predetermined number of times substantially along its entire length across the Edger coarse wheel 212 from the backside of the wheel, while keeping the blade cutting edge tangent to the rotating wheel at the desired cutting edge angle inputted by the operator. At the same time, the robotic arm 142 will turn the knife in a horizontal plane along the corrected curve profile 180 of the knife blade in order to maintain the cutting edge 160 in contact with the rotating Edger coarse wheel 212 along its length to ensure that the bottom blade cutting edge is correctly sharpened while accommodating the specific curved edge profile of the blade. The Edger coarse wheel 212 is rotated in a counterclockwise direction into the blade cutting edge. While the number of times that the knife blade is drawn backwards across the rotating wheel may vary due to the type and condition of the blade, once or twice is preferred.

Following the coarse sharpening of the bottom cutting edge of the knife blade 162, the robotic arm 142 is preprogrammed to rotate the knife 180° in a vertical plane so that it is flipped over to present the second (top) cutting edge (now the bottom cutting edge) to the Edger coarse sharpening wheel 212. At the same time, the direction of the rotating coarse sharpening wheel is reversed to a clockwise direction so that the wheel still spins into the flipped-over blade. The process is repeated with the knife blade 162 being drawn the predetermined number of times along substantially its entire length across the rotating Edger coarse wheel 212, while keeping the blade tangent to the rotating wheel at the desired cutting edge angle imputted by the operator, and turning the knife in a horizontal plane to follow the corrected profile curve 180 for the knife blade cutting edge as it is drawn across the rotating wheel. In this manner, the opposite cutting edge of the knife 158 is sharpened. This coarse sharpening wheel 212 acts to return the correct cutting edge angle to both sides of the knife blade.

The Edger coarse sharpening wheel 212 preferably comprises CBN aggregate particles. It preferably has a grit or grain size of about 120-160 grit, a wheel grade of about I to P, and grain spacing of about 1-17. For purposes of the present invention, a suitable Edger coarse sharpening wheel 214 may be sourced in the form of CBN Coarse Wheels (Part No. 1-2-WEC12) from Razor Edge Systems.

Figure 17:
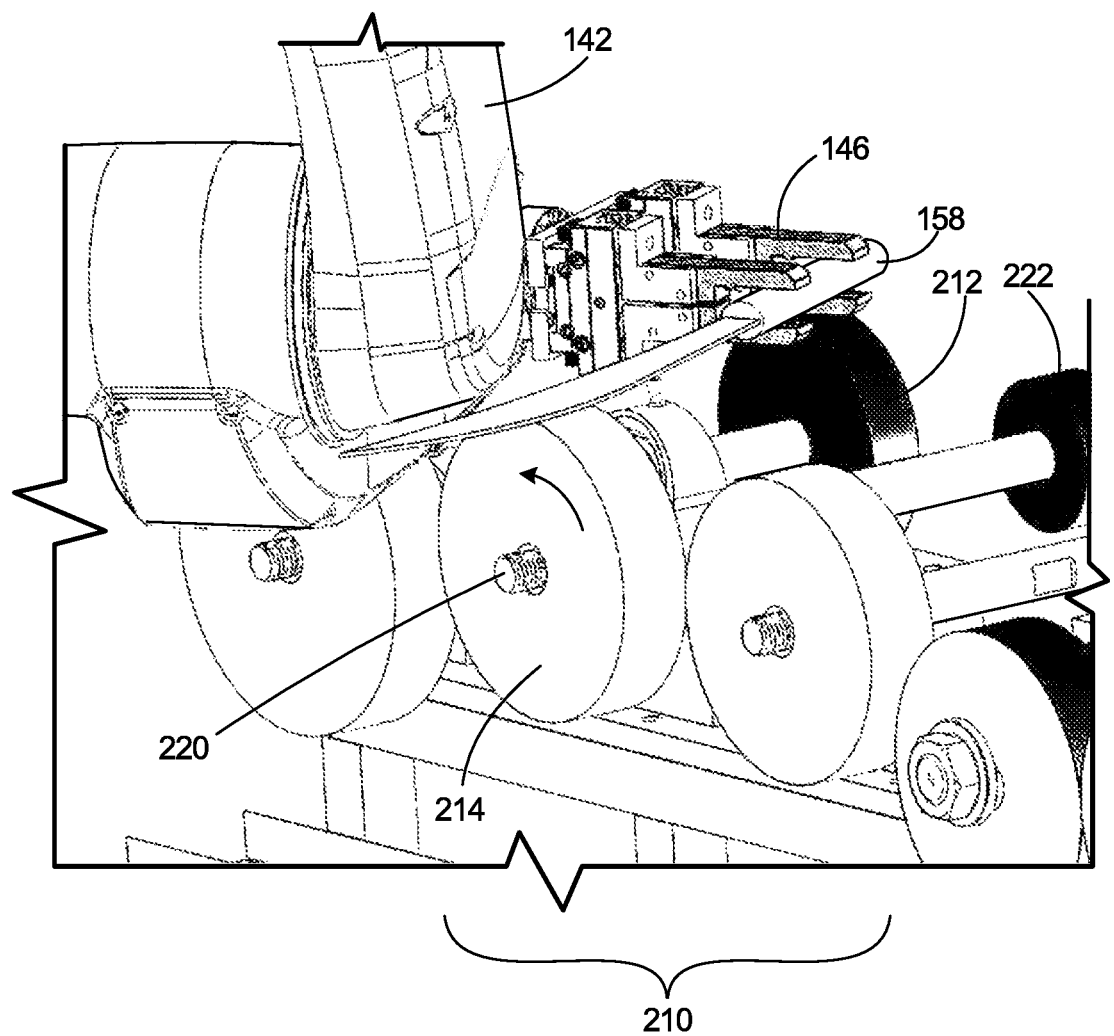
FIG. 17 is a perspective view of the robotic arm manipulating and drawing the first edge of the gripped knife blade across the rotating fine sharpening wheel.

The robotic arm 142 then transports the knife 158 to the Edger fine sharpening wheel 214, which is rotated about axle 220. The knife 158 is turned 180° by the robotic arm 142 so that the original (first) bottom cutting edge is once again on the bottom. The blade is still horizontally disposed. As shown in FIG. 17, this first (bottom) cutting edge of the knife blade 162 is drawn a predetermined number of times across the Edger fine wheel 214 from the backside of the wheel, while keeping the blade cutting edge tangent to the rotating wheel. At the same time, the robotic arm 142 will turn the knife in a horizontal plane while the corrected curve profile 180 of the knife blade is drawn across the rotating Edger coarse wheel 212 to ensure that the bottom blade edge is correctly sharpened while accommodating the specific curved edge profile of the blade. The Edger fine wheel 214 is rotated in a counterclockwise direction into the blade cutting edge. While the number of times that the knife blade is drawn backwards across the rotating wheel may vary due to the type and condition of the blade, once or twice is preferred.

Figure 18:
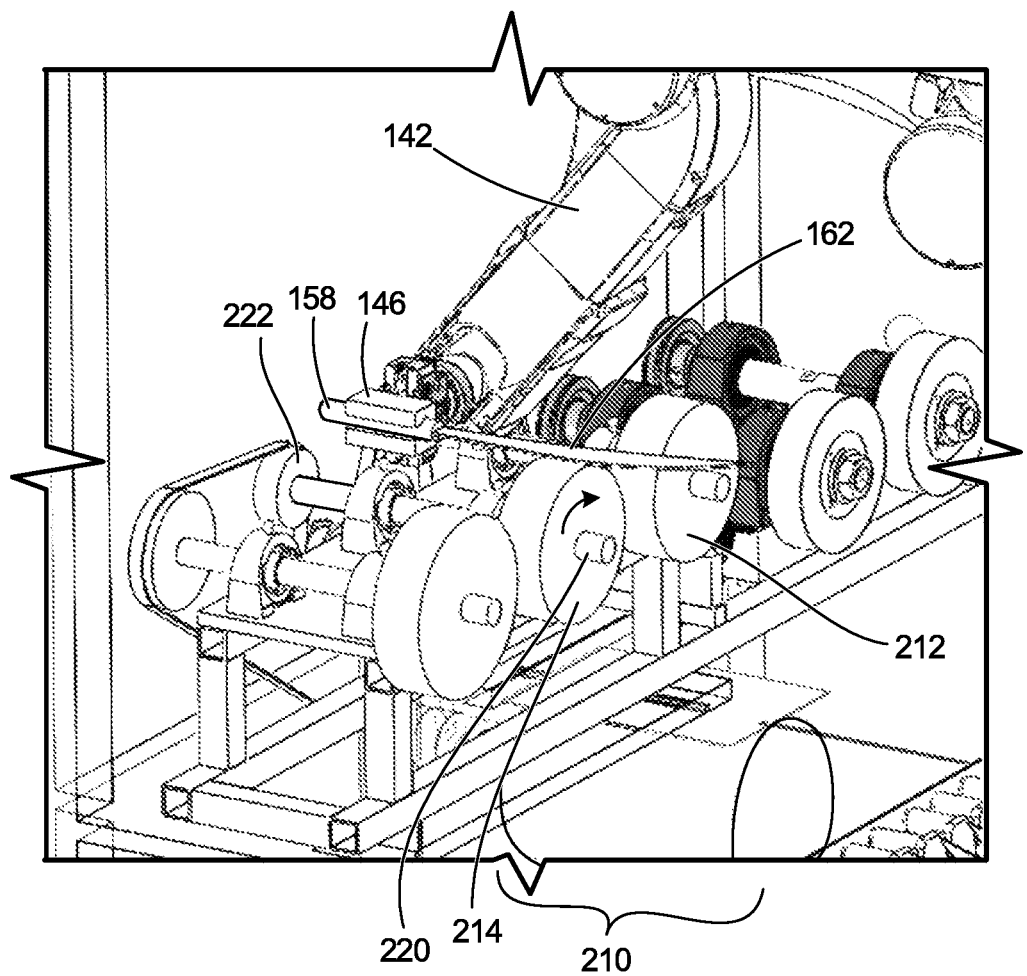
FIG. 18 is a perspective view of the robotic arm manipulating and drawing the second edge of the gripped knife blade across the rotating fine sharpening wheel with the wheel rotated in the opposite direction.

Following the fine sharpening of the bottom cutting edge of the knife blade 162, the robotic arm 142 is preprogrammed to rotate the knife 180° in a vertical plane so that it is flipped over to present the second cutting edge (now the bottom cutting edge) to the Edger fine sharpening wheel 214 (see FIG. 18). At the same time, the rotating fine sharpening wheel is reversed to a clockwise direction so that the wheel still spins into the blade. The process is repeated with the knife blade 162 being drawn the predetermined number of times along substantially its entire length across the rotating Edger coarse wheel, while keeping the blade tangent to the rotating wheel, and turning the knife in a horizontal plane to follow the corrected profile curve 180 for the knife blade cutting edge as it is drawn across the rotating wheel. In this manner, the opposite cutting edge of the knife 158 is sharpened. This fine sharpening wheel 214 acts to remove any metal burrs that were formed along one or both blade edges by the Edger coarse wheel 212 sharpening process. At this point, the knife 158 should have two very sharp cutting edges along the full length of the blade 162.

The Edger fine sharpening wheel 214 preferably comprises CBN aggregate particles. It preferably has a grit or grain size of about 180-600 grit, a wheel grade of about A to H, and grain spacing of about 1-17. For purposes of the present invention, a suitable Edger fine sharpening wheel 214 may be sourced in the form of CBN Fine Wheels (Part No. 1-2-WEF12) from Razor Edge Systems.

Because of the heat build up on the knife blade surface during the grinding, course sharpening, or fine sharpening process, a cooling stream of a fluid like water may be directed onto the knife blade as it is passed along the grinding wheels 192, 194, Edger coarse sharpening wheel 212, or Edge fine sharpening wheel. As bits of the aggregate particles break away from the rotating wheel due to normal wear and tear, they mix with bits of metal that may also separate from the knife blade's cutting edge during the grinding or sharpening process. This mixture of metal and aggregate particle bits will typically lie on the surface of the cutting edge 160 of the knife blade 162. Moreover, the cooling water may mix with the metal and aggregate particles to form a slurry that coats the knife blade cutting edge. This debris or slurry will contaminate the knife blade and should therefore be cleaned prior to usage of the knife, as described more fully below.

Figure 19:
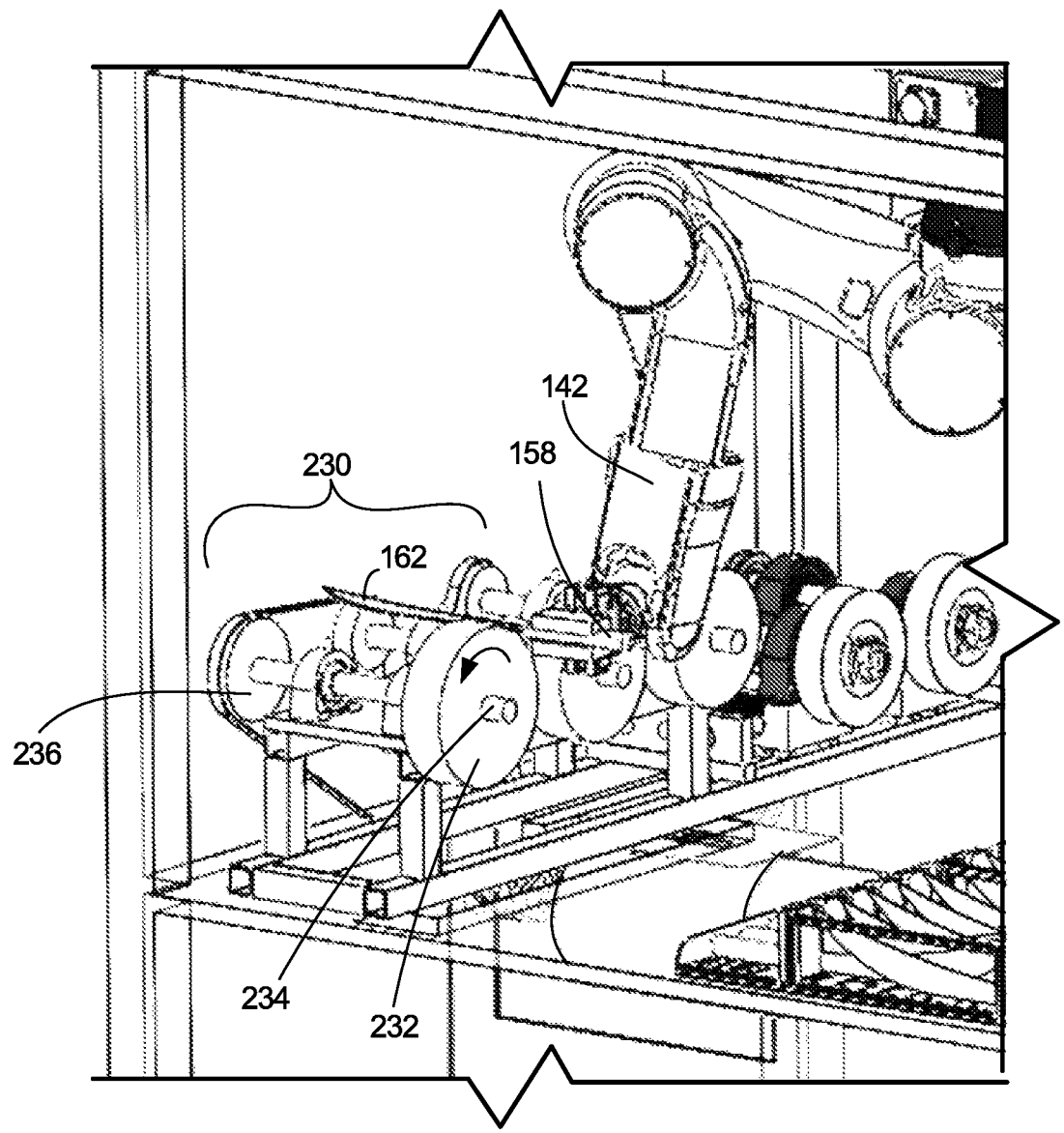
FIG. 19 is a perspective view of the robotic arm manipulating and drawing the first edge of the gripped knife blade across the rotating buffing/polishing wheel.

Next, the robotic arm 142 transports the knife 158 to the polishing buffing station 230 of the automated knife sharpener system 90. As shown in FIG. 19, this comprises a rotating wheel 232 that turns around an axle 234 with a drive wheel 236 mounted to its other end. The drive wheel 236 may be driven by separate motor drive wheels (not shown) and associated belt drives (not shown) independently of drive wheels 218 and 222 connected to the coarse sharpening wheel 212 and fine sharpening wheel 214, respectively. Alternatively, the motor drive wheel for the coarse sharpening wheel 212 or fine sharpening wheel 214 may operate the drive wheel of the buffer wheel 232 to move the buffer wheel 232 in tandem with the coarse sharpening wheel or fine sharpening wheel.

As shown in FIG. 19, the knife 158 is turned 180° by the robotic arm 142 so that the blade is horizontally disposed with its first cutting edge on the bottom. This first (bottom) cutting edge of the knife blade 162 is drawn a predetermined number of times substantially along its entire length across the buffering wheel 232 from the backside of the wheel, while keeping the blade cutting edge tangent to the rotating wheel. At the same time, the robotic arm 142 will turn the knife in a horizontal plane while the corrected curve profile 180 of the knife blade is drawn across the rotating buffer wheel 232 to ensure that the bottom blade edge is correctly buffed and polished while accommodating the specific curved edge profile of the blade. The buffering wheel is rotated in a counterclockwise direction into the blade cutting edge. While the number of times that the knife blade is drawn backwards across the rotating wheel may vary due to the type and condition of the blade, once or twice is preferred.

Figure 20:
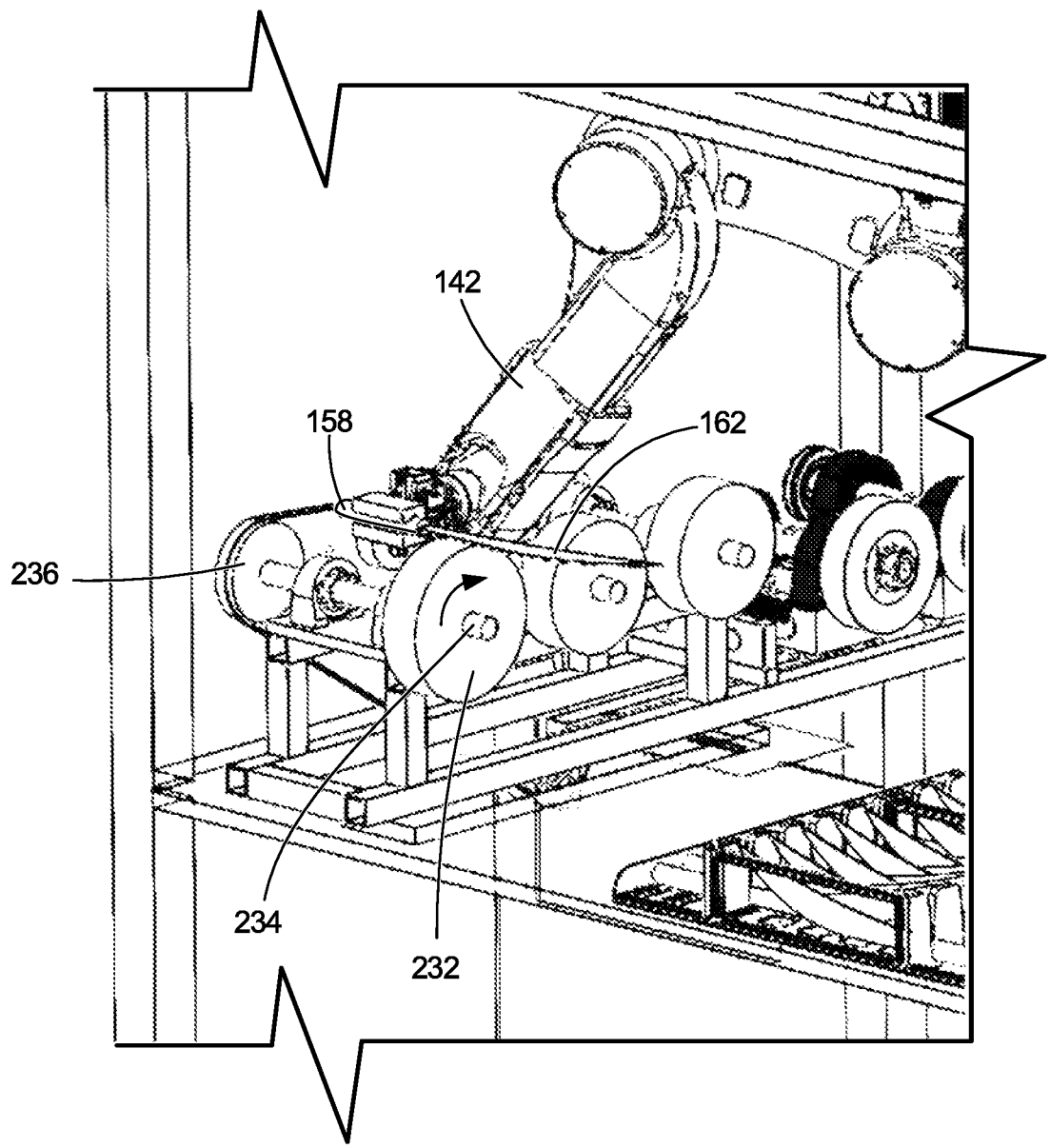
FIG. 20 is a perspective view of the robotic arm manipulating and drawing the second edge of the gripped knife blade across the rotating buffing/polishing wheel with the wheel rotated in the opposite direction.

Following the buffing and polishing of the bottom cutting edge of the knife blade 162, the robotic arm 142 is preprogrammed to rotate the knife 180° in a vertical plane so that it is flipped over to present the second cutting edge (now the bottom cutting edge) to the buffing wheel 232 (see FIG. 20). At the same time, the rotating buffing wheel is reversed to a clockwise direction so that the wheel still spins into the blade. The process is repeated with the knife blade 162 being drawn the predetermined number of times along substantially its entire length across the rotating buffing wheel 232, while keeping the blade tangent to the rotating wheel, and turning the knife in a horizontal plane to follow the corrected profile curve 180 for the knife blade cutting edge as it is drawn across the rotating wheel. In this manner, the opposite cutting edge of the knife 158 is buffed and polished. This buffing and polishing process acts to remove any remaining pieces of metal along the sharpened knife blade edges, and smooth the cutting edges.

While technically, "polishing" is used within the industry to refer to processes employing an abrasive that is glued to the work wheel, while "buffing" uses a loose abrasive applied to the work wheel, the terms are employed interchangeably in this Application. The buffing wheel 232 can be made from any type of material that is sufficiently soft to not introduce nicks or scratches onto the cutting edge 160 of the knife blade 162. Suitable materials include canvas, cotton cloth, felt, or sheepskin. It preferably comprises felt. The buffing wheel 232 should be preferably rotated at a speed of about 4,000 surface feet per minute ("SFM").

A mildly abrasive compound like "jewelers rouge" is applied to the buffing wheel 232 by spinning the buffing wheel and lightly pressing a bar of the compound onto the wheel. The heat and friction of the spinning buffing wheel will be sufficient to transfer the compound to the surface of the buffing wheel. Only a small amount of the buffing compound is needed for it to work properly to buff and polish the sharpened cutting edge 160 of the knife blade 162.

There are a variety of jewelers rouge compounds known in the industry. For a hand tool like a knife blade made from steel, "Black Emery", "Green Stainless", or "Blue All Purpose" jewelers rouge is preferred. For a hand tool sharpened surface made from stainless steel, "Black Emery", "Brown Tripoli", "White Rouge", "Green Stainless", or "Blue All Purpose" jewelers rouge is preferred.

For purposes of this invention, a suitable buffing wheel 232 may be sourced in the form of Buffer Wheel (Part No. 1-2-WB20) from Razor Edge Systems.

Figure 21:
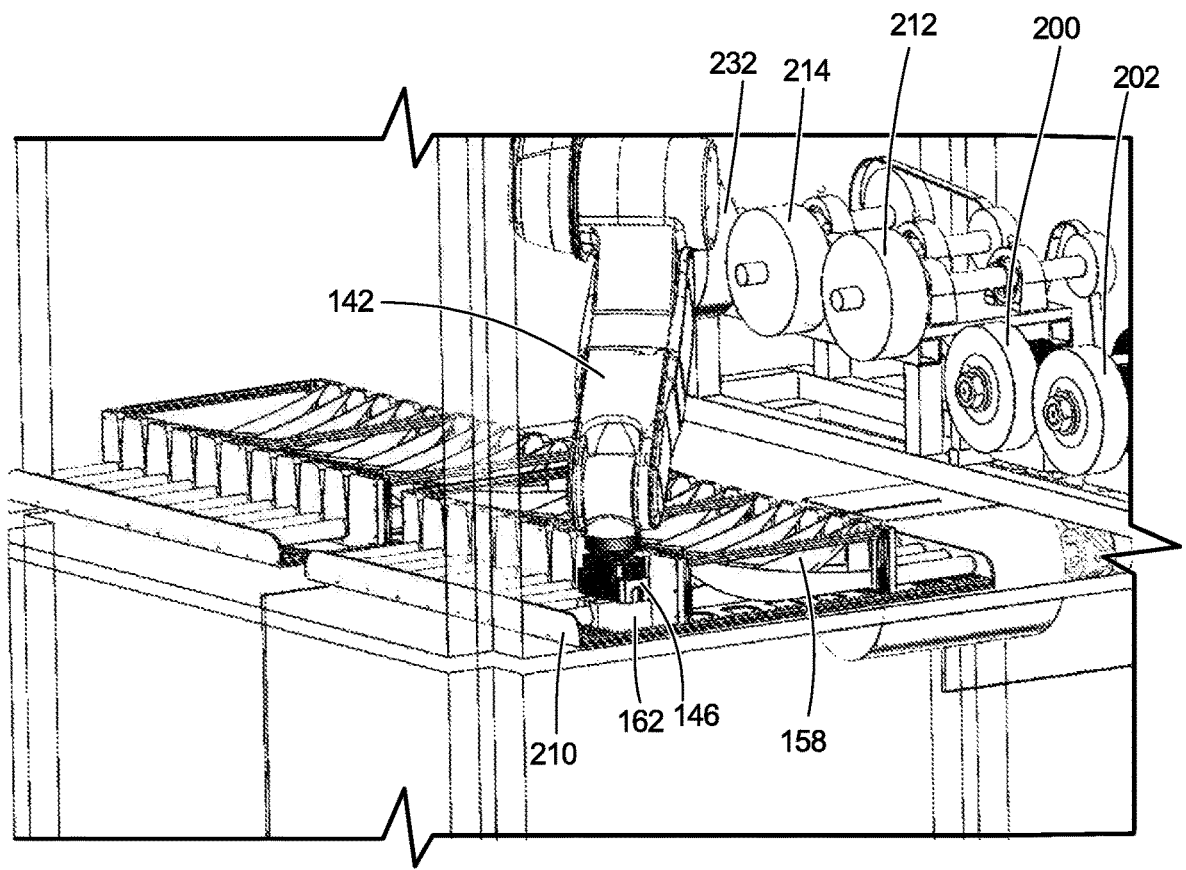
FIG. 21 is perspective view of the robotic arm of the automated knife sharpener system returning the sharpened knife back to the storage tote.

The now-sharpened knife 158 will be placed back in its original location in the dull knife tray 110 (see FIG. 21). The robotic arm 142 responds to preprogrammed machine commands for transporting the knife from the buffing station 230 to the dull knife station. The process for the automated knife sharpener system 90 will then be repeated for each of the additional dull knives contained in the dull knife tray 110. At that point, the tray will be full of sharpened knives, and it becomes a sharpened knife tray 114.

Figure 22:
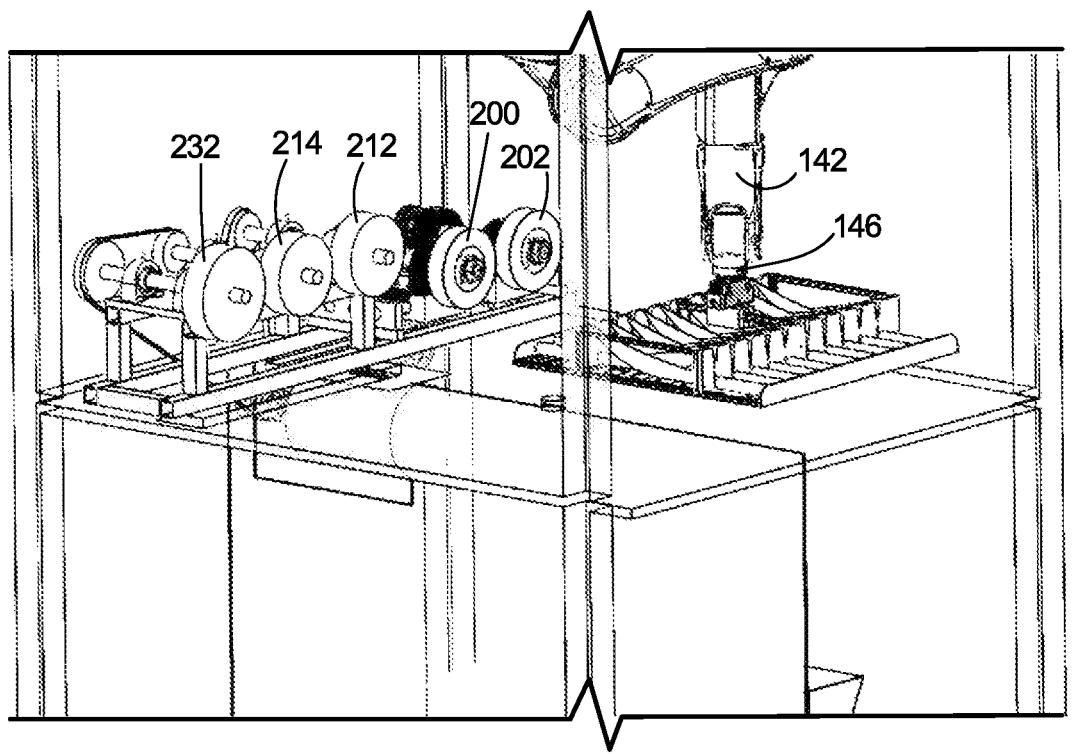
FIG. 22 is perspective view of the robotic arm picking up the storage tote filled with sharpened knives.
Figure 23:
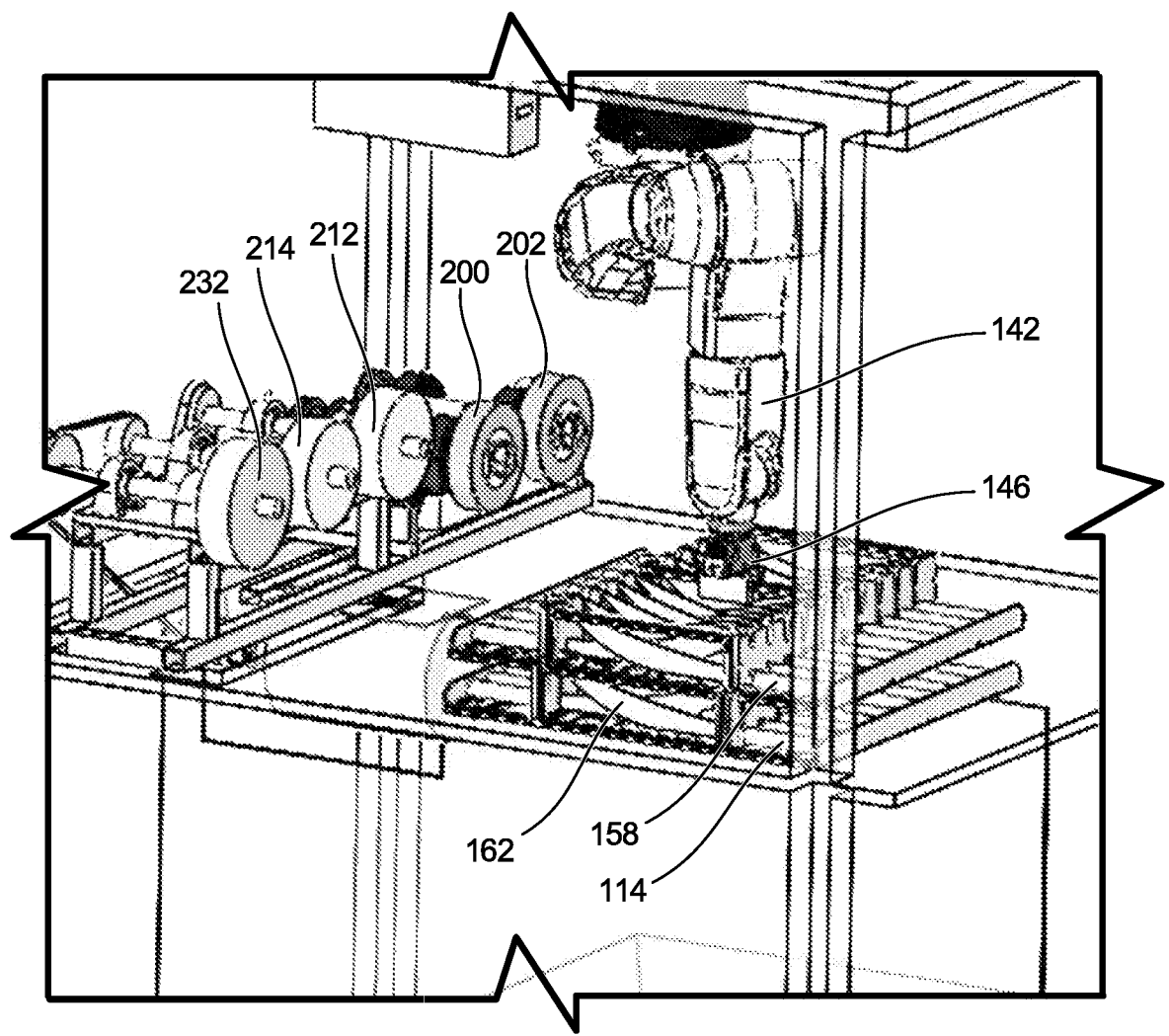
FIG. 23 is perspective view of the robotic arm placing the storage tote filled with sharpened knives in another position along the automated knife sharpening system.

The robotic arm 142 is preprogrammed with machine commands to lift the sharp knife tray 114 by means of the pneumatic gripper 143 (see FIG. 22) and transport it across the open housing structure 92 of the automated knife sharpener system 90 to deposit it for removal by an operator working in the factory. See FIG. 23. Four to five trays 114 of sharpened knives may be stacked. This ensures that a ready supply of sharpened knives is available for the workers throughout their work shift.

After all of the knives 158 have been sharpened by the automated knife sharpener system 90, its programming will cause the robotic arm to move to its home position safely away from the components of the system.

The knife blade 162 was probably cleaned prior to the grinding and sharpening operations to remove residue left over from the usage of the knife (e.g., bits of muscle, fat, tissue, cartilage, and bone in meat processing operations). But, as discussed above, the sharpened knife blade 162 may be left with residue left on it during the grinding and sharpening operations in the form, e.g., of detached metal bits, aggregate particles broken off from the grinding or sharpening wheels, jewelers rouge or other buffing compounds, and slurries thereof. Thus, the automated hand tool sharpening system 90 of the present invention may optionally include a hand tool wash apparatus 500 into which the knife blade may be inserted by the robotic arm for cleaning, scrubbing, and sterilizing the knife blade surfaces. Such a hand tool wash apparatus 500 is described more fully in Applicant's pending U.S. Ser. No. 15/793,068 application, which is hereby incorporated in its entirety.

Figure 24:
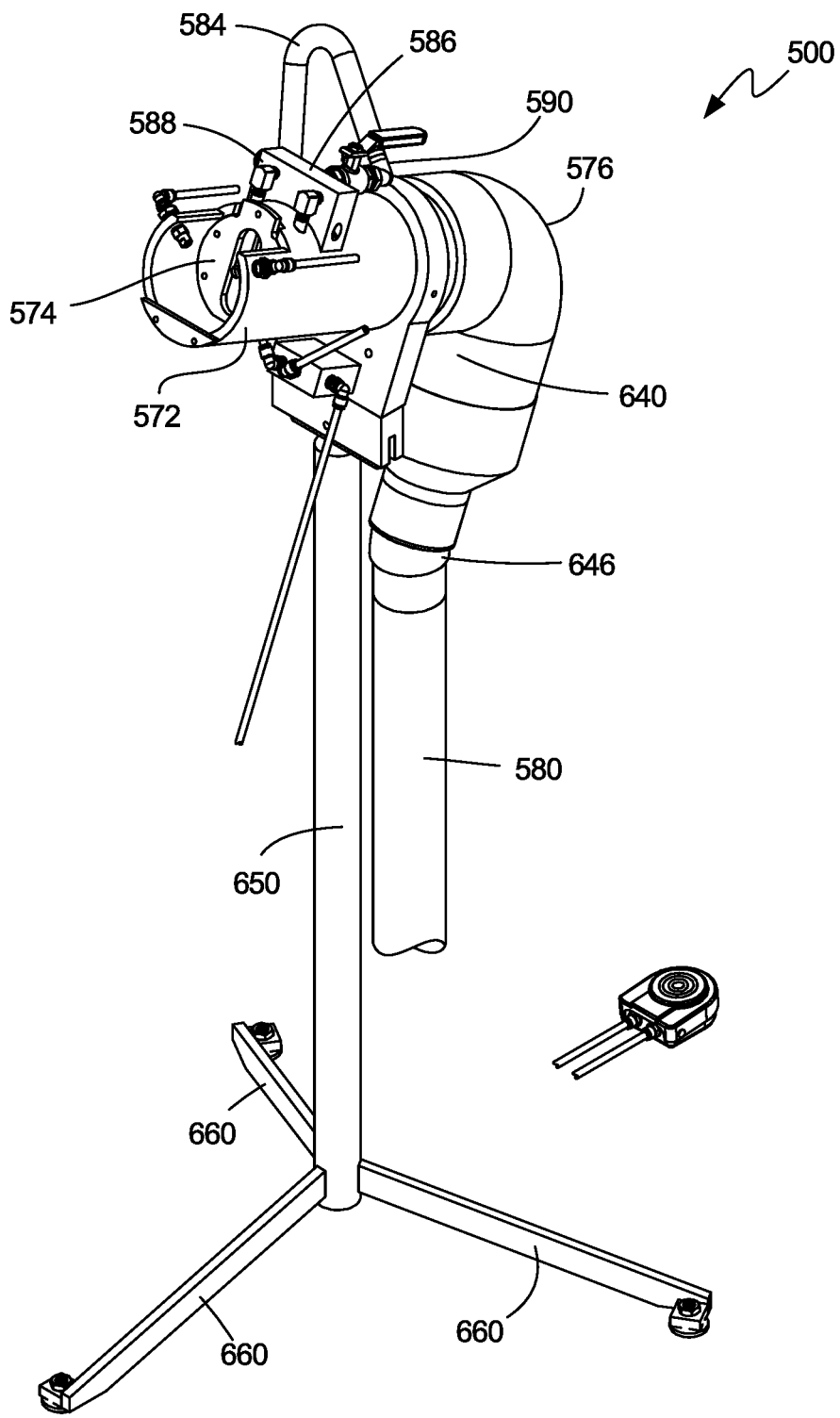
FIG. 24 is a perspective view of the hand tool wash apparatus of the present invention.
Figure 25:
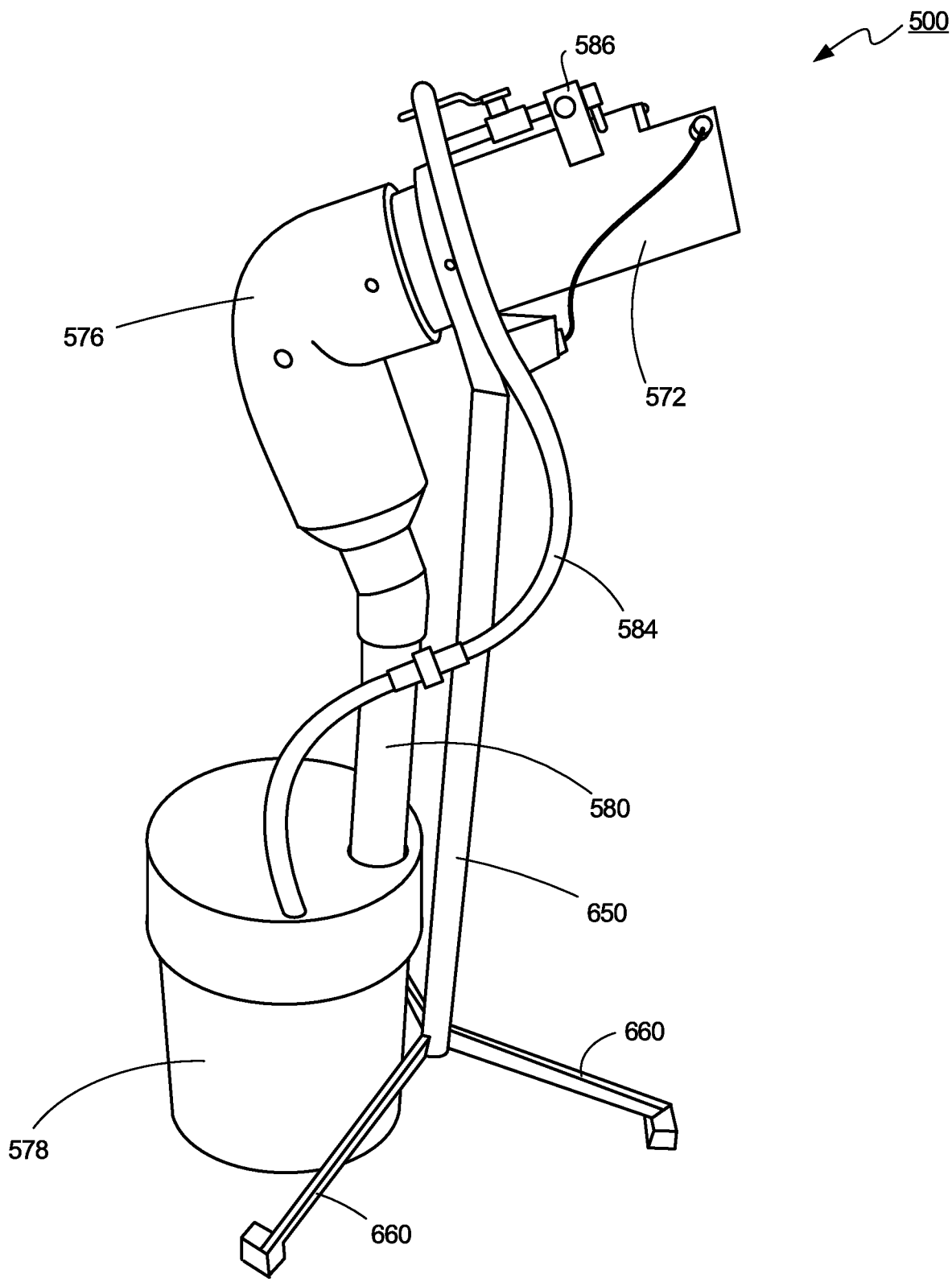
FIG. 25 is a perspective view of the hand tool wash apparatus of FIG. 24 from the opposite side.

For purposes of the robotic hand tool sharpening and cleaning system of the present invention, the hand tool wash apparatus 500 portion is shown in FIGS. 24-25. It comprises a housing wash tube 572 to which a splash plate 574 is attached. Secured to the other end of the housing wash tube 572 is an elbow fitting 576 that is then connected to cleaning agent container 578 by means of drain pipe 580. The interior portion of housing wash tube 572 between the splash plate 574 and the elbow fitting 576 forms a washing chamber 582 in which the knife blade 162 is cleaned. The cleaning agent 520 is delivered under pressure by means of tubing 584 from cleaning agent container 578 to manifold 586 from which nozzles 588 and 590 deliver the cleaning agent 520 inside the washing chamber 582 as a fan-shaped blade spray array. After contacting the opposing surfaces of the knife blade 162, the cleaning agent 520 falls down onto the bottom surface of the housing wash tube 572 whereupon it flows by means of gravity to the open discharge end 594 of the housing wash tube 572. The spent cleaning agent 520 will then flow through elbow fitting 576, through drain pipe 580, and back into cleaning agent container 578. In this manner, the cleaning agent 520 can be recycled and used multiple times to successively clean knife blades 162. This is particularly convenient for supplemental wash operations for the knife blades that have already been cleaned in a separate wash operation before, e.g., a knife blade sharpening process, so that less dirt, grime, and other matter is present on the knife blade to contaminate the cleaning agent, as would be the case for a primary wash operation.

Figure 26:
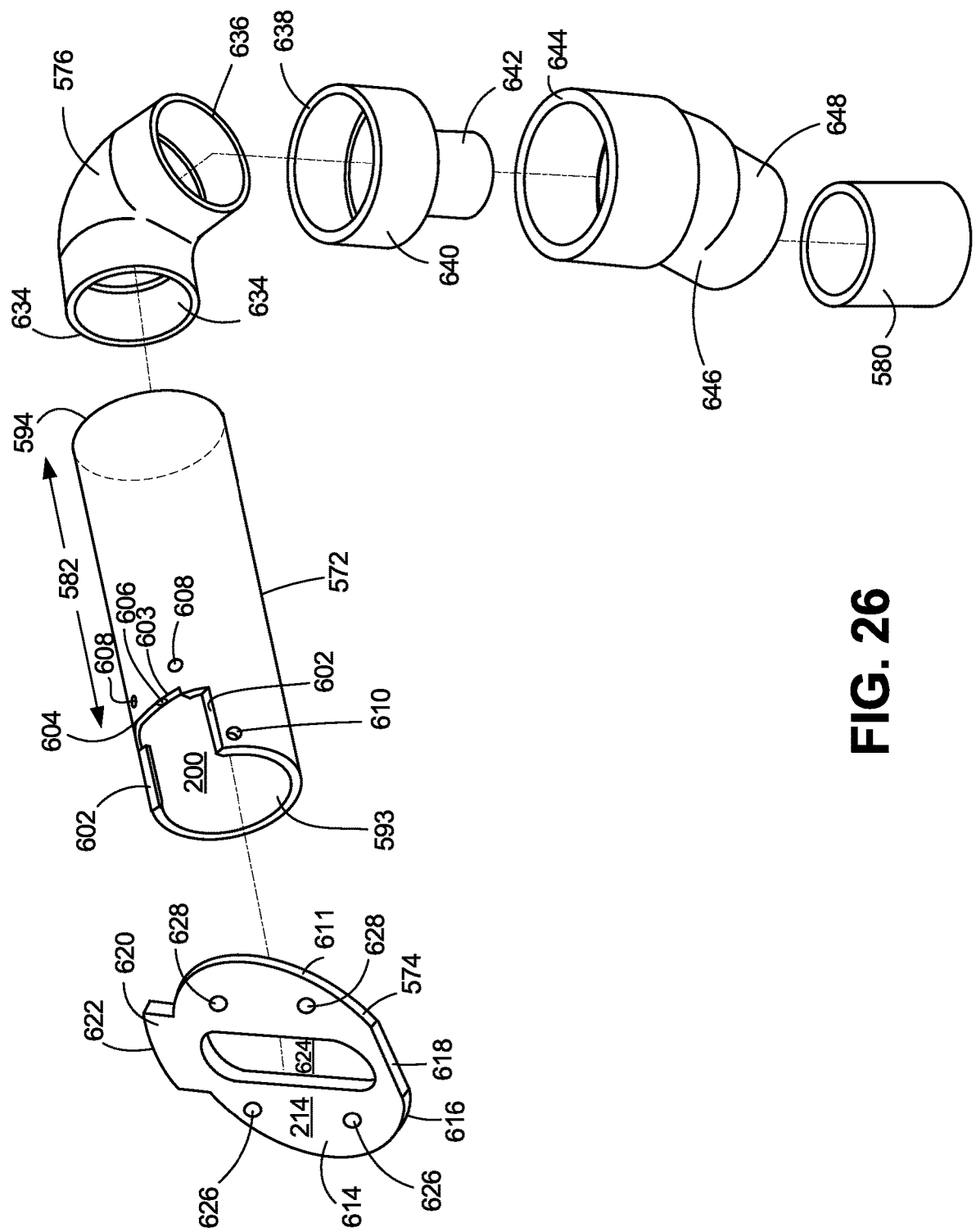
FIG. 26 is an exploded view of the housing parts for the washing chamber and drain pipe of the hand tool wash apparatus of FIG. 24.

The fittings are shown in greater detail in FIG. 26. Housing wash tube 572 comprises a hollow tube having an inlet end 593 and a discharge end 594. Cut-away region 600 is formed within the top portion of the tube near its inlet end defined by side wall 602. Niche 604 is formed within sidewall 603 along the top surface of housing wash tube 572. Threaded aperture 606 in turn is formed within side wall 603.

Also formed within the upper surface of housing wash tube 572 is a pair of holes 608 downstream of niche 604. Another pair of holes 601 are formed within the side surface of housing wash tube 572 near the inlet end 593.

Splash plate 574 comprises a relatively flat substrate 614 that may be made from any suitable material that is durable against knife cuts, impervious to the chemicals contained in cleaning agent 520, and able to be easily cleaned. Such materials include aluminum, brass, and plastic materials like high-density polyethylene ("HDPE"). The shape of the splash plate 574 substrate should match the cross-sectional shape of housing wash tube 572. Thus, if housing wash tube 572 is circular in cross section, than splash plate 574 should have the same circular shape within approximately the same dimensions. Splash plate 574 has a sidewall 616 formed around the periphery of substrate 614. The bottom edge of substrate 614 is flat defined by sidewall 618. Key 620 extends upwardly from the top of substrate 614. Hole 622 is formed though key 620.

Inlet opening or port 624 is formed within the control region of substrate 614 of splash plate 574. It may comprise any suitable shape for accommodating a work tool, such as knife blade 162. Inlet port 624 is preferably oval in shape. It should be sized to accommodate the size range of knife blades or other hand tools that will be cleaned in the hand tool wash apparatus. Thus, its length along a vertical axis may be about 2-4 inches. Its width along a horizontal axis may be about 0.5-1 inch. A pair of holes 626 and 628 is formed through substrate 614 between the inlet port 624 and the side edge of the splash plate. Splash plate 574 is inserted into the cutaway region 600 of housing wash tube 572 with key 620 abuting side wall 603. Side walls 616 abut the interior surface of housing wash tube 572 in a close-fitting relationship. Bolt 628 passes through key hole 622 in splash plate 574 and then into threaded aperture 606 in upper housing wash tube side wall 603 to attach the splash plate securely to the housing wash tube. A drain inlet 630 is formed between the flat bottom edge of splash plate 574 and the curved bottom interior surface of the tube.

Elbow fitting 576 has inlet end 634 with interior diameter that is slightly larger than the outside diameter of the discharge end 594 of housing wash tube 572. In this manner, the inlet end 634 of the elbow fitting 576 is attached in close-fitted relationship around the discharge end 594 of the housing wash tube. The outside diameter of outlet end 636 of elbow fitting 576 fits inside the inlet end 638 of reducer pipe fitting 640. The outlet end 642 of reducer pipe fitting 640 features an outside diameter that closely fits into the inside diameter of entry end 644 of offset elbow 646. The exterior diameter of outlet end 648 of offset elbow fitting 646 in turn fits into the inside diameter of drain pipe 580. An adhesive may be used to attach these fittings to each other more securely. In this matter, cleaning agent 520 accumulating inside the wash chamber 582 of housing wash tube 572 flows continuously through the outlet end 594 of the housing wash tube 572 and through elbow fitting 576, reducer pipe fitting 640, offset elbow fitting 646, and drain pipe 580 into cleaning agent container 678.

Figure 27:
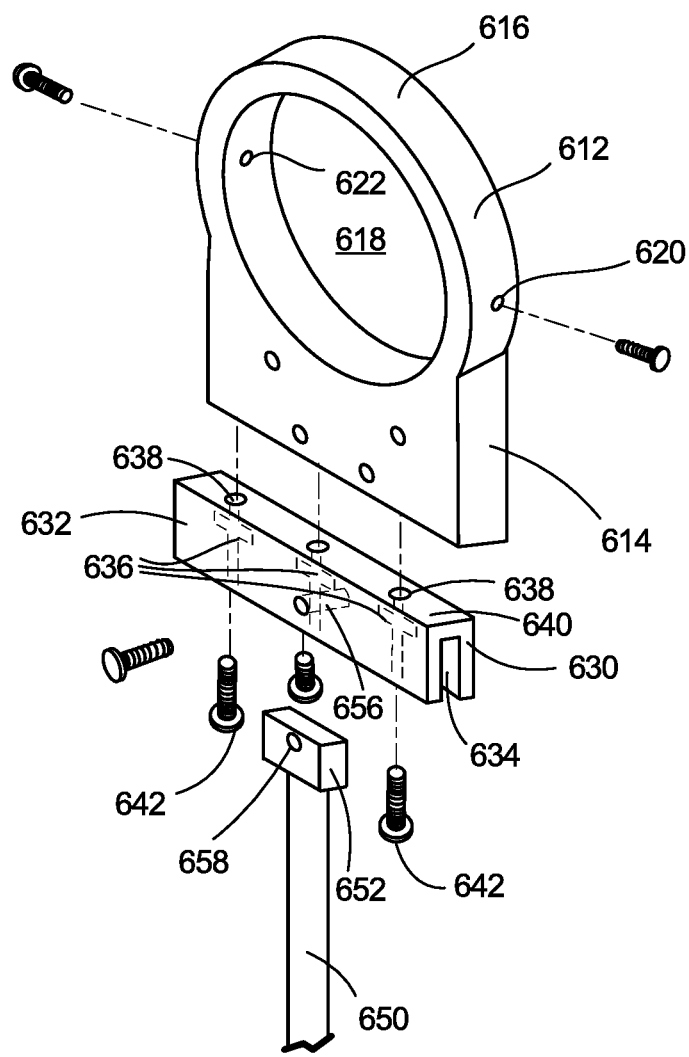
FIG. 27 is an exploded view of the mounting assembly for the hand tool wash apparatus of FIG. 24.

The mounting system 610 for the housing wash tube 572 is shown in FIGS. 24-25 and 27. A mounting ring 612 comprises a base portion 614 and a ring portion 616. The diameter of opening 618 in ring portion 616 is sized to fit the outside diameter of housing wash tube 572. Through channels 620 and 622 are forced through the sides of ring portion 616. Three threaded apertures 624 are formed within the base portion 614 of the mounting ring 612 extending upwardly from its bottom surface (not shown).

Meanwhile, rail mount 630 comprises a block 632 housing a horizontal slot 634 formed within it from the bottom surfaces. Three through channels 636 extended vertically through the block 632 terminating in outlet holes 638 on the top surface 640 of the block. Three bolts 642 extend upwardly through channels 636 and then into threaded engagement with apertures 624 in base portion 614 of mounting ring 612. In this manner, rail mount 630 is attached to mounting ring 612.

Pole 650 has a tongue 652 extending from its top end. This tongue 652 fits into horizontal slot 634 in rail mount 630. Bolt 654 extends through channel 656 formed within rear mount 630 and apertures 658 formed in tongue 652 with a nut secured to the bolt end on the back side of the rear mount. This connects pole 650 to the bottom of rail mount. Meanwhile, three feet 660 extend from the bottom end of pole 650 with about 120 degrees of arc between two of the feet. By inserting housing wash tube 572 of the hand tool wash station 500 through opening 615 in ring mount 612 and securing it to the ring mount by means of bolts 664 and 666 inserted through channels 620 and 622, the hand tool wash station 500 is mounted to pole 650. The pole 650 in preferably adjustable in height, so that the height of the housing wash tube 572 can be adjusted vertically to an ergonomic position for the washer who is cleaning the knives 158.

The bottom surface of the mounting ring 612 may be milled or formed at an angle with respect to its side walls. When secured to the flat top surface of the rail mount 630, the resulting mounting system 610 will hold the housing tube 570 of the hand tool wash apparatus 572 at a declined angle α with respect to a horizontal axis for producing gravity flow of spent cleaning agent 520 along the bottom surface of the washing chamber 582 to the back end of the tube opening and then down the drain pipe 580, as described below.

Figure 28:
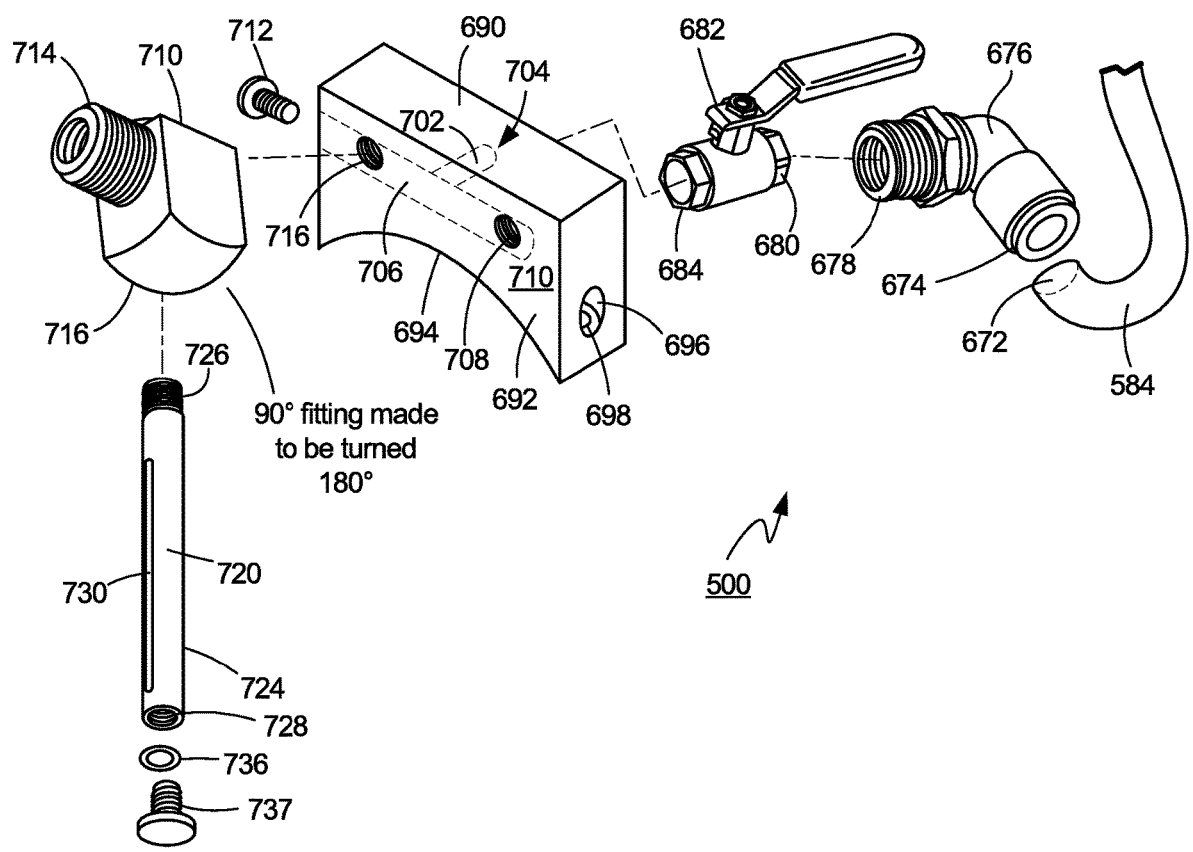
FIG. 28 is an exploded view of the cleaning agent delivery system of the hand tool wash apparatus of FIG. 24.

The delivery supply system 670 for the cleaning agent 520 is shown in FIG. 28. Flexible conduit 584 is connected at its downstream end 672 to compression fitting 674 on 90° T-connector 676. Male threaded end 678 formed on the other end of 90° T-connector 676 is rotated into engagement with the upstream threaded female end 680 of ball valve 682. The ball valve also has a downstream threaded female end 684.

Cleaning agent manifold 690 comprises a block 692 having a curved bottom edge 694 that fits around the exterior surface of the housing wash tube 572. Chamfered through channels 696 extend through the block 692 to accommodate bolts 698 that secure the block of the cleaning agent manifold 690 to the top of the housing wash tube 572 of the hand tool wash station 570.

A horizontal bore 700 is milled partially through block 692 from one side with a second horizontal bore 702 milled from an inlet port 704 formed on the back side of the manifold block to join the first bore 700. The first horizontal bore 700 in turn is in fluid communication via two further cross bores with outlet ports 706 and 708 formed on the front side 710 of the manifold block 692. A plug 712 is threaded into engagement with the end of block 692 to seal off the end of first horizontal bore 700. A fitting nipple (not shown) is used to connect the downstream threaded female end 684 of ball valve 682 to the inlet port 704 in cleaning agent manifold 690.

Meanwhile, 90° pipe fittings 710 and 712 each have a threaded male end 714 and a threaded female end 716. The threaded male end of each of the 90° pipe fitting 710 and 712 are connected to the threaded outlet ports 706 and 708 of the cleaning agent manifold 690. The threaded female end 716 of each of the fittings 710 and 712 points downwardly.

Spray nozzles 720 and 722 comprise a vertical pipe 724 having a threaded male end 726 and a threaded female end 728. Formed into the surface of the pipe 724 is a vertical outlet slot 730. This outlet slot 730 comprises a narrow slot formed within the surface of vertical supply conduits 720 and 722 that run substantially vertically along the conduits. These outlet slots 730 should be about 1.5-3.0 inches high, preferably about 2.5-3.0 inches high. The slots should also be about $1/16$ (0.0625)-$5/32$ (0.15625) inch wide, preferably about $1/8$ (0.125) inch wide. The resulting substantially vertical fan-shaped pressuring spray arrays produced by these outlet slots on either side of the knife blade will strike the blade surfaces with a "blade" of cleaning agent that is approximately 2.5-3.0 inches high and $1/100,000$ inch thin to focus its cleaning agent upon a specific area on the knife blade surfaces.

A threaded plug 734 having an O-ring or gasket seal 736 is connected to the threaded female end 728 of each of the vertical pipes 724 to seal off the bottom ends of the spray nozzles 720 and 722. The vertical pipe of each spray nozzle 720 and 722 is inserted down through holes 608 formed in the top of housing wash tube 672 so that the vertical slots 730 of each nozzle is contained inside the washing chamber 582 to deliver the fan-shaped spray array of the cleaning agent 520 inside the chamber.

Figure 29:
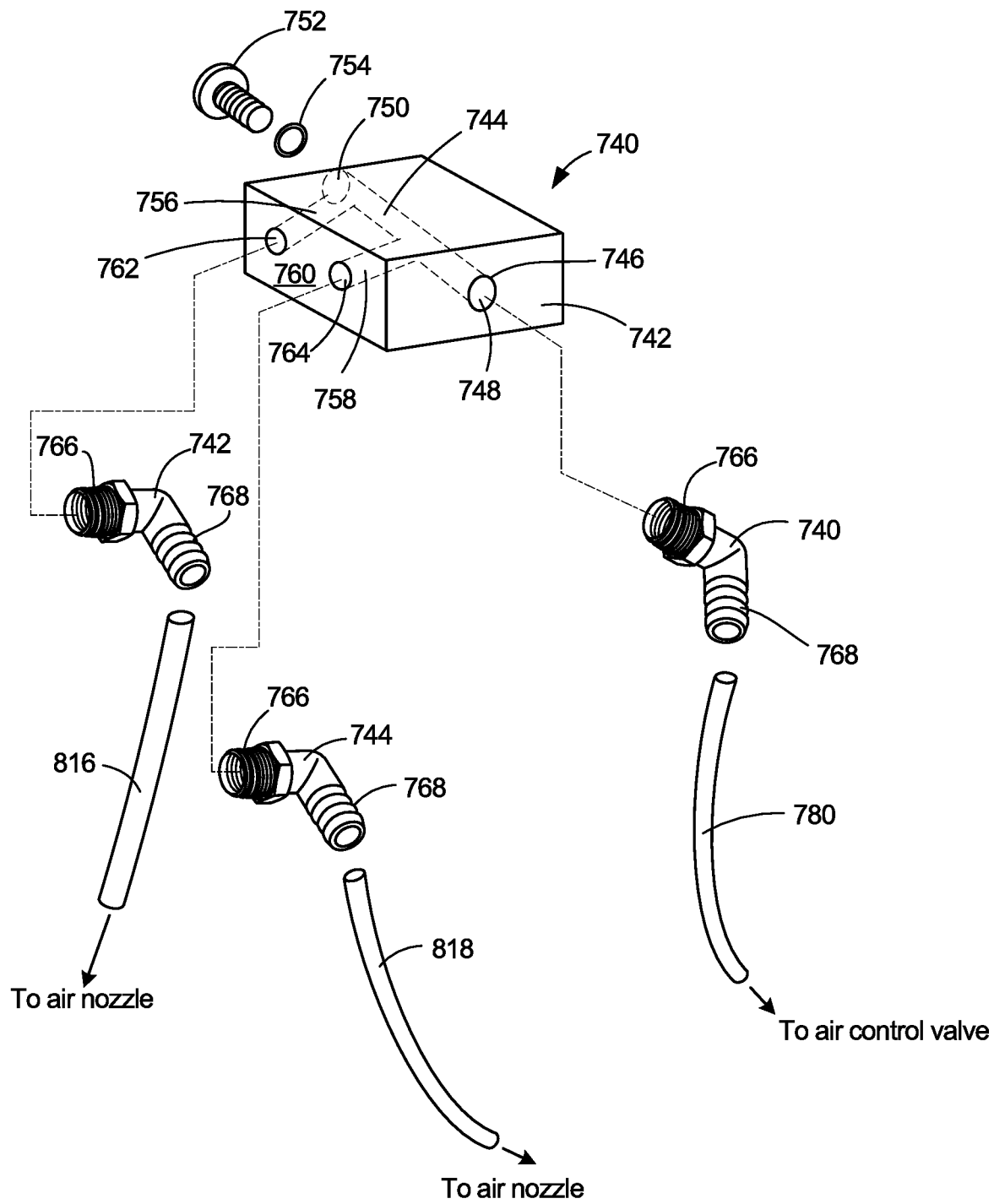
FIG. 29 is an exploded view of the pressurized gas delivery system of the hand tool wash apparatus of FIG. 24.

Pressurized gas manifold 740 is shown in FIG. 29. It comprises a block 742 having a horizontal bore 744 milled through one end to the other end. The first end 746 is threaded to form inlet port 748. The second end 750 is threaded to accommodate seal plug 752 and O-ring or gasket real 754 that closes off that end of the horizontal bore 744. A second horizontal bore 756 and a third horizontal bore 758 split off of first horizontal bore 744 and travel to the front edge 760 of block 742 to form threaded outlet ports 762 and 764 of pressurized gas manifold 740.

Barbed tube fittings 740, 742, and 744 are connected respectively to inlet port 748 and outlet ports 762 and 764 of pressurized gas manifold 740. Each of the fittings has a threaded male end 766 that is rotatably engaged with the threaded female ends of the inlet and outlet ports. Each of the fittings also has a second male end 768 with ridges formed along its exterior surface for engaging the interior surfaces of flexible conduits as described below.

Figure 30:
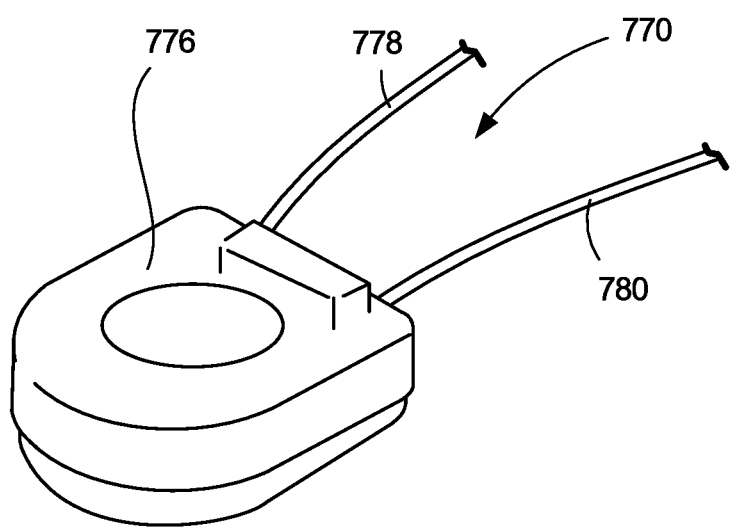
FIG. 30 is a perspective view of the pressurized gas control valve of the pressurized gas delivery system of FIG. 29.

Pressurized gas control valve 770 is shown in FIG. 30. It has an inlet port 772 and an outlet port 774 (not shown), and foot-activated panel 776 along its top surface. A flexible conduit 778 connects a source of pressurized gas (e.g., compressed air) to the inlet port 772 on the control valve 770. Another flexible conduit 380 connects the outlet port of the control valve to the second (barbed) end 768 of fitting 740, which in turn delivers the pressurized gas to the manifold 740.

Figure 31:
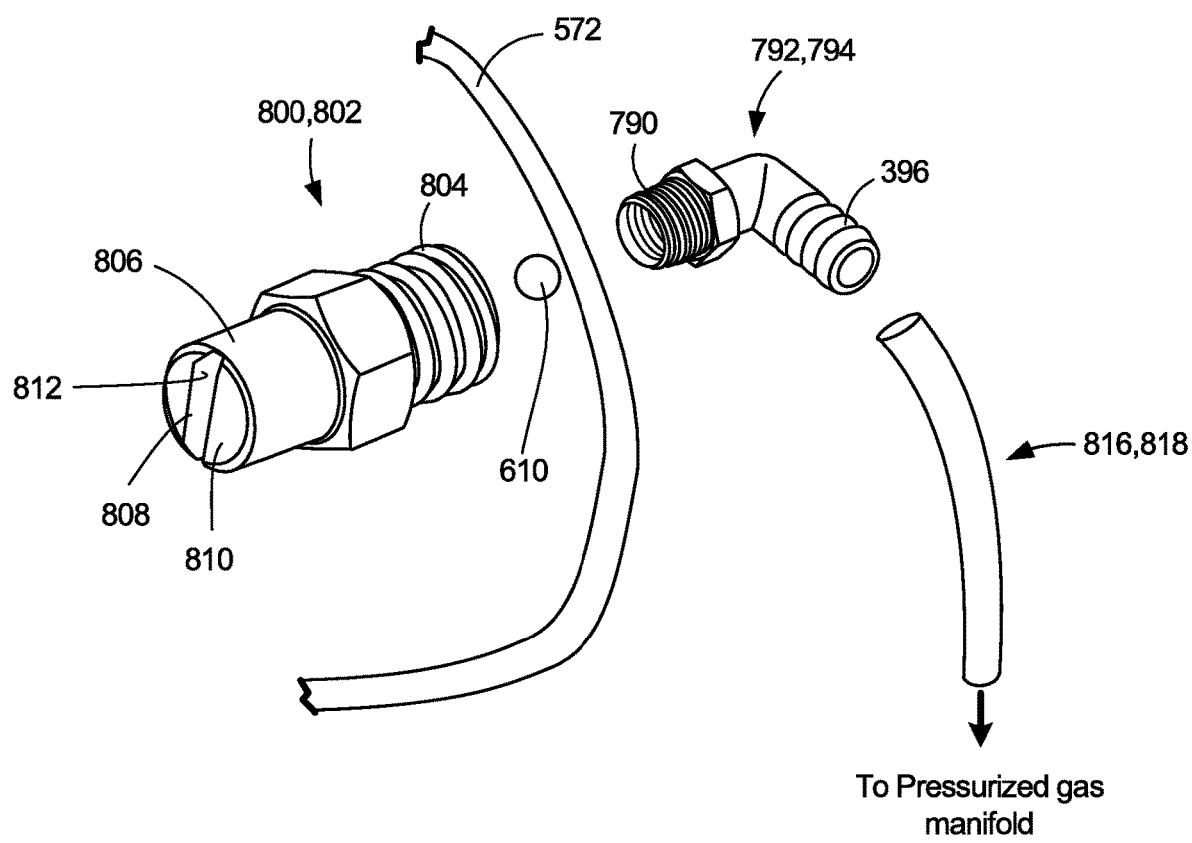
FIG. 31 is an exploded view of the nozzles used to deliver the pressurized gas to the entry vestibule area of the washing station of the hand tool wash apparatus of FIG. 24.
Figure 32:
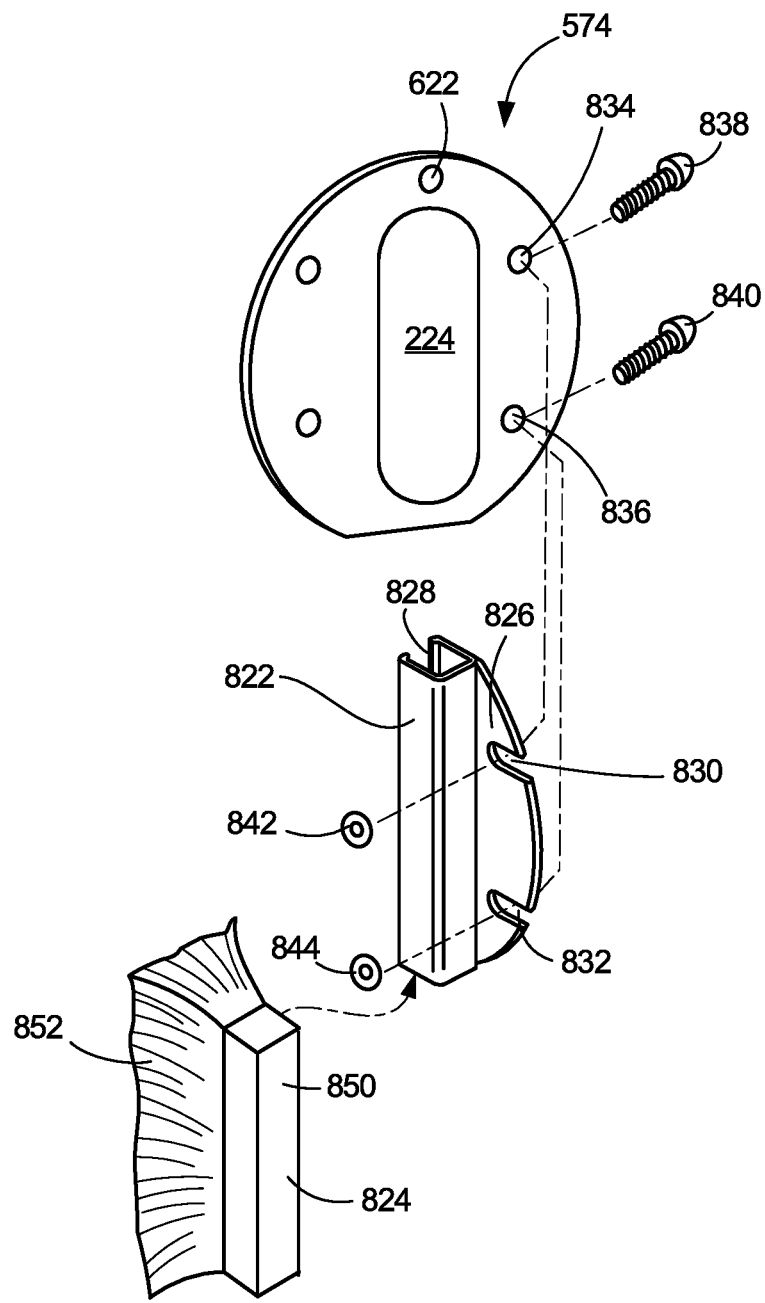
FIG. 32 is an exploded view of the brush assemblies secured to the inlet port of the hand tool wash apparatus of FIG. 24.

The male end 790 of barbed tube fittings 792 and 794 is inserted through holes 610 formed in each side of housing wash tube 572 inside the vestibule area 788 near the inlet end 593 and outside the washing chamber 582 (see FIGS. 31 and 24). The vestibule area is defined by the bottom surface of housing wash tube 572, splash plate 574, and splash guard 789. The male ends 790 of the fittings 792, 794 are pointed towards the interior of the vestibule area 788 with the barbed female ends 796 extending outside the tubing wall.

Spray nozzles 800 and 802 are connected inside the vestibule area 788 to the male ends 790 of barbed tube fittings 792 and 794. Threaded male end 804 of each nozzle is connected to the threaded male end 790 of the fitting via an appropriate connector fitting. The connector fitting is preferably a ball-and-socket connector mechanism, so that the nozzle can be directionally pointed inside the vestibule area. At the other end of the nozzle is spray head 806. A bore passes longitudinally through the nozzle 800, 802, terminating in an outlet port 808. This outlet port may comprise a circular cross section within the face 810 of the spray head 806 to deliver a spray of pressurized gas in a conventional 760 degree array. Preferably, nozzles 800, 802 comprise flat spray nozzles having a V-shaped groove 812 formed with the spray head 806. In this manner, the pressurized gas exiting the nozzle bore through outlet port 808 will interact with the V-shaped groove 812 to deliver a flat, fan-shaped spray array of the pressurized gas.

Flexible conduits 816 and 818 connect the barbed ends of fittings 742 and 744 connected to the outlet ports 762 and 764 of manifold 740 to the barbed ends 820 of fittings 792 and 794 connected to the housing wash tube 572, and directed into the vestibule area 788 via nozzles 800 and 802.

Two brush assemblies 820 are attached to the back side of splash plate 574 so that their bristles extend horizontally across the opening of inlet port 624 in the splash plate 574. As shown in FIG. 24, each of these brush assemblies comprises a bracket holder 822 and a brush 824. The bracket holder in turn comprises a flat plate 826 and a U-shaped channel 828 extending from the plate along its entire length. The plate also has two elongated apertures 830 and 832 formed therein.

The back side of the plate is secured to the back (interior) side of splash plate 574 with the elongated apertures 830 and 832 aligned over apertures 834 and 836 formed in splash plate. Bolts 838 and 840 are used to secure the bracket holder to the splash plate through apertures 834, 836 and 830, 832 in conjunction with nuts 842 and 844.

Brush 824 comprises a spine ("crimp") 850 with a plurality of nylon bristles 852 extending from the spine. The spine bears a square cross section that complements the U-shaped cross channel 828 of the bracket holder 822. The bristles 852 are preferably cylindrical in cross section, although other shapes are possible. The bristles 852 should have a diameter of about $3/1000$-$12/1000$ inch. Such bristles will be characterized by sufficient tensile strength to withstand a knife blade 162 passing past them upon its insertion through inlet port 624 formed in splash plate 574. At the same time, the bristles 852 will be flexible enough to allow adjacent bristles within the brush 824 to be laterally displaced as the knife blade is inserted past them. The spine should be made of stainless steel. For purposes of this invention, a suitable brush assembly 820 may be sourced from W. W. Grainger of Lake Forest, Ill.

Each brush 824 is secured to its respective bracket holder 822 by means of inserting the spine 850 through the U-shaped channel 828 of the bracket. The brush will be contained inside the washing chamber 582 of the hand tool cleaning station 570. The bristles 852 of the brush should have a sufficient length so that the bristles extend horizontally half way across the width of the inlet port 624. The bristles of the other brush attached via another bracket holder to the other side of the splash plate 574 will cover the other half of the inlet port 624. In this manner, the two brushes with bristles extending laterally across the inlet port 624 will cover the port so that a knife blade 162 being inserted into the wash chamber 582 or withdrawn from the wash chamber will necessarily pass along the ends of the brush bristles.

Figure 33A:
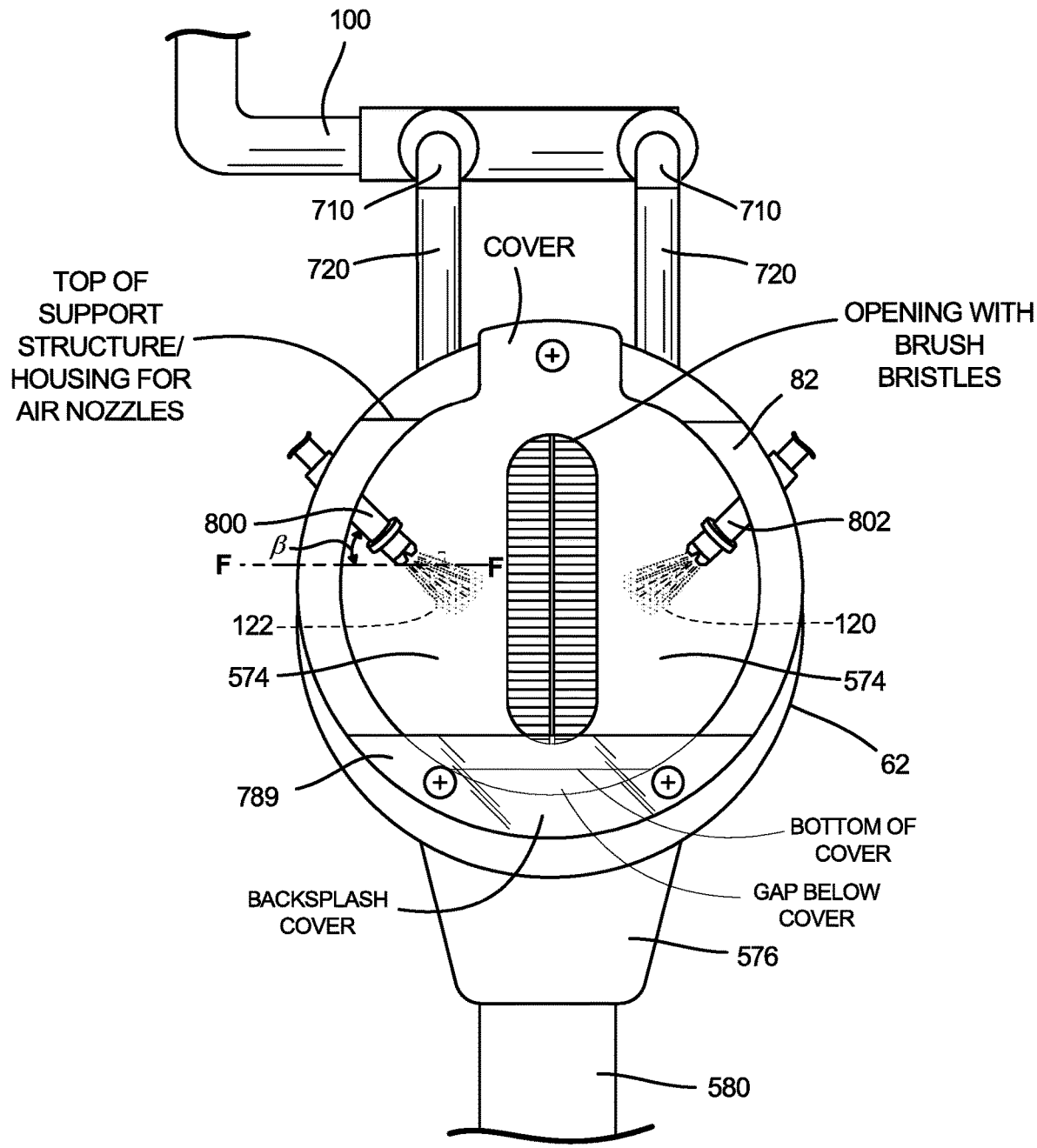
FIG. 33A is an end view of the hand tool wash apparatus of the present invention with compressed air/pressurized gas delivery nozzles positioned outside the washing chamber portion of the housing.
Figure 33B:
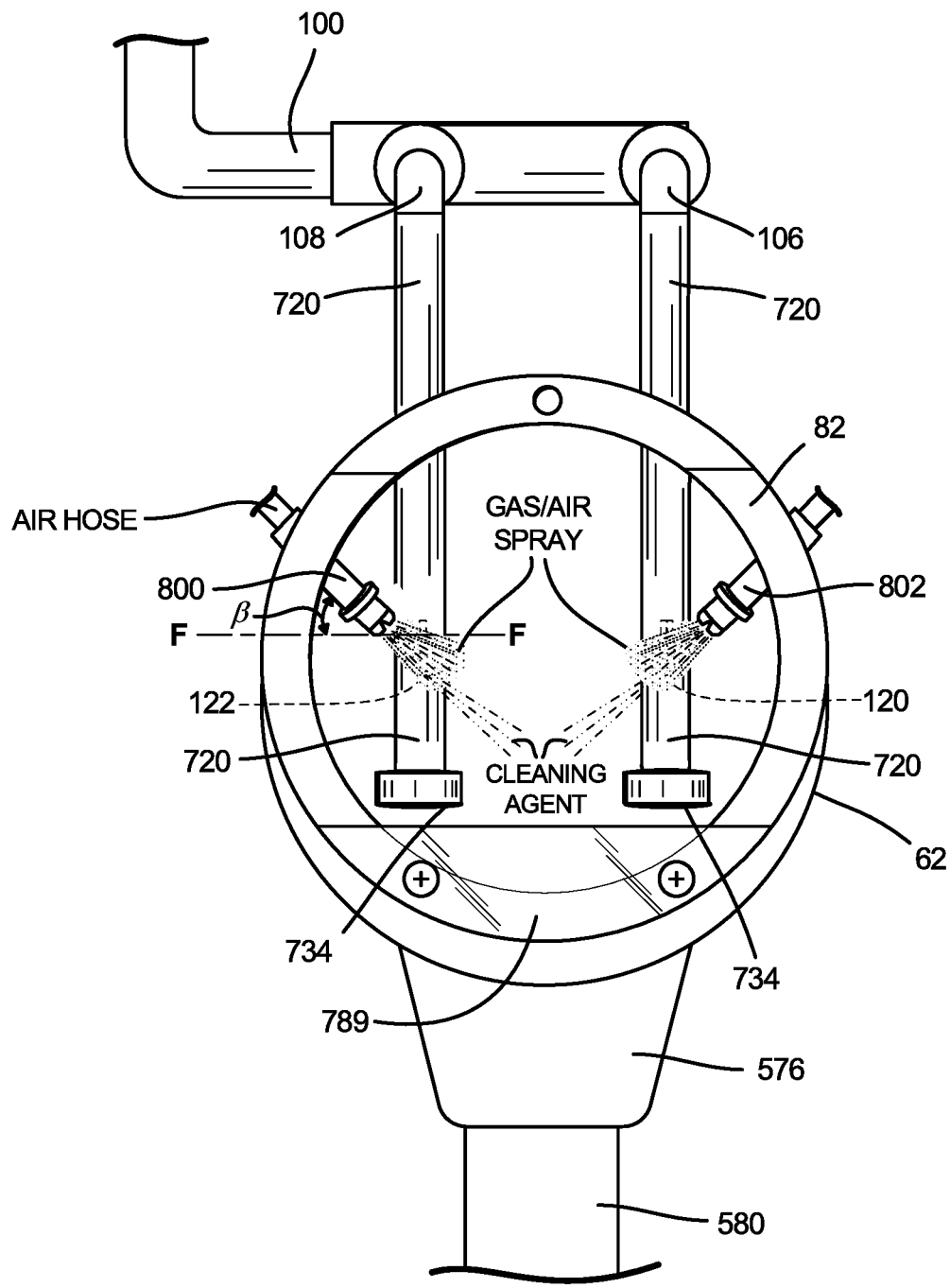
FIG. 33B is an end view of FIG. 33A with the splash plate removed to show the cleaning agent spray nozzles contained inside the washing chamber.
Figure 34:
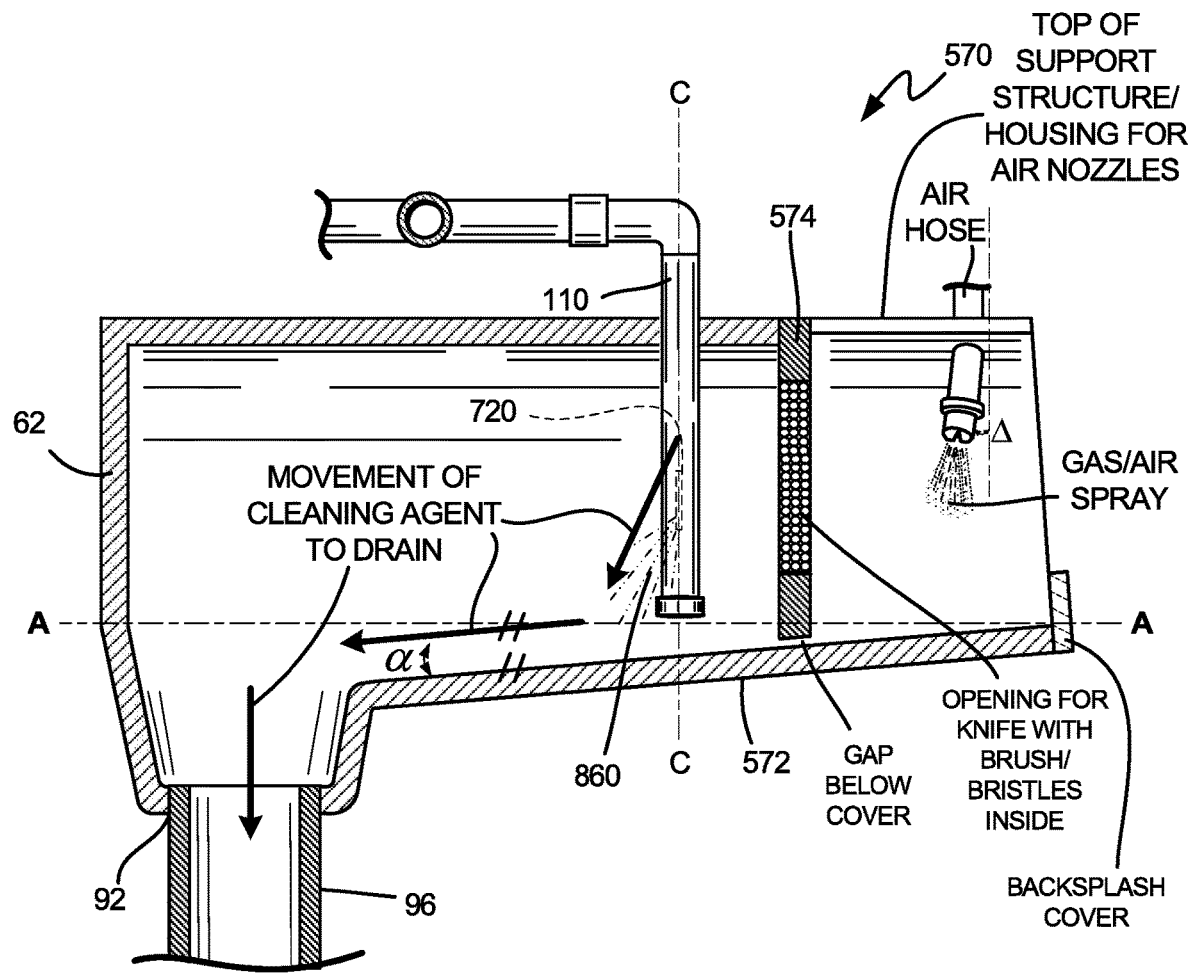
FIG. 34 is a cross-sectional side view of the hand tool wash apparatus of FIG. 24.

In operation, as shown in FIGS. 33A, 33B, and 34, the worker will insert the blade 162 of the knife 158 through the inlet port 624 of the splash plate 574 along a substantially horizontal axis B-B. The cleaning agent spray is produced by the vertical slots 730 formed along the lengths of the nozzle tubes 720 (see FIG. 28) positioned vertically inside the wash chamber 582 on each side of the inserted knife blade. The resulting substantially vertical fan-shaped pressurized spray arrays 860 act to clean both surfaces of knife blade 162 between the tip and heel that is positioned in front of the cleaning agent sprays as the knife blade is moved back and forth several times along longitudinal axis B-B in front of the spray arrays delivered to the opposed blade surfaces (see FIG. 34). The cleaning agent 520 will act to wash, scrub, and sanitize the blade surfaces.

Cleaning agent 520 delivered into the wash chamber 582 of the hand tool wash apparatus 500 of the present invention will fall to the bottom of the housing after it treats the opposite blade surfaces of the knife 158 inserted by the worker into the housing for cleaning. Because the housing wash tube 572 is declined at angle α at, e.g., 22 degrees, the cleaning agent will naturally flow along the length of the wash chamber and its housing wash tube to the elbow fitting 576. At this point, the cleaning agent will flow downwardly through reducer pipe fitting 638, offset pipe fitting 644, and drain pipe 580 into collection container 578, as described above.

But the vertical slots 730 of the nozzles 800, 802 may also be formed within the side walls of vertical supply conduits 720 at an angle with respect to the longitudinal axis B-B of knife blade movement within the housing (see FIG. 34) in order to direct the substantially vertical fan-shaped pressurized spray arrays 860 towards the back end 594 of housing wash tube 572. Such elongated outlet slots 760 should be positioned at an angle γ of about 2-15 degrees, preferably about 7 degrees rotated within a horizontal plane from a vertical axis C-C towards the middle of the housing cross section (see FIG. 33B).

Meanwhile, the elongated outlet slots 730 will deliver the cleaning agent fan-shaped spray arrays 860 towards each other to strike the opposed knife blade surfaces along the substantially horizontal axis E-E (see FIG. 33A). Thus, the cleaning agent fan-shaped spray arrays 860 are preferably directed towards each surface of the knife blade 158 along axis E-E, while being directed slightly towards the back end of the housing at angle γ.

In this hand tool wash station 500, the pressurized gas nozzles 800, 802 are positioned over the vestibule area 788 outside the washing chamber 582. The nozzles 800 and 802 are positioned on the top interior surface of the housing above each side of the knife blade 158. The nozzles are of a ball-and-socket design so that a supply of compressed air or other pressurized gas can be directed inside the vestibule area. At the same time, the blasts of compressed air or pressurized gas delivered by the nozzles 800, 802 to each side of the blade will dry the cleaning agent off the blade surfaces. In this manner, water spots and cleaning agent residue is avoided on the blade surfaces.

In this hand tool wash apparatus 500 of the present invention, the air/gas delivery nozzles 800, 802 should be rotated within a horizontal plane towards the middle of the housing cross section of the vestibule area 788 at a similar angle Δ of about 2-15 degrees, preferably about 7 degrees rotated within a horizontal plane from a vertical axis D-D (see FIG. 34). At the same time, however, the air/gas delivery nozzles 800, 802 will also be directed towards the bottom of the vestibule area 788 at an angle β of about 10-60 degrees, preferably about 45 degrees rotated within a vertical plane from axis F-F (see FIG. 33B). In this manner, the compressed air/pressurized gas supply nozzles are preferably directed towards the bottom of the housing at angle β, while being directed slightly towards the back end of the housing at angle Δ.

The substantially vertical fan-shaped pressurized spray arrays produced by the substantially vertical slot 730 of FIG. 28 formed in the interior lateral surface of each of the cleaning agent supply pipes 720 comprises a narrow slot formed within the surface of vertical supply conduits 720 that runs substantially vertically along the conduit. This outlet slot 730 should be about 1.5-3.0 inches high, preferably about 2.5-3.0 inches high. The slot should also be about 1/16 (0.0625)-5/32 (0.15625) inch wide, preferably about 1/8 (0.125) inch wide. The resulting substantially vertical fan-shaped pressuring spray array produced by these outlet slots on either side of the knife blade will strike the blade surfaces with a "blade" of cleaning agent that is approximately 2.5-3.0 inches high and 1/100,000 inch thin to focus its cleaning agent upon a specific area on the knife blade surfaces. Of course, there will be a similar vertical supply conduit 720 having a substantially vertical slot 730 mounted on the other side of the wash chamber, as shown in FIG. 33B. These two opposing fan arrays featuring a vertical blade of cleaning agent that is 2.5-3.0 inches high will be sufficient to cover wide knife blades that are inserted into the hand tool wash apparatus 500 for cleaning.

In an alternative embodiment, the vertical "slot" is produced by a series of vertically-oriented outlet holes drilled into the side of the cleaning agent supply conduits 720. These holes may be 12-20 in number. Each one should have a diameter of about 1/16 (0.06235)-5/32 (0.15625) inch wide, preferably about 1/8 (0.125) inch wide, and cover a vertical distance of about 2.0-3.0 inches, preferably about 2.5-3.0 inches. The substantially vertical fan-shaped pressurized spray arrays 125 produced by these series of vertically aligned holes 120c and 122c formed within the cleaning agent supply conduits 720 will be similar to the fan array produced by the substantially vertical slots of FIG. 28.

The knife blade should be moved by the robotic arm back and forth for a pass or two across the pressurized fan-shaped cleaning agent spray for about 3-8 seconds, preferably about 3-5 seconds. This will allow the full length of the knife blade 162 from tip to heel to be exposed to the substantially vertical fan-shaped array pressurized spray arrays to ensure that the entire blade is cleaned, scrubbed and sanitized to remove metal bits and grinding/sharpening wheel grit-cooling water slurry residue from the blade sharpening process. The cleaning agent 520 will act to wash the knife blade surfaces. It will also act to sterilize the knife blade surfaces to eradicate germs and bacteria thereon if a sterilizing agent like a chlorine compound is present in the cleaning agent (as opposed to a hot water wash). Finally, because the cleaning agent 520 is delivered to the knife blade surfaces under pressure, the resulting focused blast of the "blade" of the fan-shaped spray array may act to scrub residue particles off the knife blade surfaces.

For purposes of this Application, the cleaning agent 520 may comprise any liquid that is useful for removing dirt, animal or food residues, fat, greases, or chemical residues from the working surfaces of a hand tool like a knife blade 162. Chlorine in its various forms is the most commonly used sanitizer in food processing and handling applications. Commonly used chlorine compounds include liquid chlorine, hypochlorites, inorganic chloramines, and organic chloramines. Chlorine-based sanitizers form hypochlorous acid (HOCl) in solution. At pH 5, nearly all available chlorine will be in the form of HOCl. At pH 7, approximately 75% of all available chlorine will be in the form of HOCl. Chlorine compounds comprise broad-spectrum germicides that act on microbial membranes, inhibit cellular enzymes involved in glucose metabolism, have a lethal effect on DNA, and oxidize cellular proteins. Chlorine exhibits cleaning and sanitizing activity at low temperatures, is relatively inexpensive, and leaves minimal residue or film on the surfaces of the knife blade.

Other forms of cleaning agents 520 for purposes of this invention may comprise acidic cleaning agents containing strong mineral acids and chelants like vinegar or citric acid; or alkaline cleaning agents containing strong bases like sodium hydroxide, potassium hydroxide, bleach, or ammonia. Depending upon the specific type of hand tool and what residues need to be cleaned from its surfaces, the cleaning agent may also contain other additive agents like surfactants, polymeric phosphates or other sequestering agents, solvents, hydrotropic substances, polymeric compounds, corrosion inhibitors, skin protective agents, perfumes, or colorants. Water-soluble organic solvents like glycol ethers and fatty alcohols facilitate the removal of oils.

Hot water may be used as an alternative cleaning agent, or as a rinsing agent following the application of a chemical cleaning agent to the knife blade or other hand tool surface. Such hot water can be delivered as a spray at about 43-54° C. (110-130° F.), preferably about 49° C. (130° F.) for about 3-8 seconds, preferably about 3-5 seconds It may also be delivered as a spray at about 43-54° C. (110-130° F.) for about 3-8 seconds, preferably 3-5 seconds as a final rinse application for cleaning the knife blade surfaces.

The automated hand tool sharpening and cleaning system 90 of the present invention may optionally include a further device for ensuring the uniform sharpness of the knife blade that has been sequentially grinded, sharpened, and buffed/polished by the rotating hollow grinder wheels 200, 202, Edger coarse sharpening wheel, 212, Edger fine sharpening wheel 214, and the buffing wheel 232. This further device may comprise a bench top-mounted "Mousetrap Steel" sharpening device that is commercially available from Razor Edge Systems, the assignee of the present invention. It is disclosed by Applicant's U.S. Ser. No. 15/610,169 and U.S. Pat. No. 9,545,703, both of which are incorporated hereby by reference.

The finishing sharpener device may be mounted within the open housing structure 92 of the automated knife sharpener system 90 downstream of the buffing wheel 232. In this manner, the robotic arm 142 may be preprogrammed with machine commands to transport the knife held by its pneumatic gripper 146 to the Mousetrap Steel sharpener device, and manipulate the knife blade through the slot and along the sharpening steels and wiper rod, as described below, to ensure a smooth, extra sharp edge to the cutting edges of the knife blade. The robotic arm 142 will then be preprogrammed to transport the sharpened knife to the dull knife tray 110, as described above.

Figure 35:
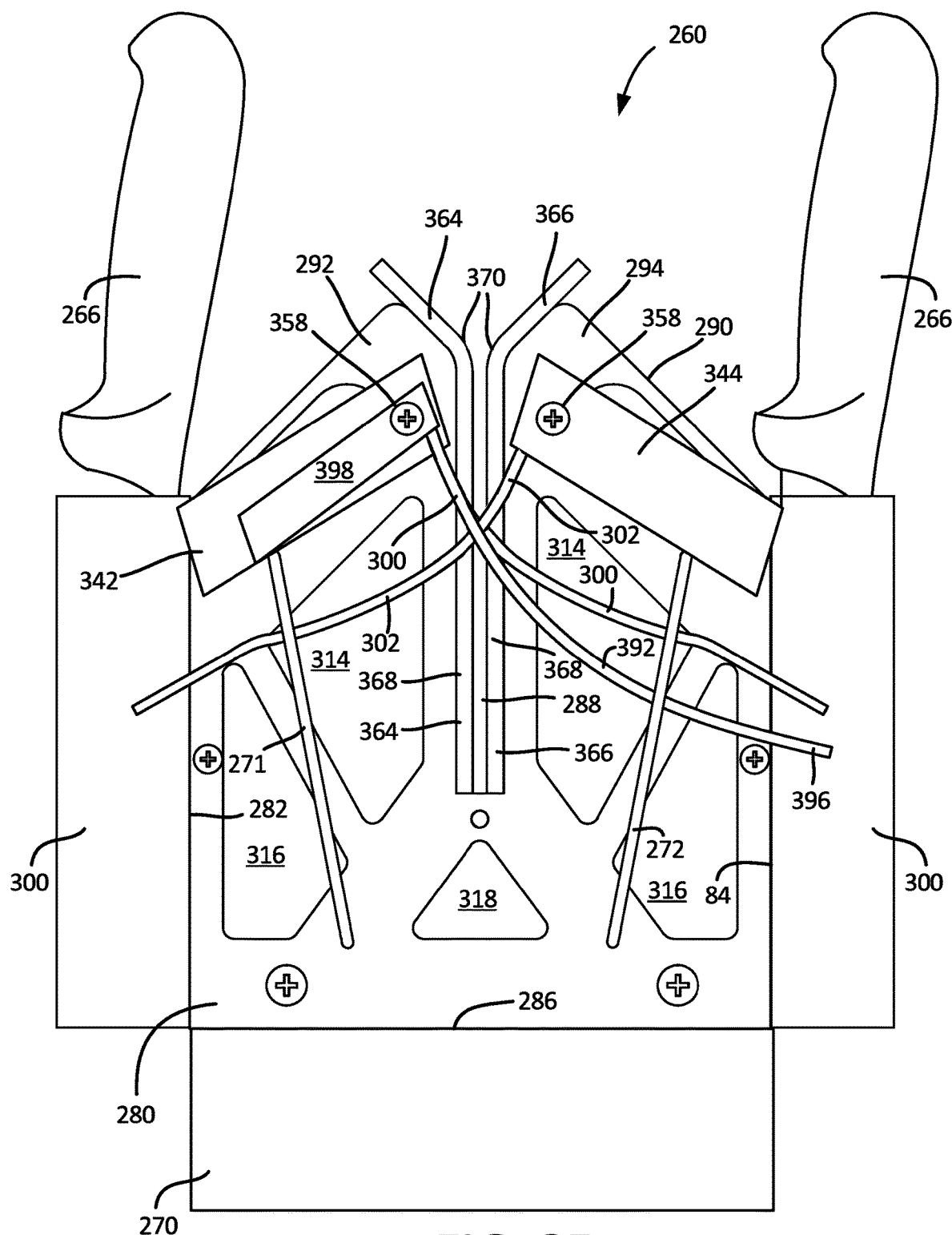
FIG. 35 is a front elevation view of a first embodiment of the finishing knife sharpener device of the present invention.
Figure 36:
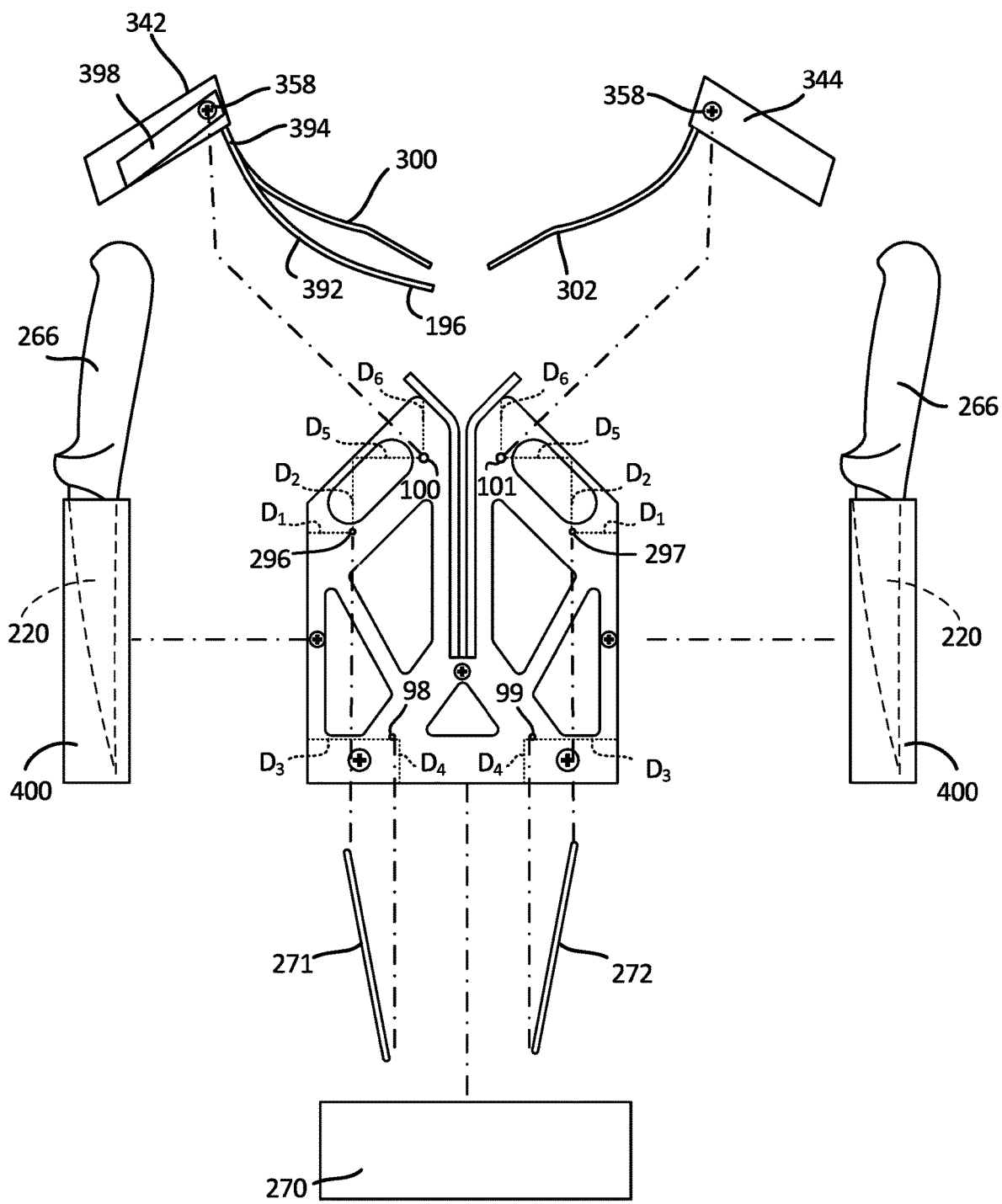
FIG. 36 is an exploded view of the panel member, base, protective wings, counterweights, sharpening steels, and knife receptacles of the finishing knife sharpener of FIG. 35.
Figure 37:
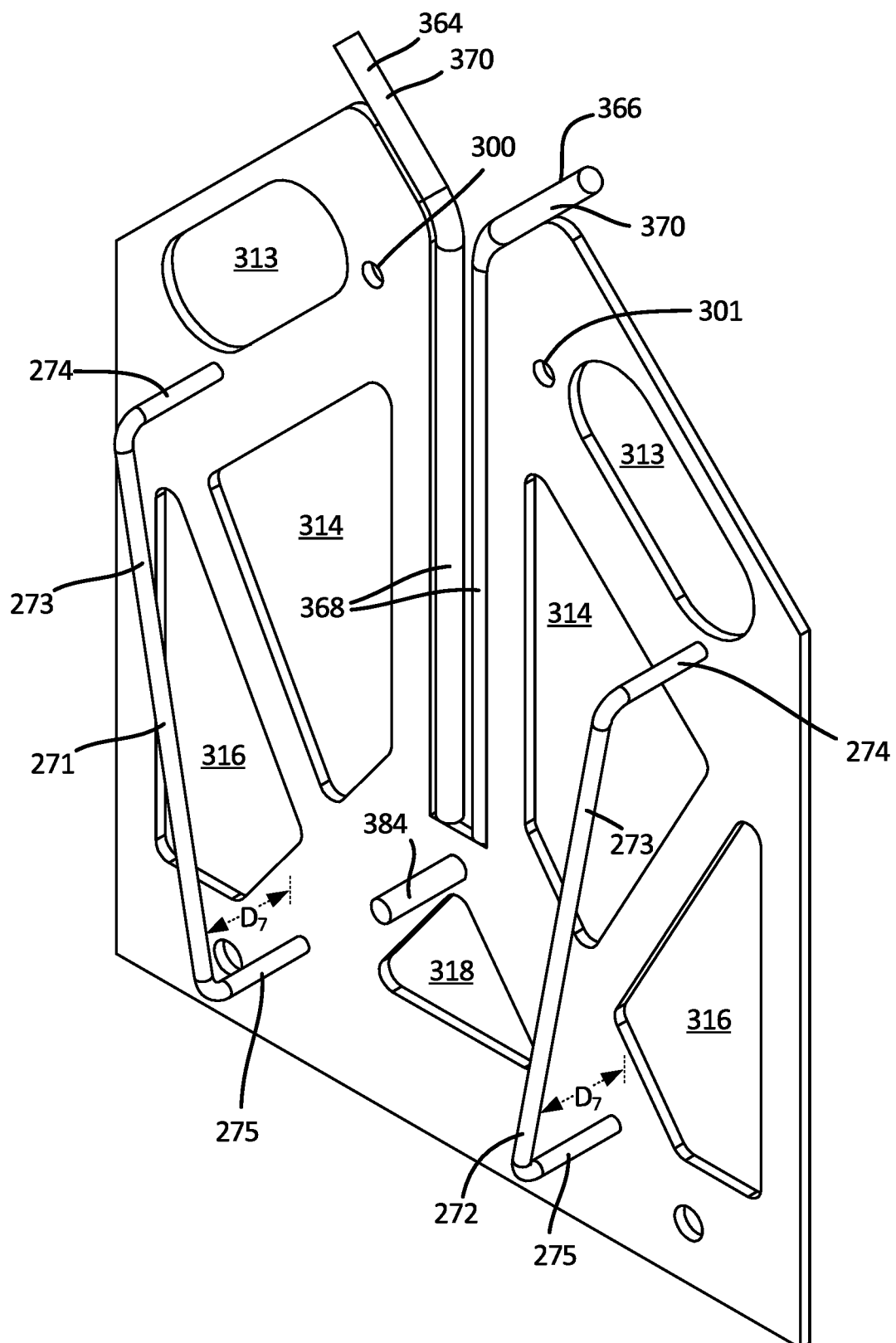
FIG. 37 is a perspective view of the panel member with the secondary steeling rods and protective wings attached.

As seen in FIG. 35, the finishing sharpener 260 comprises a panel member 280 to which is attached a base 270 for mounting the finishing sharpener 260 to the platform within the open structure 92 of the automated knife sharpener system 90. The panel can be made from a hardened plastic or metal material that will withstand knife cuts without undue damage, and is approved by industry standards such as the United States Department of Agriculture for the meat industry. The material should also be readily washable and subject to sterilization since, depending upon the environment in which the knife 266 is used, it may transfer dirt, grime, debris, food material, construction material, bacteria, etc. from the knife 266 to the knife sharpener 260. While other metals like aluminum are possible, the preferred metal material for the panel member 280 is food-grade stainless steel. Even more preferably, it should constitute non-carbon stainless steel such as 303/304 grade stainless steel to avoid potential rust caused by moisture, chemicals, or water that come into contact with the panel member.

At the same time, metal materials, including aluminum and stainless steel, are subject to abrasion that can blunt, chip, gouge, or otherwise damage the knife blade during the sharpening operation. Hence, an important feature of the finishing sharpener 260 are the secondary steeling rods 364 and 366 located along either edge of slot 288 in the panel member 280 that will be disclosed more fully below.

As shown more clearly in FIG. 35, the panel member 280 comprises a left edge 282, right edge 284, and bottom edge 286. A slot 288 is formed in the panel to partially bisect it from the top edge 290. This slot should be sufficiently wide to accommodate the width of the knife blade without jamming the knife or otherwise impeding its downward travel along slot 288 during the sharpening operation. Slot 288 bisects top edge 290 of panel member 280 to define upper left region 292 and upper right region 294 on the panel member.

Base 270 extends laterally from bottom edge 286 of panel member 280 to provide a means of securing the finishing sharpener device inside the open housing structure 92 of the automated knife sharpener system 90.

Located on the upper portion of the panel member 280 near the left edge 282 and right edge 284 are a pair of niches 296 and 297 that may adopt any suitable cross-sectional shape, such as a circle, square, or rectangle. These niches extend only partially through the width of the panel member 280 and feature a flat surface. The niches 296 and 297 should be positioned the same distance $D_1$ from the edge of the panel member 280 and the same distance $D_2$ from the top edge 290 of the panel member.

Similar niches 298 and 299 are located on the lower portion of the panel member 80 further away from the left edge 282 and right edge 284. These niches also extend only partially through the width of the panel member 280, and also feature a flat surface. These niches 298 and 298 should be positioned the same distance $D_3$ from the edge of the panel member, and the same distance $D_4$ from the bottom edge 286 of the panel member.

Also located on the upper left region 292 and upper right region 294 of the panel member 280 are a pair of through holes 300 and 301, respectively. These through holes 300 and 301 should be positioned the same distance $D_5$ from the edge of the panel member 280, and the same distance $D_6$ from the top edge 290 of the panel member.

A pair of guard wires 270 and 272 are U-shaped, featuring an elongated central portion 273 and side legs 274 and 275 extending from the central portion at an angle of about 90°. The guard wires 270 and 272 may bear any suitable cross-sectional shape 276 such as a circle, square, or rectangle. This cross-sectional shape 276 should match the cross sectional shape of niches 296, 297, 298 and 299. Ideally, it should be slightly larger than the cross-sectional shapes of the corresponding niches. In this manner, the side legs 274 and 275 of guard wires 270 and 272 can be press fit into the niches 296 and 297 and 298 and 299, respectively, so that the guard wires are attached to the panel member 280. Central portion 273 of the guard wires should be approximately parallel to the front surface of the panel member, and located distance $D_7$ of about ⅞ inches from the front surface of the panel member.

Alternatively, the side leg 274 and 275 of the guard wires 270 and 272 may be secured to the panel board by means of fasteners inserted through the back side of the panel member. Another securement method may entail welding the metal guardrail legs 274 and 275 to the front surface of the panel board.

A series of apertures 314, 316 and 318 may be formed within panel board 280. The stainless steel material used to make panel board 280 is strong enough to accommodate the loss of material within these apertures 314, 316 and 318. At the same time, a panel board bearing these apertures is lighter in weight and less expensive to manufacture than a solid stainless steel panel board would be.

Pivotally mounted upon the panel member 280 is a pair of counterweights 342 and 44. As shown more clearly in FIGS. 25 and 27, these counterweights 342 and 344 comprise a slab 346 of metal with holes 348 and 350 formed in them. The counterweights 342 and 344 are secured to panel member 280 by means of a bolt extending through the holes 348 and 350 and corresponding holes 299 and 301 formed in the panel member 280. These holes 348 and 350 are positioned distance $D_8$ from the inside edge 354 of the counterweights and distance $D_9$ from the top edge 356 of the counterweights. Counterweights 342 and 344 weigh about 4.5-6.1 ounces, preferably 5.0-5.8 ounces, respectively. They may also have different weights. In a preferred embodiment, the left counterweight 342 may weigh about 5.2 ounces, while the right counterweight weighs about 5.6 ounces.

A threaded insert (not shown) is fitted inside left through hole 299 and right through hole 301 in panel member 280. Bolts 358 having a threaded shank extend through holes 348 and 350 located in the counterweights 342 and 344, respectively, and into threaded engagement with the threaded inserts of the through holes to pivotally mount the counterweights to the panel member. These bolts 358 define the rotational axes for the counterweights.

Figure 38:
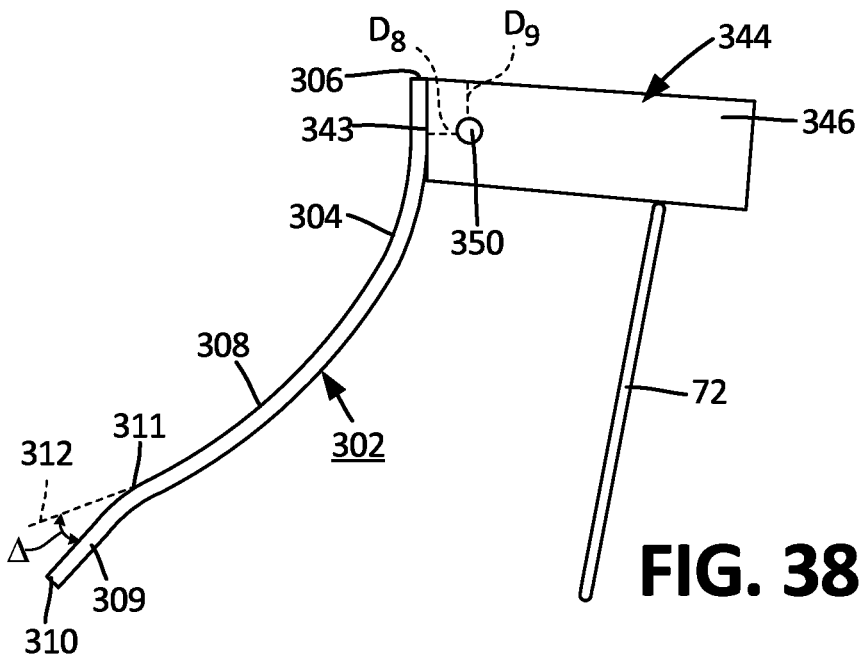
FIG. 38 is a frontal view of the counterweight and right-hand sharpening steel.
Figure 39:
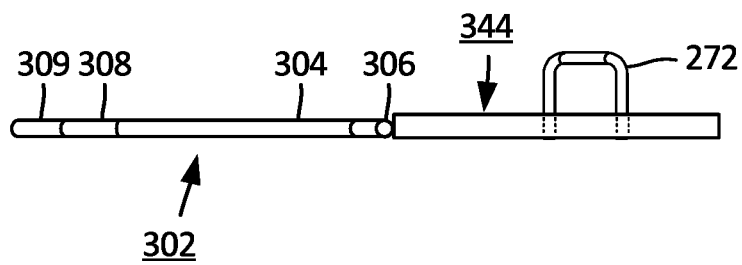
FIG. 39 is a top plan view of the counterweight and sharpening steel of FIG. 38.
Figure 40:
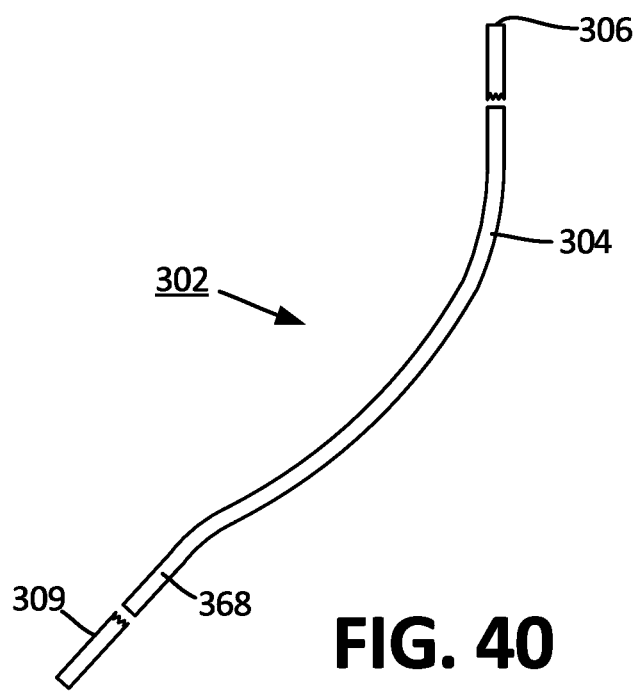
FIG. 40 is a deconstructed view of the sharpening steel.
Figure 41:
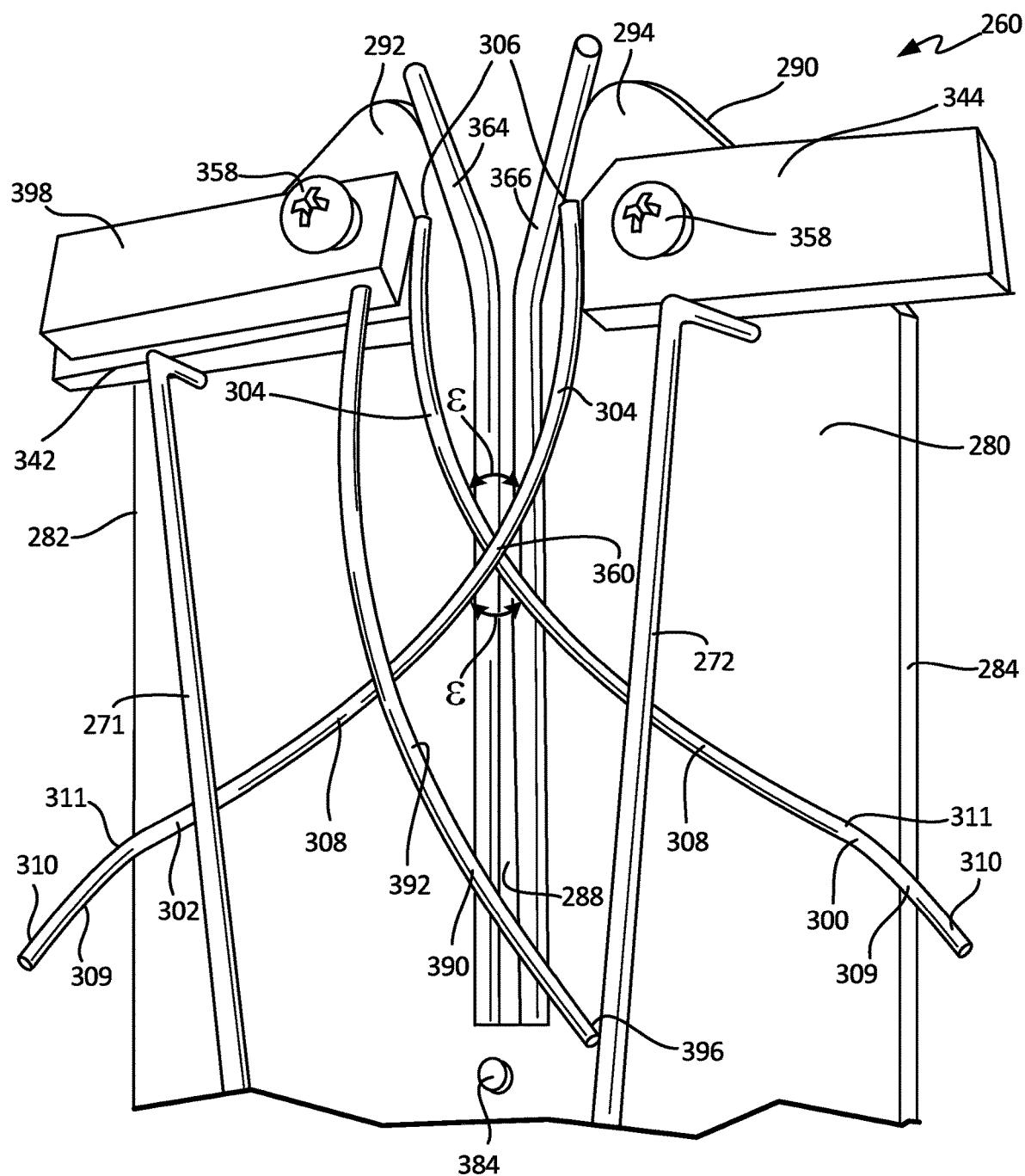
FIG. 41 is a partial front elevation view of a portion of the finishing knife sharpener of FIG. 35.
Figure 42:
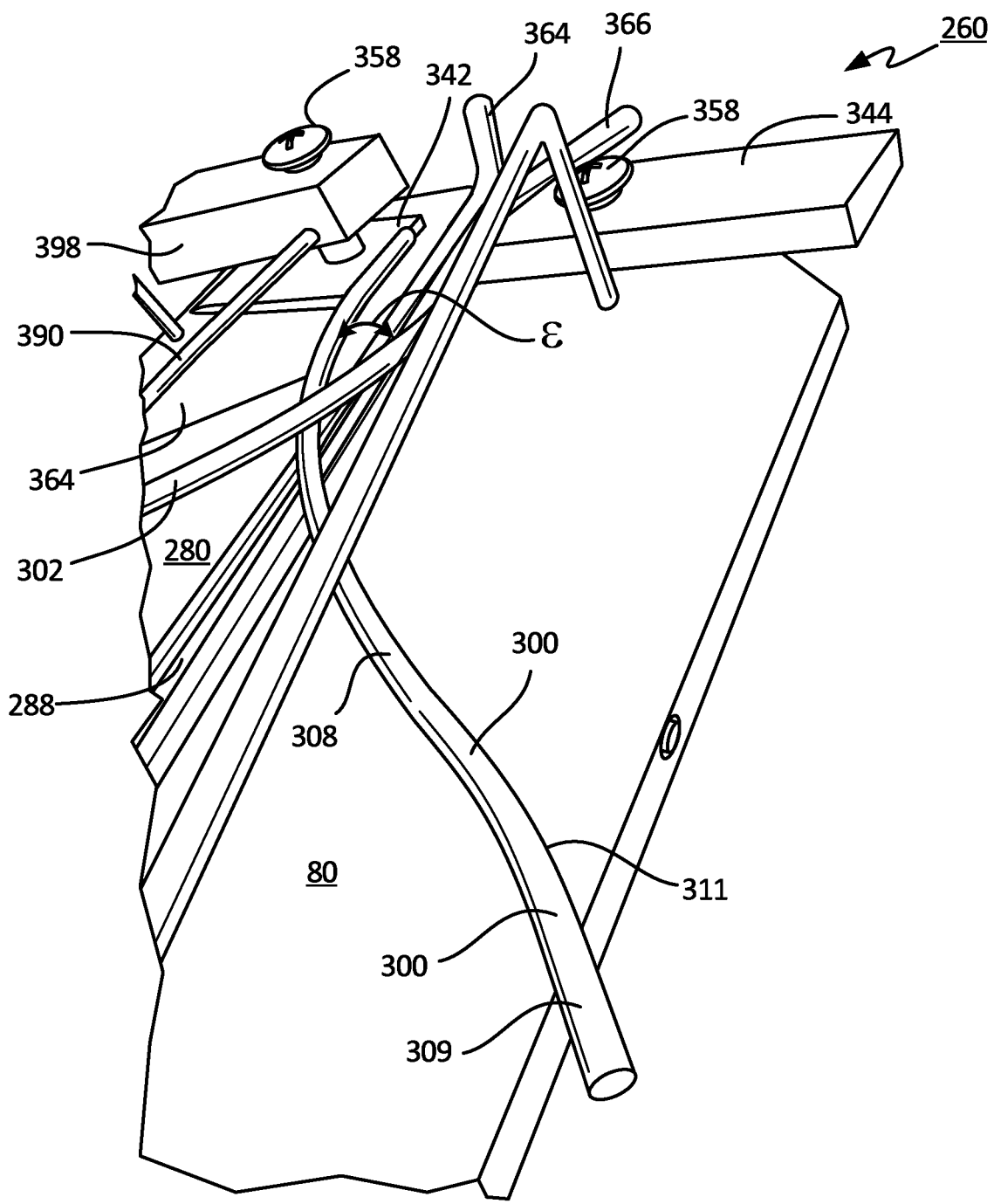
FIG. 42 is a partial perspective view of a portion of the finishing knife sharpener of FIG. 41.

A pair of sharpening steels 300 and 302 are fixedly connected along their attachment ends 306 to the inside edges 343 of counterweights 342 and 344, respectively. As shown in FIGS. 35 and 38, the left-hand sharpening steel 300 and right-hand sharpening steel 302 overlay panel member 280. These two sharpening steels each have a roughly circular cross section, although other shapes like an oval or triangle may be used. The sharpening steels 300 and 302 extend toward each other in criss-crossed relation, intersecting at point 360 along slot 288.

The sharpening steels 300 and 302 represent a honing steel, sometimes referred to as a "sharpening steel," "sharpening rod," "sharpening stick," or (in the food or cooking industry) a "butcher's steel" or "chef's steel." They comprise a rod made from hardened steel, stainless steel or stainless steel alloy, diamond-coated steel, or ceramic. When made from a carbon-containing stainless steel material like 440 C alloys (sourced, for example, from Discount Steel of Minneapolis, Minn.) or ceramic, they bear a smoothly, highly polished exterior surface. Optionally, they may include a plurality of longitudinal ridges. When made from diamond-coated steels, the steel material is embedded with abrasive diamond particles. Suitable diamond-coated steel or ceramic materials may be sourced from the Norton affiliate of Saint-Gobain Corporation of Courbevoie, France. But, the material from which the sharpening steels 300 and 302 are fabricated must have a higher tensile strength than the metal from which the knife blade 220 is made, or else it must be treated to a surface hardening process.

As is shown in FIGS. 35 and 38-40, each of the sharpening steels 300 and 302 has a terminal segment 309 that is relatively straight as compared with the concave segment 304, and extends away from the upward curvature of the concavely-shaped segment 304. The terminal segment 309 is convexly curved downwardly slightly beyond a straight orientation, and is connected to the upper concave segment 304 by a slightly more convex intermediate segment 308. As a consequence, the concavity of the upper segment 304 terminates at the intermediate segment 308, and the terminal segment 309 extends at an angle Δ to the tangent 312 line at its point of termination of concavity. This point of termination of concavity is at the point where intermediate segment 308 joins upper segment 304. Bend point 311 on the sharpening steel is defined by this transition from intermediate segment 108 to terminal segment 309. The angle Δ should be about 36-70 degrees preferably about 40-55 degrees, most preferably about 48 degrees. The upper segment 304 is fixedly secured to the inside edge 343 of the counterweights 342, 344, such as by a weld.

Once counterweights 342 and 344 are secured to panel member 280 as described above, the arced upper segment 304 of the sharpening steels 300, 302 curves along and above the top surface of panel member 280, passing over slot 288. Meanwhile, straight intermediate segment 308 of sharpening steel 300, 302 passes along and above the top surface of panel member 280 below guard wires 270 and 272 and side legs 274 to protect the sharpening steels from being torn off the panel member by an external force. Distal end 310 of the sharpening steel 300, 302 extends beyond the edges 282 and 284 of panel member 280. As shown in FIG. 35, sharpening steel 302 is positioned above sharpening steel 300, so that they cross over each other at intersection point 360 over slot 288.

Secured to at least of the edges of slot 288 in panel member 280 are secondary steeling rods 364 and 366. As shown more clearly in FIGS. 35-38, each of the secondary steeling rods comprises a straight section 368 and an angled section 370. The straight section is secured to the length of the slot edge, while the angled section 370 is secured to the similarly angled edge of the top portion of panel member 280 above slot 288. The secondary steeling rods 364 and 366 may have a cross-sectional area of any suitable shape, although a circular cross section is preferred. The diameter of the cross section should be about 3/16 inch. The secondary steeling rods 364 and 366 may be made from a 303/304 stainless steel material that is hard enough not to be nicked by the cutting edge of the passing knife blade, while not causing damage to the knife blade. 303/304 stainless steel is preferred. Ryerson Steel of Chicago, Ill., is a suitable source for the secondary steel rods.

The secondary steeling rods 364 and 366 are preferably welded to the slot edges of the panel member 280. By using a non-carbon stainless steel like 303/304 stainless steel for both the panel member and the secondary steeling rods, the weld will not produce rust.

The gap $D_{10}$ within the slot 288 of the panel member between the exterior edge of the secondary steeling rod 366 and the other side of slot, including any secondary steeling rod, is about 0.14-0.25 inch, preferably about 0.156 inch (5/32 inch). Such a gap width should balance the competing interests of a sufficiently small gap width to guide the knife blade through the slot, while having a sufficiently large gap width to avoid binding of the knife blade against the secondary steeling rod(s) or slot edge, taking into account the typical knife blade widths. This gap width $D_{10}$ could be tailored to a specific knife type and its blade width.

Figure 43:
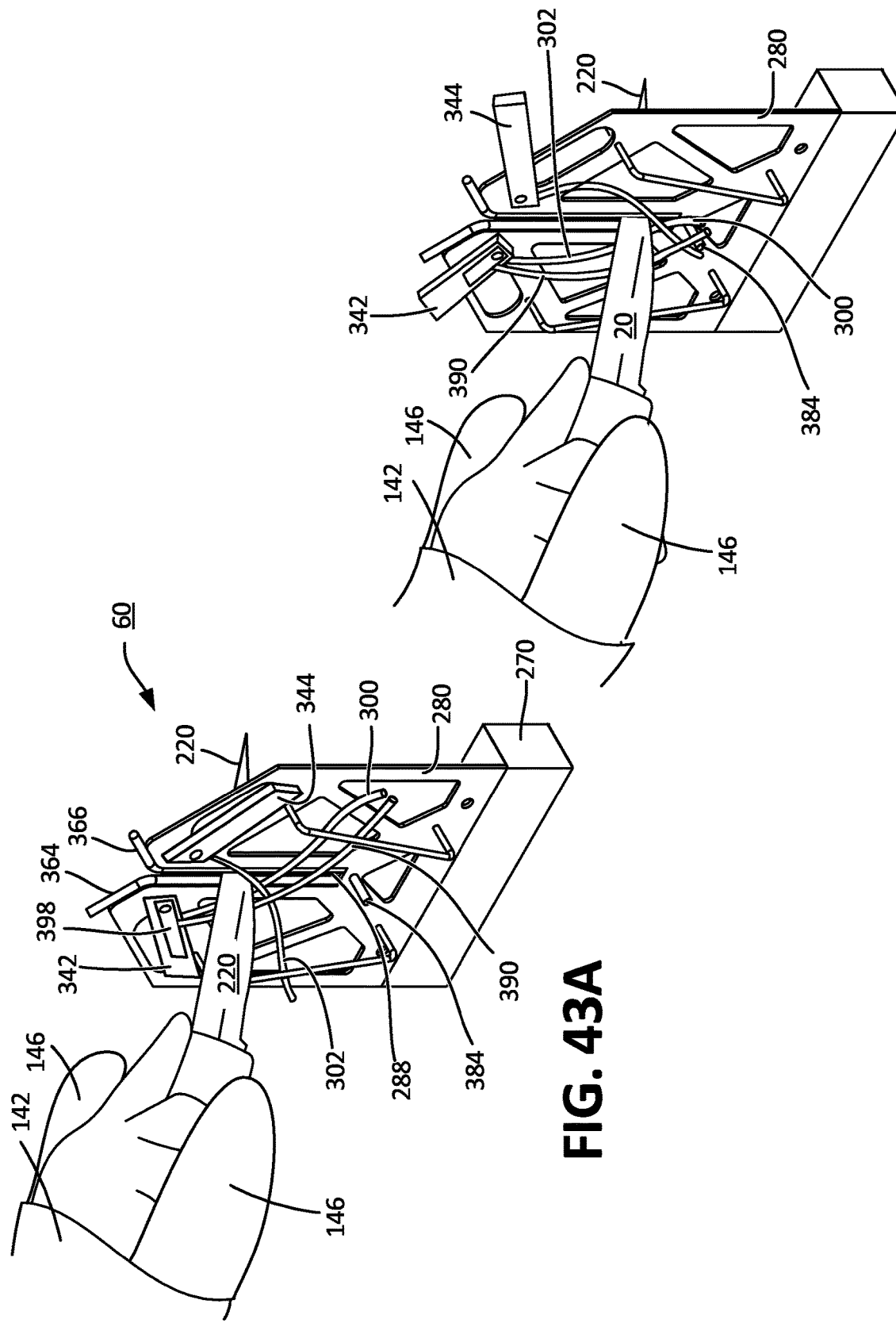
FIG. 43A is a partial perspective view of the finishing knife sharpener of FIG. 35 with the sharpening steels and wiper rod in their standby positions, and the knife blade first engaging the sharpening steels.
FIG. 43B is a partial perspective view of the finishing knife sharpener of FIG. 43A with the knife blade further progressed along the sharpening steels and wiper rod.

When the sharpening steels 300 and 302 are in their standby position, counterweights 342 and 344 pull the sharpening steels 300 and 302 upwardly towards the top edge 290 of panel with the bottom edge of the counterweights resting on side legs 274 of wings 270 and 272, and with intermediate segments 308, respectively, with a more horizontal position to hold the sharpening steels in a stationary position. As shown in FIG. 43A, the robotic arm 1421 inserts knife blade 220 into slot 288 of the panel member 280 from its top edge 290, and pushes the knife blade 220 down through the slot until it meets intersection point 360 of the two sharpening steels 300 and 302. The secondary steeling rods 364 and 366 will act to protect the cutting edges 244 of the knife blade from abutting the edges of the slot 288 which might otherwise damage the cutting edges. At the same time, the secondary steeling rods 364 and 366 act to guide the movement of the knife blade within slot 288 to maintain proper orientation of the knife blade against the sharpening steels 300 and 302.

Continued application by means of the robotic arm 142 of downwards force upon knife blade 220 causes the intersection point 360 of the sharpening steels 300 and 302 to likewise move in a downwards direction, as shown in FIG. 43B. The upper curved segments 304 of the sharpening steels will bow outwardly, while the terminal segments 309 are drawn towards each other until they or the distal ends 310 of the sharpening steels come into contact with stop post 384 extending from the top surface of panel member 280. At the same time, the robotic arm draws the knife blade towards it so that the beveled edges 244 of the knife blade 220 are slid along the intermediate segments 308 of the sharpening steels 300 and 302. In this matter, deformed edges 252 of the knife blade 220 are realigned to produce a sharpened cutting edge 228. When pressure is applied on the knife blade against the hard sharpening steels, it causes the blade's metal to yield to the harder sharpening steel metal or ceramic material of the sharpening steel to become realigned and thus sharpened. The counterweights 364 and 366 provide impedance against the downwards movement of the sharpening steels 300 and 302 to prolong the contact by the knife blade with the sharpening steels.

The slot 288 of the panel member 280 properly orients the knife blade 220 with respect to the sharpening steels 300 and 302. The counterweights orient the sharpening steels with respect to the slot and knife blade, and keep proper tension on the sharpening steels during the sharpening operation.

The angle ε at the intersection point 360 of the crisscrossed sharpening steels should be about 50-80 degrees, preferably about 65-75 degrees, most preferably about 70 degrees. Moreover, this intersection angle ε will be roughly maintained throughout the sharpening operation. It has been found that this angle allows the cutting edge of the knife blade to be sharpened at the correct angle for that knife without any need to match angles between the cutting edge and sharpening steels or make adjustments to the sharpening device, as is required by prior art devices. The distances $D_5$ and $D_6$ for the placement of the through holes 299 and 301 in the panel board 280, and the distances $D_8$ and $D_9$ for placement of the holes 346 and 348 in the attachment tabs 342 and 344 should be correctly defined at the point of manufacture to produce this desired intersection angle ε for the sharpening steels 300 and 302 pivotally mounted to the panel member via the attachment tabs.

Yet, the sharpening steel surface must also be super smooth in order to avoid further damage and deformation caused by the sharpening steel to the knife blade that could cause unwanted burrs along the blade edge. Thus, the sharpening steels do not function like grinding wheels, whetstones, or hones that are commonly used to remove metal burrs from a blade before it can be sharpened. At the same time, the two sharpening steels 300 and 302 simultaneously treat the opposite beveled edges 244 of the knife blade to realign the cutting edge 228. Because of the cylindrical surface of the sharpening steels 300 and 302, they sharpen the cutting edge without any need to maintain the knife blade at a specified angle with respect to the sharpening surface unlike with prior art processes. This enables unskilled persons to sharpen knife blades using the Mousetrap Steel knife sharpener device 260 of the present invention.

Optionally attached to the finishing sharpener 260 is wiper rod 390. Constituting sharpening steel in its own right, it has a gradually curved main body 392 with an attachment end 394 and a distal end 396. The attachment end 394 is secured to a counterweight 398 comprising a slab 400 of metal with a hole 402 in it. Counterweight 398 is secured to panel 280 by means of a bolt extending through the hole 402 and a corresponding hole (not shown) in the panel 280. As shown in FIG. 24, the same bolt 352 may be used to secure both attachment tab 342 and counterweight 398 to panel member 280. Counterweight 398 only weighs about 2 ounces. This is much lighter than the counterweights 363 and 364.

When assembled, the curved body 392 of wiper rod 390 extends from its attached end 394 and counterweight 398 over and above panel member 280 and sharpening steel 302 and slot 288 with its distal end 396 extending adjacent to or past right edge 284 of panel 280 (see FIG. 43A). When the knife blade 220 is pushed downwards by the robotic arm through slot 288 to contact the sharpening steels 300 and 302 at intersection point 360 and continued to push the sharpening steels in a downwards direction (see FIG. 43B), the knife blade 220 will contact wiper rod 390 to also push it down. By drawing the knife blade along wiper rod 390 in addition to sharpening steels 300 and 302, the wiper rod 390 will act to polish the sharpened cutting edge 228 produced by the sharpening steels 300 and 302 to further straighten any imperfections along the cutting edge. At the same time, counterweight 398 provides impedance against the downward movement of the wiper rod to prolong the contact by the knife blade with the wiper rod. There is no leaf spring biasing the wiper rod.

When the knife blade is withdrawn by the robotic arm from the slot 288 in the finishing sharpener 260, the tails 378 of the counterweights 342 and 344 will act to bias sharpening steels 302 and 300, respectively, back to their stand-by position shown in FIG. 43A. Meanwhile, counterweight 398 acts to return wiper rod 390 to its standby position. The finishing sharpener 260 is now ready to sharpen the cutting edge along the blade 220 of the same knife 210 or another knife.

Sharpening steels normally cannot repair burrs or other severely deformed regions along a knife blade cutting edge. They just realign less severely deformed regions. However, in the case of the present invention, the sharpening steels 300 and 302 allow such a repair step to be carried out. A bend 311 exists within the sharpening steel 300, 302 where the straight intermediate segment 308 joins the terminal segment 309. This bend provides additional surface area on the sharpening steel. As seen in FIG. 43B, the stop post 384 is properly located on the panel member 280 so that when the terminal segments 309 or distal ends 310 of the sharpening steels abut the stop post to arrest the inward movement of the steels when the knife blade is pressing down on the steels, the intersection point 360 of the criss-crossed sharpening steels is defined by the two bend points 311. When the knife blade 220 is pushed down by the robotic arm in the slot 288 to engage this intersection point 360, the stop post 384 will lock the two sharpening steels in place so that further pressure is applied by the bends 311 of the sharpening steels against the burr or severely deformed region of the cutting edge of the knife blade to repair it. The polished exterior of the sharpening steels and locked position of the steels produces this extra sharpening capacity by the finishing sharpener 260.

Attached to the sides of panel member 280 of finishing sharpener 260 may be at least one storage receptacle 400. The receptacle has a slot 402 formed within its upper portion for accepting a knife blade. In this manner, one or more knives may be stored in receptacles 400, so that either sharpened knives are available for use on the meat processing line, or dulled knives are waiting to be sharpened on finsing sharpener 260.

Figure 44:
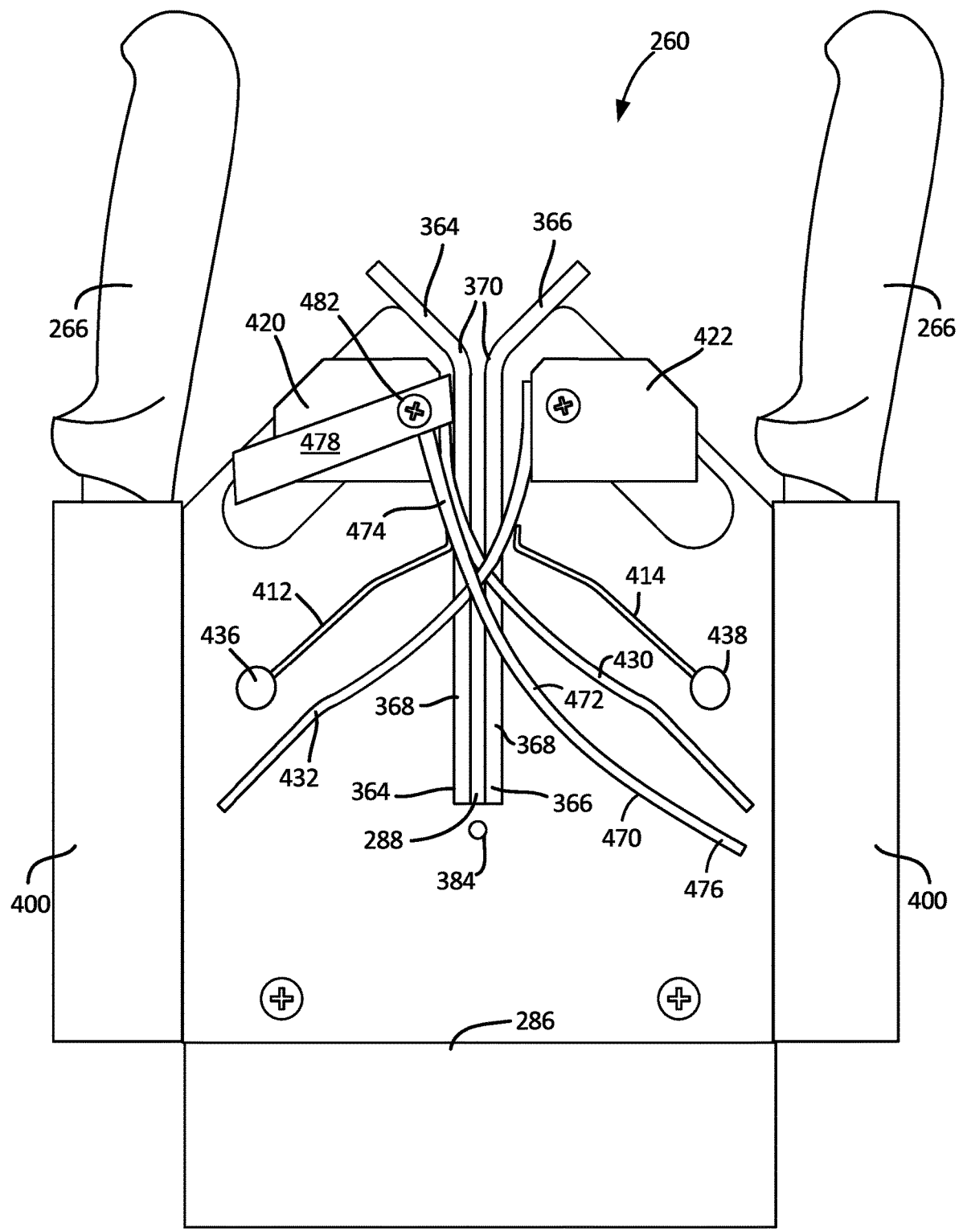
FIG. 44 is a front elevation view of a second embodiment of the finishing knife sharpener device of the present invention.

In an alternative embodiment of the present invention, the counterweights 342 and 344 of sharpening steels 300 and 302 may be replaced by leaf springs 412 and 414, as shown in FIG. 44 for finishing sharpening device 410. Parts of the knife sharpener 410 that are similar to the parts of finishing sharpener 260 described above are identified in FIGS. 44-48B with the previously used element numbers.

Figure 45:
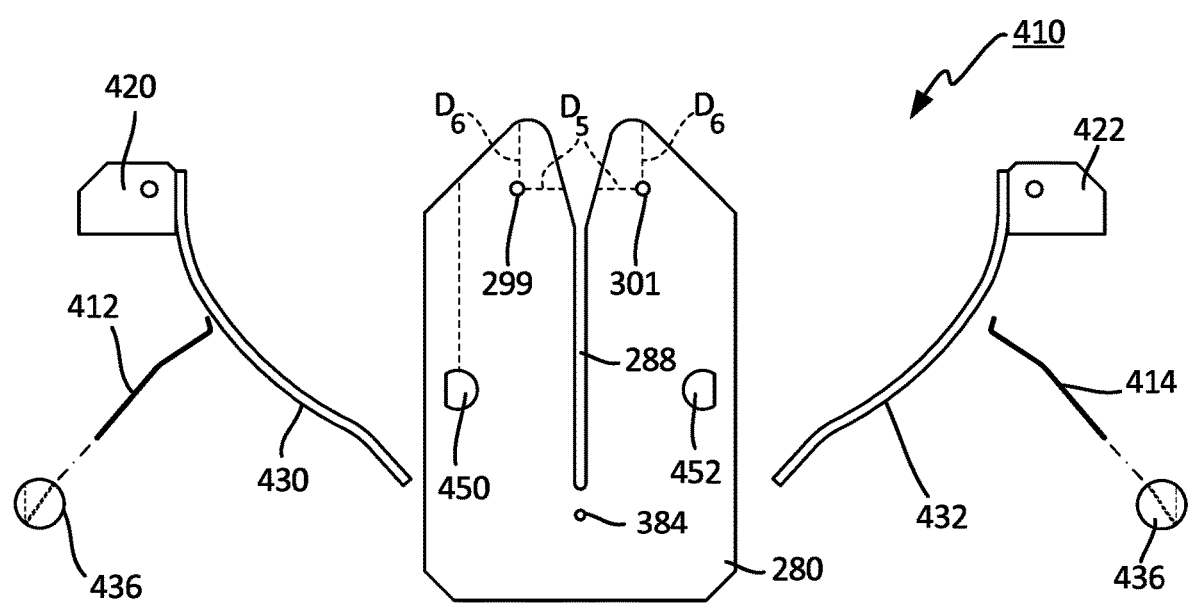
FIG. 45 is an exploded view of the panel member, attachment tabs, sharpening steels, cams, and leaf springs of the knife sharpener of FIG. 44.
Figure 46A:
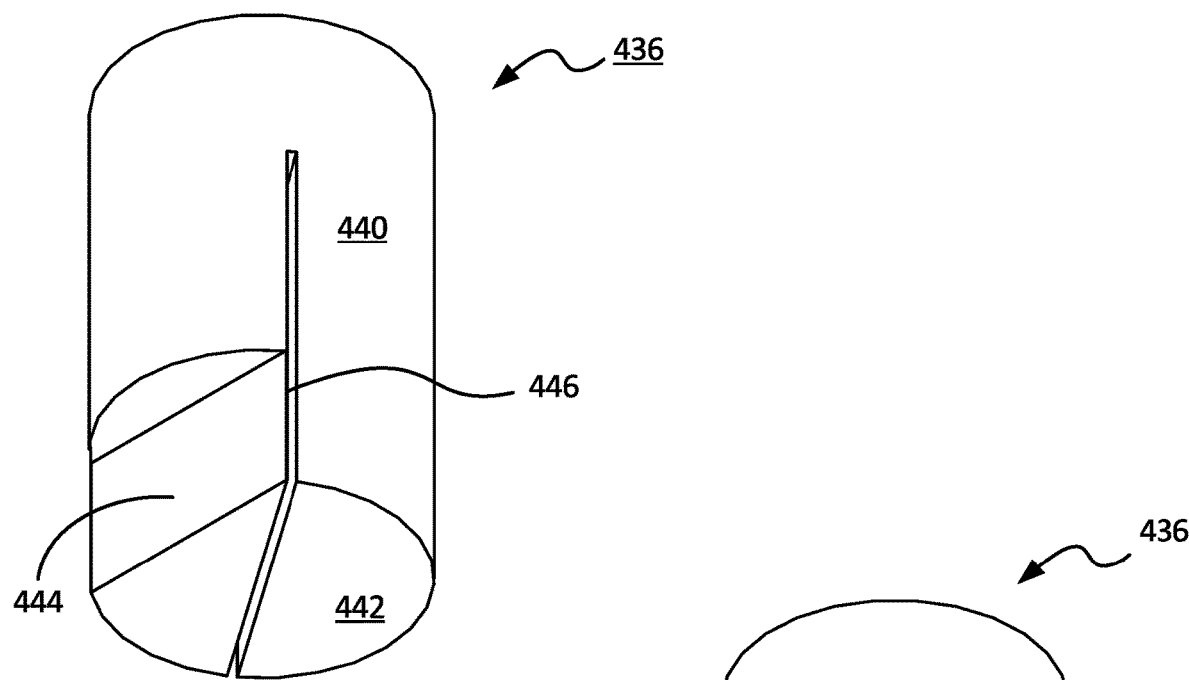
FIG. 46A is a perspective, upwards view of the left-hand stationary cam for the finishing knife sharpener of FIG. 44.
Figure 46B:
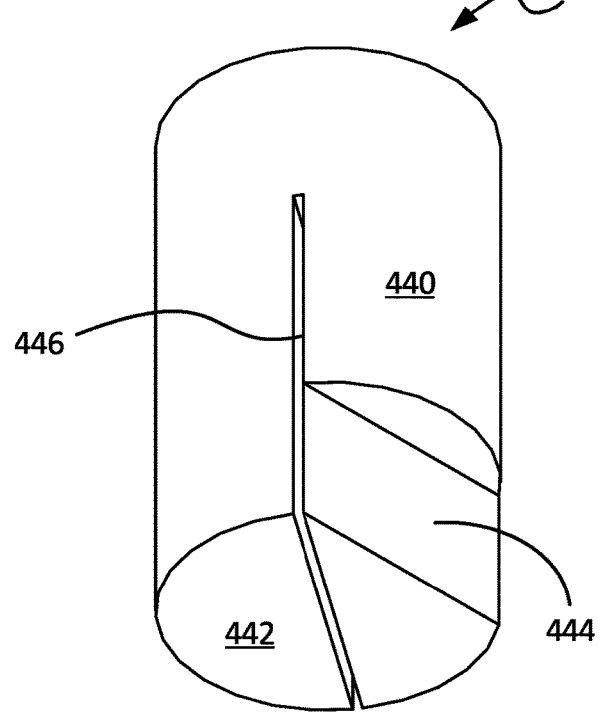
FIG. 46B is a perspective, upwards view of the right-hand stationary cam for the finishing knife sharpener of FIG. 44.
Figure 47:
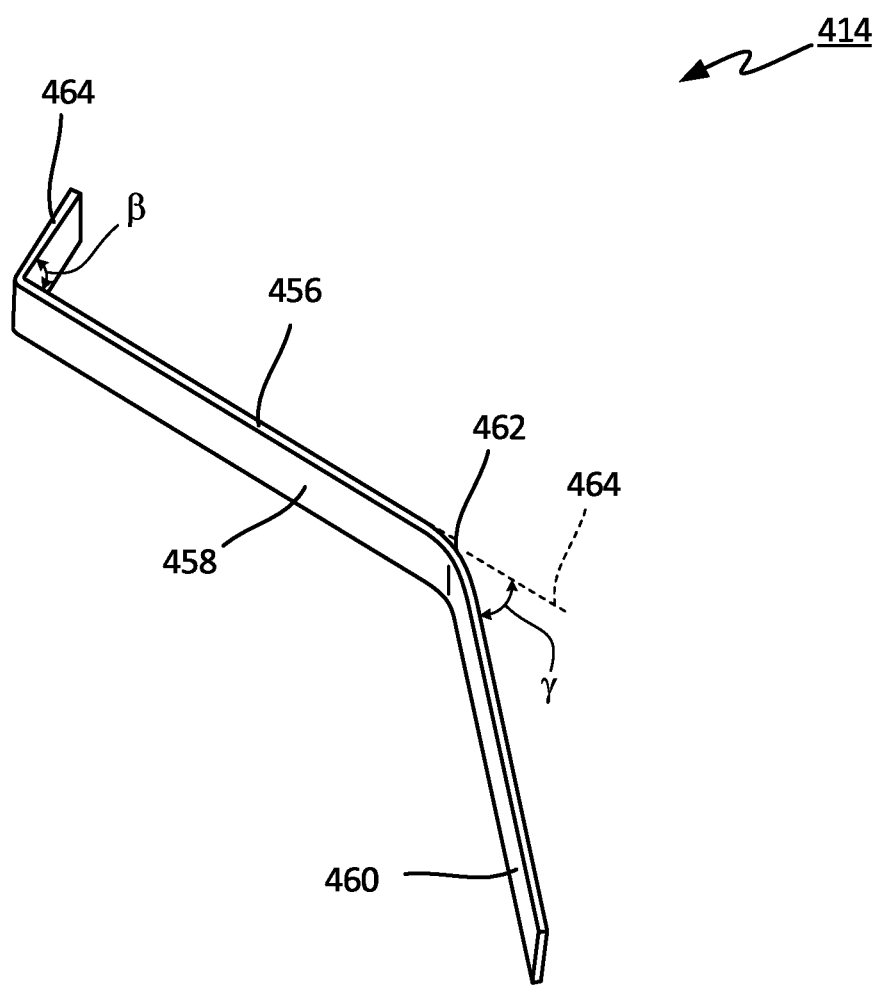
FIG. 47 is a perspective view of an elliptical leaf spring.

As shown in FIG. 45, located on the panel member 280 near the left edge 282 and right edge 284 are a pair of D-shaped niches 416 and 417. These niches extend only partially through the width of the panel member 280 and feature a flat surface. The niches 416 and 417 should be positioned the same distance $D_{11}$, from the edge of the panel member 280, and the same distance $D_{12}$ from the top edge 290 of the panel member.

Pivotably mounted upon the panel member 280 is a pair of attachment tabs 420 and 422. These attachment tabs 420 and 422 comprise a thickened piece of stainless steel material approximately $^{100}/_{1000}$-inch thick having equal masses. Holes 424 and 426 are formed within attachment tabs 420 and 422, respectively. These holes 424 and 426 are positioned equal distances from the inside edge of the attachment tabs and the top edge of the attachment tabs.

A threaded insert (not shown) is fitted inside left through hole 299 and right through hole 301 in panel member 280. Bolts 358 having a threaded shank extend through holes 420 and 422 in the attachment tabs 420 and 422, respectively, and into threaded engagement with the threaded inserts of the throughholes to pivotably mount the attachment tabs to the panel board. These bolts 358 define the rotational axes for the attachment tabs.

A pair of sharpening steels 430 and 432 are fixedly connected along their attachment ends 306 to the inside edges of attachment tabs 420 and 422, respectively. As shown in FIG. 44, the left-hand sharpening steel 300 and right-hand sharpening steel 302 overlay panel member 280. These two sharpening steels each have a roughly circular cross section, although other shapes like an oval or triangle may be used. The sharpening steels 300 and 302 extend toward each other in criss-crossed relation, intersecting at point 360 along slot 288. The sharpening steels 430 and 432 have the same structure and geometry as sharpening steels 300 and 302 described above for the Mousetrap Steel knife sharpener embodiment 260.

Extending upwards from the surface of panel member 280 of knife sharpener 410 near the left edge 282 and right edge 284, as shown in FIG. 44 are stationary cams 436 and 438, respectively. These stationary cams may bear any suitable shape such as a cylinder or cube. As shown more clearly in FIGS. 46A and 46B, each cam bears an exterior surface 440 and a bottom surface 442. A cut-out niche 444 formed in the side wall causes bottom surface 442 to be D-shaped. A slot 446 extends vertically within the cam from the bottom surface 442.

The stationary cams 436 and 438 are press-fitted into left niche 450 and right niche 452, respectively, in panel member 280. The perimeter and surface area of the bottom surface 442 of the cam is slightly larger than the perimeter and bottom surface area of the panel member niche, so that the cam is securely connected to the panel board 80 without the need for a bolt or screw that could otherwise provide a breeding ground for bacteria. The cooperating straight side and corners of the D-shaped profiles of the cams and niches act to inhibit the cam from rotating within respect to the panel member. This stationary feature for the cam ensures that slot 446 will be maintained at an approximately 35 degree angle with respect to slot 288 on the panel member 280.

Once attachment clips 420 and 422 are secured to panel member 280 as described above, the arced upper segment 304 of the sharpening steels 430 and 432 curves along and above the top surface of panel member 280, passing over slot 288. Meanwhile, straight intermediate segment 308 of sharpening steel 300, 302 passes along and above the top surface of panel member 280 below cams 436 and 438. Distal end 310 of the sharpening steel 430 and 432 extends beyond the cams. As shown in FIG. 44, sharpening steel 432 is positioned above sharpening steel 430, so that they cross over each other at intersection point 360 over slot 288.

The finishing sharpener 410 also comprises elliptical leaf springs 412 and 414. As shown more clearly in FIG. 47, elliptical leaf spring 414 comprises a rectangular strip 456 of metal material having the required combination of rigidity and elasticity to act like a spring. The strip 456 comprises a first segment 458 that leads into a second segment 460 along a bend 462. Tail 464 is connected to the end of first segment 458, bent away from the first segment at an angle β of about 100-110 degrees, preferably about 102-106 degrees, most preferably about 104 degrees. Second segment 460 is bent away from first segment 458 at an angle γ with respect to tangent line about 464 of 9-36 degrees, preferably about 15-20 degrees, most preferably about 18 degrees. Such an elliptical leaf spring 414 is made from "spring steel" material that may be sourced from W. S. Grainger, Inc. of Lake Forest, Ill., or McMaster-Carr Supply Company of Elmhurst, Ill. Elliptical leaf spring 412 is manufactured in the same manner as elliptical spring leaf 414, as described above.

As shown in FIG. 44, elliptical leaf springs 412 and 414 are assembled onto knife sharpener 410 with the end of their respective second segments 460 inserted into slot 446, of cams 436 and 438. When the cam with the end of the leaf spring inserted into the slot is press fitted into the niche in the panel member, the two portion of the body of the cam adjacent to the slot will be pushed towards each other by the perimeter walls of the niche, thereby tightly holding the spring end in place. Extending from the cams with their respective first and second segments positioned above panel member 280, their first tails 464 about the arced upper segments 304 of sharpening steels 430 and 432.

When the sharpening steels 430 and 432 are in their standby position, elliptical leaf springs 412 and 414 push the sharpening steels 430 and 432 upwardly towards the top edge 290 of panel with intermediate segments 308 abutting stationary cams 436 and 438, respectively, to hold the sharpening steels in a stationary position. As shown in FIG. 48A, the robotic arm 142 inserts knife blade 220 into slot 288 of the panel member 280 from its top edge 290, and pushes the knife blade 220 down through the slot until it meets intersection point 360 of the two sharpening steels 430 and 432. Continued application by the robotic arm 142 of downwards force upon knife blade 220 causes the intersection point 360 of the sharpening steels 430 and 432 to likewise move in a downwards direction, as shown in FIG. 37B. The upper curved segments 304 of the sharpening steels will bow outwardly against tails 464 of leaf springs 412 and 414, while the terminal segments 309 are drawn towards each other until they or the distal ends 310 of the sharpening steels come into contact with stop post 384 extending from the top surface of panel member 280. At the same time, the robotic arm draws the knife blade towards it so that the beveled edges 244 of the knife blade 220 are slid along the intermediate segments 108 of the sharpening steels 430 and 432. In this matter, deformed edges 252 of the knife blade 220 are realigned to produce a sharpened cutting edge 228. When pressure is applied on the knife blade against the hard sharpening steels, it causes the blade's metal to yield to the harder sharpening steel metal or ceramic material of the sharpening steel to become realigned and thus sharpened. The elliptical leaf springs 412 and 414 provide impedance against the downwards movement of the sharpening steels 430 and 432 to prolong the contact by the knife blade with the sharpening steels.

The slot 288 of the panel member 280 properly orients the knife blade 220 with respect to the sharpening steels 430 and 432. The leaf springs orient the sharpening steels with respect to the slot and knife blade, and keep proper tension on the sharpening steels during the sharpening operation. The stationary cams properly orient the springs at an angle of about 35 degrees with respect to the slot.

The angle ε at the intersection point 360 of the crisscrossed sharpening steels should be about 50-80 degrees, preferably about 65-75 degrees, most preferably about 70 degrees. Moreover, this intersection angle ε will be roughly maintained throughout the sharpening operation. It has been found that this angle allows the cutting edge of the knife blade to be sharpened at the correct angle for that knife without any need to match angles between the cutting edge and sharpening steels or make adjustments to the sharpening device, as is required by prior art devices. The distances $D_5$ and $D_6$ for the placement of the through holes 299 and 301 in the panel board 80, and the distances for placement of the holes 424 and 426 in the attachment tabs 420 and 422 should be correctly defined at the point of manufacture to produce this desired intersection angle ε for the sharpening steels 430 and 432 pivotably mounted to the panel member via the attachment tabs.

Yet, the sharpening steel surface must also be super smooth in order to avoid further damage and deformation caused by the sharpening steel to the knife blade that could cause unwanted burrs along the blade edge. Thus, the sharpening steels do not function like grinding wheels, whetstones, or hones that are commonly used to remove metal burrs from a blade before it can be sharpened. At the same time, the two sharpening steels 430 and 432 simultaneously treat the opposite beveled edges 44 of the knife blade to realign the cutting edge 228. Because of the cylindrical surface of the sharpening steels 430 and 432, they sharpen the cutting edge without any need to maintain the knife blade at a specified angle with respect to the sharpening surface unlike with prior art processes. This enables robots to easily sharpen knife blades using the Mousetrap Steel knife sharpener device 260 of the present invention.

Optionally attached to finishing sharpener 410 is wiper rod 470. Constituting a sharpening steel in its own right, it has a gradually curved main body 472 with an attachment end 474 and a distal end 476. The attachment end 474 is secured to a counterweight 478 comprising a slab 480 of metal with a hole 482 in it. Counterweight 478 is secured to panel 280 by means of a bolt extending through the hole 482 and a corresponding hole (not shown) in the panel 280. As shown in FIG. 44, the same bolt 484 may be used to secure both attachment tab 420 and counterweight 478 to panel member 280. Counterweight only weighs 2-6 ounces, preferably 3 ounces. This is much lighter than the counterweights used in the MOUSETRAP STEEL prior art knife sharpener that weigh 20 ounces each.

When assembled, the curved body 472 of wiper rod 470 extends from its attached end 474 and counterweight 478 over and above panel member 280 and sharpening steel 430 and slot 288 with its distal end 476 extending adjacent to or past right edge 284 of panel 280 (see FIG. 33. When the knife blade 220 is pushed downwards through slot 288 to contact the sharpening steels 430 and 432 at intersection point 360 (see FIG. 48A), and continued to push the sharpening steels in a downwards direction (see FIG. 48B), the knife blade 220 will contact wiper rod 470 to also push it down. By drawing the knife blade along wiper rod 470 in addition to sharpening steels 430 and 432, the wiper rod 470 will act to polish the sharpened cutting edge 228 produced by the sharpening steels 430 and 432 to further straighten any imperfections along the cutting edge. At the same time, counterweight 478 provides impedance against the downward movement of the wiper rod to prolong the contact by the knife blade with the wiper rod. There is no leaf spring biasing the wiper rod.

When the knife blade is withdrawn by the robotic arm from the slot 288 in the knife sharpener 410, the tails 464 of the elliptical leaf springs 412 and 414 will act to bias sharpening steels 430 and 432, respectively, back to their stand-by position shown in FIG. 37A. Meanwhile, counterweight 478 acts to return wiper rod 470 to its standby position. The knife sharpener 410 is now ready to sharpen the cutting edge along the blade 220 of the same knife 210 or another knife.

Sharpening steels normally cannot repair burrs or other severely deformed regions along a knife blade cutting edge. They just realign less severely deformed regions. However, in the case of the present invention, the sharpening steels 430 and 432 allow such a repair step to be carried out. A bend 311 exists within the sharpening steel 430 and 432 where the straight intermediate segment 308 joins the terminal segment 309. This bend provides additional surface area on the sharpening steel. As seen in FIG. 37B, the stop post 384 is properly located on the panel member 80 so that when the terminal segments 309 or distal ends 310 of the sharpening steels abut the stop post to arrest the inward movement of the steels when the knife blade is pressing down on the steels, the intersection point 360 of the crisscrossed sharpening steels is defined by the two bend points 311. When the knife blade 220 is pushed down in the slot 288 to engage this intersection point 360, the stop post 384 will lock the two sharpening steels in place so that further pressure is applied by the bends 311 of the sharpening steels against the burr or severely deformed region of the cutting edge of the knife blade to repair it. The polished exterior of the sharpening steels and locked position of the steels produces this extra sharpening capacity by the knife sharpener 410.

The above specification and associated drawings provide a complete description of the structure and operation of the scissors sharpener of the present invention. Many alternative embodiments of the invention can be made without departing from the spirit and scope of the invention. Therefore, the invention resides in the claims herein appended.

We claim:

1. An automated hand tool sharpening system for sharpening at least one cutting edge of a working surface of a hand tool at a predetermined angle, the apparatus comprising:
    (a) a supply of at least one hand tool having a handle at its first end and a working surface in an unsharpened state at its second end:
    (b) a robotic arm having a pneumatic gripper for picking up the handle of the hand tool;
    (c) a vision sensor camera and associated software for obtaining a series of two-dimensional coordinates that collectively characterize the cutting edge of the hand tool to profile the cutting edge of the working surface of the hand tool by means of transposing a series of lines over an image taken of the working surface to define a series of points along the length of the cutting edge of the working surface of the hand tool to define a data set of two dimensional coordinates;
    (d) at least one rotating wheel for grinding, sharpening, or polishing the cutting edge or working surface of the hand tool;
    (e) a controller system for regulating the operation of the rotating wheel and vision sensor camera;
    (f) a robotic controller for producing a series of machine commands for regulating the movement of the robotic arm in three-dimensional space based upon the two-dimensional data set coordinates characterizing the cutting edge of the hand tool;
    (g) wherein the robotic controller causes the robotic arm to pick up the hand tool from the supply and position the working surface of the hand tool in relation to the vision sensor camera to take the image of the working surface of the hand tool in a stationary position and transpose, in association with the software, the series of lines over the image to define the series of points along the length of the cutting edge of the hand tool to define the two-dimensional data set of coordinates characterizing the cutting edge of the hand tool; and
    (h) wherein the robotic controller causes the robotic arm to move the hand tool relative to the rotating grinding, sharpening, or polishing wheel and pass its working surface over the rotating wheel surface along its pro-filed cutting edge to sharpen the cutting edge of the hand tool at the predetermined angle based upon the two-dimensional date set coordinates characterizing the cutting edge of the hand tool.

2. The automated hand tool sharpening system of claim 1, wherein the robotic arm comprises a six axis robotic arm.

3. The automated hand tool sharpening system of claim 1, wherein the two-dimensional data set of coordinates characterizing the cutting edge of the hand tool is further refined by software incorporating a polynomial least squares method using a fourth-degree or fifth degree polynomial equation to produce a corrected edge profile for the cutting edge of the hand tool that enables the resulting machine commands produced by the robotic controller to move the working surface of the hand tool more smoothly and accurately across the rotating grinding, sharpening, or polishing wheel.

4. The automated hand tool sharpening system of claim 1, wherein the working surface of the hand tool has two cutting edges along its opposing surfaces, and wherein the robotic arm passes a first surface of the hand tool across the wheel that is rotated in a first direction, and then picks up and flips over the hand tool to pass the second surface of the hand tool across the wheel after changing the wheel's rotation to a second direction.

5. The automated hand tool sharpening system of claim 1 further comprising a finishing sharpener for removing any imperfections along the cutting edge of the sharpened cutting edge of the hand tool, said hand tool having a working surface with opposed cutting edges, said finishing sharpener comprising:
    (a) a panel member having a front surface and a top edge, and an elongated slot extending partially therein from the top edge and defined by a left edge and a right edge;
    (b) a pair of counterweights, each of which is pivotably secured to the panel member at a pivot point adjacent to and on opposite sides of the upper end portion of the slot;
    (c) a pair of sharpening steels having an upper attachment end, a curved upper segment extending downwardly from the upper attachment end, and a straight lower end segment extending downwardly from the curved upper segment, each of the sharpening steels being connected at its attachment end to one of the attachment tabs secured to the panel member, and each of the sharpening steels being swingable downwardly in crossed relation about its pivot point along the slot in a plane adjacent and parallel to the plane of the panel member, the crossed relation defining an intersection point;
    (d) at least one U-shaped guard wire mounted to the front face of the panel member having an upper leg, a lower leg, and a central section therebetween, the wing overlaying one of the sharpening steels to protect it from becoming disengaged from the panel member;
    (e) wherein the counterweights pull the crossed sharpening steels upwardly into their standby position with their lower edge resting upon the upper leg of the guard wire when the hand tool working surface is not engaged;
    (f) wherein as the working surface of the hand tool is pushed downwardly in the slot of the panel member by the robotic arm to contact the intersection point of the crossed sharpening steels, the intersection point is moved lower along the slot, bowing the sharpening steels under tension applied by the weight of the counterweights, the sharpening steels sharpening the opposing cutting edges of the hand tool working surface as the hand tool is drawn downwardly, outwardly, and through the slot.

6. The automated hand tool sharpening system of claim 5 further comprising at least one secondary steeling rod attached to the left edge or right edge of the slot of the panel member, wherein as the hand tool working surface is pushed downwardly in or drawn through the slot of the panel member, the one or more secondary steeling rods attached to the left edge or right edge of the slot act to guide the hand tool through the slot in proper orientation with respect to the sharpening steels, and protect the hand tool working surface from damage caused by the exposure to the left edge or right edge of the slot of the panel member.

7. The automated hand tool sharpening system of claim 6, wherein the one or more secondary steeling rods further act to sharpen the cutting surface of the knife blade if the knife blade comes into contact with the secondary steeling rod as it is pushed downwardly in or drawn through the slot of the panel member.

8. The automated hand tool sharpening system of claim 5 further comprising a wiper rod having an upper attachment end, and a curved segment extending downwardly from the upper attachment end, the wiper rod being connected at its attachment end to a counterweight pivotably secured to the panel member, and the wiper rod being swingable downwardly about its pivot point along the slot in a plane adjacent and parallel to the plane of the panel member, wherein the wiper rod comes into contact with the cutting edge of the hand tool's working surface during the sharpening operation to polish the cutting edges sharpened by the sharpening steels.

9. The automated hand tool sharpening system of claim 1 further comprising a finishing sharpener for removing any imperfections along the cutting edge of the sharpened cutting edge of the hand tool, said hand tool having a working surface with opposed cutting edges, said finishing sharpener comprising:
  (a) a panel member having a front surface and a top edge, and an elongated slot extending partially therein from the top edge and defined by a left edge and a right edge;
  (b) a pair of attachment tabs, each of which is pivotably secured to the panel member at a pivot point adjacent to and on opposite sides of the upper end portion of the slot;
  (c) a pair of sharpening steels having an upper attachment end, a curved upper segment extending downwardly from the upper attachment end, and a straight lower end segment extending downwardly from the curved upper segment, each of the sharpening steels being connected at its attachment end to one of the attachment tabs secured to the panel member, and each of the sharpening steels being swingable downwardly in crossed relation about its pivot point along the slot in a plane adjacent and parallel to the plane of the panel member, the crossed relation defining an intersection point;
  (d) a pair of cams mounted to the front face of the panel member having a vertical slot therein;
  (e) a pair of leaf springs having a first end and a second end, the first end being secured by the vertical slot in one of the cams, and the second end terminating in a bearing surface, the bearing surface of a spring abutting one of the sharpening steels to place tension on and impede the movement of the sharpening steel;
  (f) wherein the leaf springs push the crossed sharpening steels upwardly into their standby position when the working surface of the hand tool is not engaged;
  (g) wherein as the working surface of the hand tool is pushed downwardly in the slot of the panel member to contact the intersection point of the crossed sharpening steels, the intersection point is moved lower along the slot, bowing the sharpening steels under tension against the bearing surface of the leaf springs, the sharpening steels sharpening the opposing cutting edges of the hand tool as the hand tool is drawn downwardly, outwardly, and through the slot.

10. The automated hand tool sharpening system of claim 1 further comprising a wash apparatus for cleaning the working surfaces of the hand tool, the apparatus comprising:
  (a) a housing having an inlet port and an entry slot for receiving the hand tool;
  (b) a source of a cleaning agent delivered under pressure;
  (c) at least one supply conduit for the pressurized cleaning agent connected to the inlet port of the housing, and extending into the interior of the housing;
  (d) means formed on or connected to the portion of the supply conduit contained inside the interior of the housing for producing a substantially fan-shaped array of spray of the cleaning agent;
  (e) wherein when the hand tool is inserted through the entry slot into the housing with the working surface of the hand tool contained inside the housing, its working surface will be struck by the pressurized, substantially fan-shaped array of spray of the cleaning agent delivered into the housing by the supply conduit to coat the working surface of the hand tool; and
  (f) wherein the pressurized, substantially fan-shaped array of spray of the cleaning agent will act to wash, abrade, scrub, or sterilize the working surface of the hand tool.

11. The automated hand tool sharpening system of claim 10, wherein means formed on the portion of the cleaning agent supply conduit contained inside the housing for producing the substantially fan-shaped array of spray of the cleaning agent comprises an elongated slot formed within the wall of the supply conduit, a series of aligned holes formed within the wall of the supply conduit, or at least one nozzle having a V-shaped groove formed along its head surrounding an outlet port.

12. The automated hand tool sharpening system of claim 10, wherein the pressurized, substantially fan-shaped array of spray of the cleaning agent delivered into the housing by the supply conduit is substantially vertical or horizontal in its alignment with respect to the housing.

13. The automated hand tool sharpening system of claim 10, wherein the entry slot on the housing for receiving the working tool is positioned on a side wall of the housing, so that the working tool is inserted through the entry slot into the housing along a substantially horizontal axis.

14. The automated hand tool sharpening system of claim 10, wherein the hand tool is moved back and forth in front of the pressurized, fan-shaped spray array of cleaning agent in order to substantially treat the length of the working surface.

15. The automated hand tool sharpening system of claim 10 further comprising a delivery nozzle mounted outside the housing for delivering a source of compressed air or pressurized gas to the working surface of the hand tool to dry the cleaning agent treating the working surface of the hand tool.

16. The automated hand tool sharpening system of claim 10 further comprising at least one brush assembly positioned across the entry slot for deflecting cleaning agent spray that might try to escape the housing through the entry slot.

17. The automated hand tool sharpening system of claim 16, wherein the brush assembly additionally acts to separate metal bits or other debris from the working surface of the hand tool before it is inserted through the entry slot for cleaning inside the housing.

18. The automated hand tool sharpening system of claim 10, wherein the cleaning agent comprises a chlorine compound, an acidic cleaning agent like vinegar or citric acid, or an alkaline cleaning agent like sodium hydroxide, potassium hydroxide, bleach, ammonia, or hot water.

19. The automated hand tool sharpening apparatus of claim 1, wherein the hand tool comprises a domestic, industrial, sport, or hobby implement used within a manual or automated process to produce useful work, such as a knife, scissors, scalpel, spreading device, prying device, chipping or cutting device, or stripping device.

20. The automated hand tool sharpening apparatus of claim 1, wherein the hand tool comprises a knife selected from the group consisting of a bread knife, a boning knife, a carving knife, a chef's knife, a cleaver, a butcher's knife, an electric knife, a kitchen knife, an oyster knife, a paring or coring knife, a straight blade, skinner blade, round blade, or rocker knife, a steak knife, a table knife, an ulu, a Bowie knife, a cobbler's or shoemaker's knife, a crooked knife, a wood carving knife, a diver's knife, an electrician's knife, a hunting knife, a linoleum knife, a machete, a palette knife, a paper knife or letter opener, a pocket knife, a produce knife, a rigging knife, a scalpel, a straight razor, a survival knife, a switchblade, a utility knife, a whittling knife, an x-acto knife, balisong, or kiridashi a ballistic knife, a bayonet, a combat knife, a dagger, a fighting knife, a ramuri, shiv, trench knife, butterfly knife, or throwing knife, an athame, a kirpen, a kilaya, a kris, a kukri, a puukko, a seax, and a sgiandubh.

* * * * *